(12) United States Patent
Takahashi et al.

(10) Patent No.: US 12,273,894 B2
(45) Date of Patent: Apr. 8, 2025

(54) TERMINAL APPARATUS, BASE STATION APPARATUS, AND COMMUNICATION METHOD

(71) Applicant: Sharp Kabushiki Kaisha, Osaka (JP)

(72) Inventors: Hiroki Takahashi, Sakai (JP); Shohei Yamada, Sakai (JP); Liqing Liu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 395 days.

(21) Appl. No.: 17/765,608

(22) PCT Filed: Oct. 2, 2020

(86) PCT No.: PCT/JP2020/037510
§ 371 (c)(1),
(2) Date: Mar. 31, 2022

(87) PCT Pub. No.: WO2021/066133
PCT Pub. Date: Apr. 8, 2021

(65) Prior Publication Data
US 2022/0369297 A1    Nov. 17, 2022

(30) Foreign Application Priority Data
Oct. 3, 2019  (JP) .................. 2019-183239

(51) Int. Cl.
*H04W 72/04*  (2023.01)
*H04W 72/0446*  (2023.01)
*H04W 72/23*  (2023.01)

(52) U.S. Cl.
CPC ....... *H04W 72/23* (2023.01); *H04W 72/0446* (2013.01)

(58) Field of Classification Search
CPC . H04W 72/23; H04W 72/0446; H04W 28/06; H04W 72/0453; H04W 72/20; H04L 5/0092; H04L 5/0048
See application file for complete search history.

(56) References Cited

U.S. PATENT DOCUMENTS 10,623,155 B2 *  4/2020  Kim ................ H04L 1/0038
10,708,922 B2 *  7/2020  Nan ................ H04W 72/0446
(Continued)

OTHER PUBLICATIONS

Official Communication issued in International Patent Application No. PCT/JP2020/037510, mailed on Dec. 8, 2020.
(Continued)

*Primary Examiner* — Abdullahi E Salad
(74) *Attorney, Agent, or Firm* — Keating & Bennett, LLP

(57) ABSTRACT

A terminal apparatus detects a first DCI format including first allocation information for identifying a time resource and the number of repetition transmissions that are used to transmit a PUSCH corresponding to a first TB, detects a second DCI format including second allocation information indicating reception of a downlink signal, identifies the time resource for transmitting the PUSCH, based on the first allocation information, and cancels transmission of a first PUSCH corresponding to any one of the repetition transmissions of the PUSCH in a case that the first allocation information indicates that the first PUSCH is to be transmitted in a first symbol set and that the second allocation information indicates that the downlink signal is to be received in a second symbol set and that at least one symbol in the first symbol set is a symbol included in the second symbol set.

3 Claims, 24 Drawing Sheets

(56) References Cited

U.S. PATENT DOCUMENTS

| 10,966,119 B2* | 3/2021 | Lee | H04W 72/21 |
|---|---|---|---|
| 11,395,182 B2* | 7/2022 | Liu | H04W 28/06 |
| 11,470,587 B2* | 10/2022 | Bae | H04L 5/0082 |
| 2020/0146034 A1* | 5/2020 | Bagheri | H04W 72/1268 |
| 2024/0147450 A1* | 5/2024 | Kim | H04L 1/08 |

OTHER PUBLICATIONS

NTT Docomo, "Revision of SI: Study on New Radio Access Technology", 3GPP TSG RAN Meeting #72, RP-161214, Jun. 13-16, 2016, 8 pages.
ZTE, "Grant-based PUSCH Enhancements for URLLC", 3GPP TSG RAN WG1 #96, R1-1901769, Feb. 25-Mar. 1, 2019, 9 pages.
Nokia et al., "Summary of contributions of PUSCH enhancements for NR eURLLC (AI 7.2.6.3)", 3GPP TSG-RAN WG1 Meeting #98, RP-1909527, Aug. 26-30, 2019, 27 pages.

* cited by examiner

| Slot format index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| ... | ... | | | | | | | | | | | | | |
| 255 | UE determines the slot format for the slot based on higher layer slot format configuration information and, if any, on detected DCI formats | | | | | | | | | | | | | |

FIG. 6

Applicable PUSCH time domain resource allocation

| RNTI | PDCCH search space | pusch-ConfigCommon includes pusch-TimeDomain AllocationList | pusch-Config includes pusch-TimeDomain AllocationList | PUSCH time domain resource allocation to apply |
|---|---|---|---|---|
| PUSCH scheduled by MAC RAR as described in subclause 8.2 of [6, TS 38.213] | | No | - | PUSCH Default A |
| | | Yes | - | pusch-TimeDomain AllocationList provided in pusch-ConfigCommon |
| C-RNTI, MCS-C-RNTI, TC-RNTI, CS-RNTI | Any common search space associated with CORESET 0 | No | - | PUSCH Default A |
| | | Yes | - | pusch-TimeDomain AllocationList provided in pusch-ConfigCommon |
| C-RNTI, MCS-C-RNTI, TC-RNTI, CS-RNTI | Any common search space not associated with CORESET 0, | No | No | PUSCH Default A |
| | | Yes | No | pusch-TimeDomain AllocationList provided in pusch-ConfigCommon |
| | UE specific search space | No/Yes | Yes | pusch-TimeDomain AllocationList provided in pusch-Config |

FIG. 8

Applicable PUSCH time domain resource allocation

| RNTI | PDCCH search space | pusch-ConfigCommon includes pusch-TimeDomain AllocationList2 | pusch-Config includes pusch-TimeDomain AllocationList2 | PUSCH time domain resource allocation to apply |
|---|---|---|---|---|
| PUSCH scheduled by MAC RAR as described in subclause 8.2 of [6, TS 38.213] | | No | - | PUSCH Default B |
| | | Yes | - | pusch-TimeDomain AllocationList2 provided in pusch-ConfigCommon |
| C-RNTI, MCS-C-RNTI, TC-RNTI, CS-RNTI | Any common search space associated with CORESET 0 | No | | PUSCH Default B |
| | | Yes | | pusch-TimeDomain AllocationList2 provided in pusch-ConfigCommon |
| C-RNTI, MCS-C-RNTI, TC-RNTI, CS-RNTI | Any common search space not associated with CORESET 0, | No | No | PUSCH Default B |
| | | Yes | No | pusch-TimeDomain AllocationList2 provided in pusch-ConfigCommon |
| | UE specific search space | No/Yes | Yes | pusch-TimeDomain AllocationList2 provided in pusch-Config |

FIG. 9

Default PUSCH time domain resource allocation A for normal CP (PUSCH default A)

| Row index | PUSCH mapping type | $K_2$ | $S$ | $L$ |
|---|---|---|---|---|
| 1 | Type A | $j$ | 0 | 14 |
| 2 | Type A | $j$ | 0 | 12 |
| 3 | Type A | $j$ | 0 | 10 |
| 4 | Type B | $j$ | 2 | 10 |
| 5 | Type B | $j$ | 4 | 10 |
| 6 | Type B | $j$ | 4 | 8 |
| 7 | Type B | $j$ | 4 | 6 |
| 8 | Type A | $j+1$ | 0 | 14 |
| 9 | Type A | $j+1$ | 0 | 12 |
| 10 | Type A | $j+1$ | 0 | 10 |
| 11 | Type A | $j+2$ | 0 | 14 |
| 12 | Type A | $j+2$ | 0 | 12 |
| 13 | Type A | $j+2$ | 0 | 10 |
| 14 | Type B | $j$ | 8 | 6 |
| 15 | Type A | $j+3$ | 0 | 14 |
| 16 | Type A | $j+3$ | 0 | 10 |

FIG. 10

Default PUSCH time domain resource allocation B for normal CP (PUSCH default B)

| Row index | $K_2$ | S | L | Rep |
|---|---|---|---|---|
| 1 | j | 0 | 14 | 1 |
| 2 | j | 0 | 10 | 1 |
| 3 | j | 4 | 14 | 1 |
| 4 | j | 4 | 10 | 1 |
| 5 | j | 8 | 14 | 1 |
| 6 | j | 8 | 10 | 1 |
| 7 | j | 12 | 14 | 1 |
| 8 | j | 12 | 10 | 1 |
| 9 | j+1 | 0 | 14 | 1 |
| 10 | j+1 | 0 | 10 | 1 |
| 11 | j+2 | 0 | 14 | 1 |
| 12 | j+2 | 0 | 10 | 1 |
| 13 | j+3 | 0 | 14 | 1 |
| 14 | j+3 | 0 | 10 | 1 |
| 15 | j | 0 | 4 | 2 |
| 16 | j | 0 | 7 | 2 |

FIG. 11

```
PUSCH-TimeDomainResourceAllocation ::= SEQUENCE {
    k2                      INTEGER(0..32)              OPTIONAL,
    mappingType             ENUMERATED {typeA, typeB},
    startSymbolAndLength    INTEGER (0..127)
}
```

FIG. 12

- The starting symbol $S$ relative to the start of the slot, and the number of consecutive symbols $L$ counting from the symbol $S$ allocated for the PUSCH are determined from the start and length indicator $SLIV$:

if $(L-1) \leq 7$ then $$SLIV = 14 \cdot (L-1) + S$$

else $$SLIV = 14 \cdot (14-L+1) + (14-1-S)$$

where $0 < L \leq 14 - S$

FIG. 13

```
PUSCH-TimeDomainResourceAllocation2 ::= SEQUENCE {
    k2                    INTEGER(0..32)      OPTIONAL,
    startSymbol           INTEGER (0..13)
    length                INTEGER (1..14)
    repetition            INTEGER (2..8)
}
```

FIG. 14

PUSCH-TimeDomainResourceAllocation3 ::= SEQUENCE (SIZE (1..maxNrofReps)) OF PUSCH-TDRAperRep, PUSCH-TDRAperRep ::= SEQUENCE {
    k2                      INTEGER(0..32)      OPTIONAL,
    startSymbolAndLength  INTEGER (0..127)
}

FIG. 15

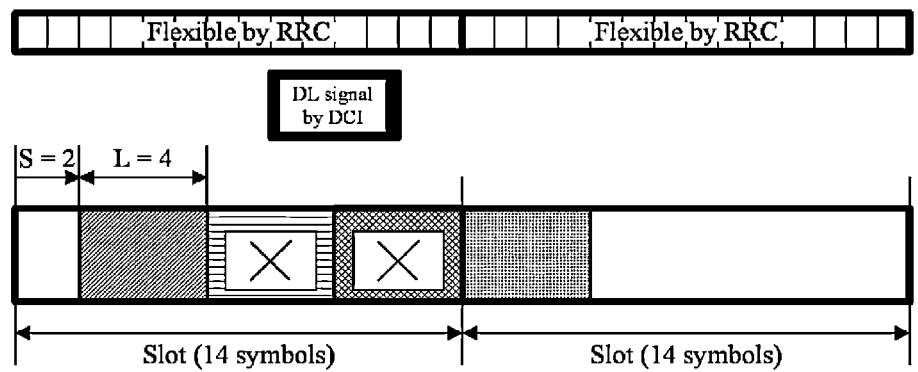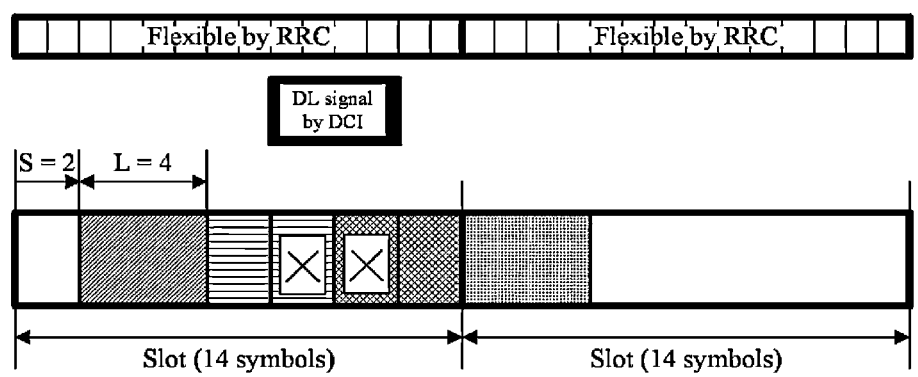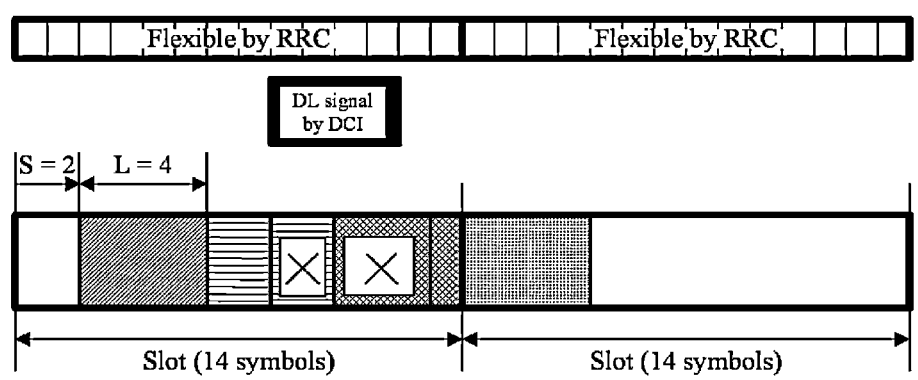
FIG. 17

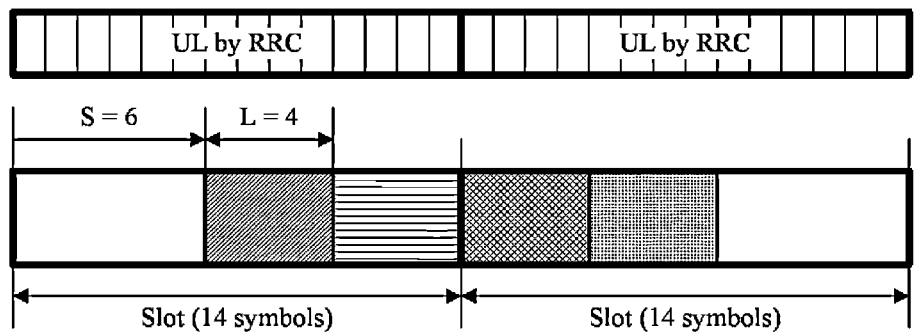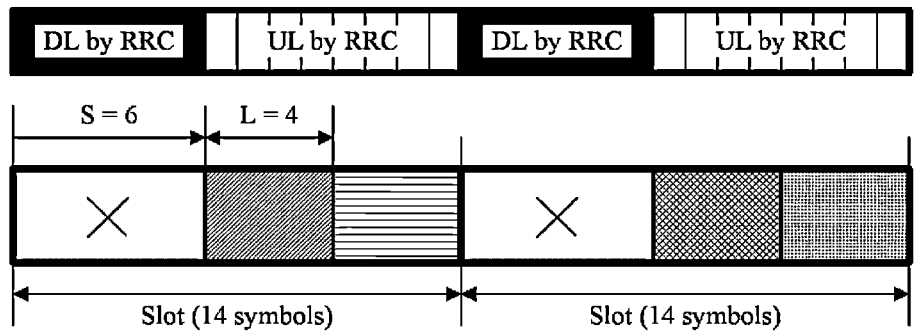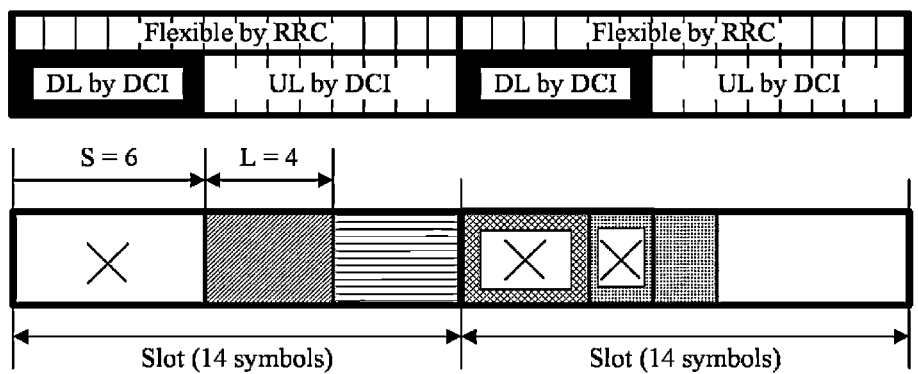
FIG. 18

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2019-183239 filed on Oct. 3, 2019, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently being conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of the present invention is to provide a terminal apparatus, a base station apparatus, and a communication method that enable efficient communication in a radio communication system as that described above.

Solution to Problem (1) In order to accomplish the object described above, the present invention is contrived to provide the following means. Specifically, an aspect of the present invention provides a terminal apparatus including: a receiver configured to detect a first DCI format including first allocation information for identifying a time resource and the number of repetition transmissions that are used to transmit a physical uplink shared channel corresponding to a first transport block, and to detect a second DCI format including second allocation information indicating reception of a downlink signal; and a determination unit configured to identify the time resource for transmitting the multiple physical uplink shared channels, based on the first allocation information, wherein the determination unit cancels transmission of a first physical uplink shared channel corresponding to any one of the repetition transmissions of the physical uplink shared channel in a case that the first allocation information indicates that the first physical uplink shared channel is to be transmitted in a first symbol set and that the second allocation information indicates that the downlink signal is to be received in a second symbol set and that at least one symbol in the first symbol set is a symbol included in the second symbol set.

(2) An aspect of the present invention provides a base station apparatus for communicating with a terminal apparatus, the base station apparatus including: a transmitter configured to transmit, to the terminal apparatus, a signal including a first DCI format including first allocation information for identifying a time resource and the number of repetition transmissions that are used to transmit a physical uplink shared channel corresponding to a first transport block, and to transmit, to the terminal apparatus, a signal including a second DCI format including second allocation information indicating reception of a downlink signal; and a determination unit configured to identify the time resource for receiving the multiple physical uplink shared channels, based on the first allocation information, wherein the determination unit determines not to receive a first physical uplink shared channel corresponding to any one of the repetition transmissions of the physical uplink shared channel in a case that the first allocation information indicates that the first physical uplink shared channel is to be received in a first symbol set and that the second allocation information indicates that the downlink signal is to be transmitted in a second symbol set and that at least one symbol in the first symbol set is a symbol included in the second symbol set.

(3) According to an aspect of the present invention is a communication method for a terminal apparatus, the communication method comprising: detecting a first DCI format including first allocation information for identifying a time resource and the number of repetition transmissions that are used to transmit a physical uplink shared channel corresponding to a first transport block; detecting a second DCI format including second allocation information indicating reception of a downlink signal; identifying the time resource for transmitting the multiple physical uplink shared channels, based on the first allocation information; and canceling transmission of a first physical uplink shared channel corresponding to any one of the repetition transmissions of the physical uplink shared channel in a case that the first allocation information indicates that the first physical uplink shared channel is to be transmitted in a first symbol set and that the second allocation information indicates that the downlink signal is to be received in a second symbol set and that at least one symbol in the first symbol set is a symbol included in the second symbol set.

(4) An aspect of the present invention provides a communication method for a base station apparatus, the communication method including: transmitting, to the terminal apparatus, a signal including a first DCI format including first allocation information for identifying a time resource and the number of repetition transmissions that are used to transmit a physical uplink shared channel corresponding to a first transport block, and transmitting, to the terminal apparatus, a signal including a second DCI format including second allocation information indicating reception of a downlink signal; identifying the time resource for receiving the multiple physical uplink shared channels, based on the first allocation information; and determining not to receive a first physical uplink shared channel corresponding to any one of the repetition transmissions of the physical uplink shared channel in a case that the first allocation information indicates that the first physical uplink shared channel is to be received in a first symbol set and that the second allocation information indicates that the downlink signal is to be transmitted in a second symbol set and that at least one symbol in the first symbol set is a symbol included in the second symbol set.

Advantageous Effects of Invention

According to an aspect of the present invention, a terminal apparatus and a base station apparatus can communicate efficiently.

BRIEF DESCRIPTION OF DRAWINGS

FIG. 6 is a diagram illustrating an example of a table of a slot format according to an embodiment of the present invention.

FIG. 8 is an example of a table indicating a method for determining a resource allocation table to be applied to a PUSCH according to an embodiment of the present invention.

FIG. 9 is another example of the table indicating the method for determining the resource allocation table to be applied to the PUSCH according to an embodiment of the present invention.

FIG. 10 is a diagram illustrating an example of a PUSCH default table A according to the present embodiment.

FIG. 11 is a diagram illustrating an example of a PUSCH default table B according to the present embodiment.

FIG. 12 is a diagram illustrating an example of a parameter configuration of an RRC parameter PUSCH-TimeDomainResourceAllocation according to an embodiment of the present invention.

FIG. 13 is a diagram illustrating an example in which SLIV is calculated according to an embodiment of the present invention.

FIG. 14 is a diagram illustrating an example of a parameter configuration of the RRC parameter PUSCH-TimeDomainResourceAllocation2 according to an embodiment of the present invention.

FIG. 15 is a diagram illustrating an example of a parameter configuration of the RRC parameter PUSCH-TimeDomainResourceAllocation3 according to an embodiment of the present invention.

FIG. 17 is a diagram illustrating an example of dropping of the PUSCH in a repetition transmission of the PUSCH according to an embodiment of the present invention.

FIG. 18 is a diagram illustrating an example of a time resource allocation of the PUSCH in the repetition transmission of the PUSCH according to an embodiment of the present invention.

DESCRIPTION OF EMBODIMENTS

An embodiment of the present invention will be described below.

Figure 1:
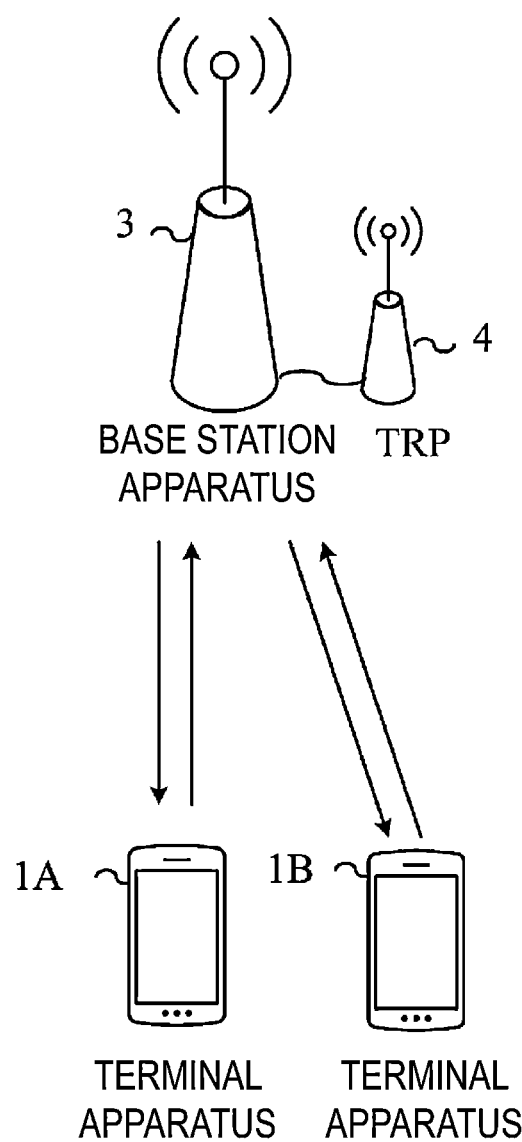
FIG. 1 is a diagram illustrating a concept of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1 below.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or multiple transmission reception points 4. At least some of the functions/processing of the base station apparatus 3 described below may be the functions/processing of each of the transmission reception points 4 included in the base station apparatus 3. The base station apparatus 3 may use a communicable range (communication area) controlled by the base station apparatus 3, as one or multiple cells to serve the terminal apparatus 1. Furthermore, the base station apparatus 3 may use a communicable range (communication area) controlled by one or multiple transmission reception points 4, as one or multiple cells to serve the terminal apparatus 1. Additionally, the base station apparatus 3 may divide one cell into multiple beamed areas and serve the terminal apparatus 1 in each of the beamed areas. Here, a beamed area may be identified based on a beam index used for beamforming or a precoding index.

In the present embodiment, a radio communication link from the base station apparatus 3 to the terminal apparatus 1 is referred to as a downlink. In the present embodiment, a radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP need not be used, or the above-described transmission scheme with zero padding may be used instead of the CP. Moreover, the CP or zero passing may be added both forward and backward.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, an aspect of the present embodiment may be used in a stand-alone manner for independent operations. In the dual connectivity operation, the Special Cell (SpCell) is referred to as a PCell of the MCG or a PSCell of the SCG, respectively, depending on whether a Medium Access Control (MAC) entity is associated with the MCG or the SCG. In a case that the operation is not in dual connectivity, the Special Cell (SpCell) is referred to as a PCell. The Special Cell (SpCell) supports PUCCH transmission and contention based random access.

In the present embodiment, one or multiple serving cells may be configured for the terminal apparatus 1. The multiple serving cells configured may include one primary cell and one or multiple secondary cells. The primary cell may be a serving cell on which an initial connection establishment procedure has been performed, a serving cell in which a connection re-establishment procedure has been initiated, or a cell indicated as a primary cell in a handover procedure. One or multiple secondary cells may be configured at a point of time in a case that or after a Radio Resource Control (RRC) connection is established. Note that the multiple serving cells configured may include one primary secondary cell. The primary secondary cell may be a secondary cell that is included in the one or multiple secondary cells configured and in which the terminal apparatus 1 can transmit control information in the uplink. Additionally, subsets of two types of serving cells corresponding to a master cell group and a secondary cell group may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be referred to as an unpaired spectrum operation. The FDD scheme may be referred to as a paired spectrum operation.

In the downlink in the present embodiment, a carrier corresponding to a serving cell is referred to as a downlink component carrier (or a downlink carrier). In the uplink in the present embodiment, a carrier corresponding to a serving cell is referred to as an uplink component carrier (or an uplink carrier). In a sidelink in the present embodiment, a carrier corresponding to a serving cell is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast time indexes within the period of synchronization signal blocks (also referred to as SS/PBCH blocks). Here, the time index is information indicating the indexes of the synchronization signals and the PBCHs within the cell. For example, in a case that the SS/PBCH block is transmitted using the assumption of three transmit beams (transmission filter configuration and Quasi Co-Location (QCL) related to reception spatial parameters), the order of time within a prescribed period or within a configured period may be indicated. Additionally, the terminal apparatus may recognize the difference in time index as a difference in transmit beam.

The PDCCH is used to transmit (or carry) downlink control information (DCI) in a case of downlink radio communication (radio communication from the base station apparatus 3 to the terminal apparatus 1). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus 1 monitors a set of PDCCH candidates in the serving cell. However, the monitoring may mean an attempt to decode the PDCCH in accordance with a certain DCI format.

For example, the following DCI format may be defined.
DCI format 0_0
DC format 0_1
DCI format 0_2
DCI format 1_0
DCI format 1_1
DCI format 1_2
DCI format 2_0
DC format 2_1
DCI format 2_2
DCI format 2_3

DCI format 0_0 may be used for scheduling of the PUSCH in a certain serving cell. DCI format 0_0 may include information indicating PUSCH scheduling information (frequency domain resource allocation and time domain resource allocation). A Cyclic Redundancy Check (CRC) may be added to DCI format 0_0, the CRC being scrambled with, among Radio Network Temporary Identifiers (RNTIs) being identifiers, any one of a Cell-RNTI (C-RNTI), a Configured Scheduling (CS)-RNTI), an MCS-C-RNTI, and/or a Temporary C-NRTI (TC-RNTI). DCI format 00 may be monitored in a common search space or a UE-specific search space.

DCI format 0_1 may be used for scheduling of the PUSCH in a certain serving cell. DCI format 0_1 may include information indicating PUSCH scheduling information (frequency domain resource allocation and time domain resource allocation), information indicating a BandWidth Part (BWP), a Channel State Information (CSI) request, a Sounding Reference Signal (SRS) request, and/or information related to antenna ports. A CRC scrambled with any one of RNTIs including the C-RNTI, the CS-RNTI, a Semi Persistent (SP)-CSI-RNTI, and/or the MCS-C-RNTI may be added to DCI format 0_1. DCI format 01 may be monitored in the UE-specific search space.

DCI format 0_2 may be used for scheduling of the PUSCH in a certain serving cell. DCI format 0_2 may include information indicating PUSCH scheduling information (frequency domain resource allocation and time domain resource allocation), information indicating the BWP, a CSI request, an SRS request, and/or information related to the antenna ports. A CRC scrambled with any one of RNTIs including the C-RNTI, the CSI-RNTI, the SP-CSI-RNTI, and/or the MCS-C-RNTI may be added to DCI format 0_2. DCI format 0_2 may be monitored in the UE-specific search space. DCI format 0_2 may be referred to as a DCI format 0_1A or the like.

DCI format 1_0 may be used for scheduling of the PDSCH in a certain serving cell. DCI format 1_0 may include information indicating PDSCH scheduling information (frequency domain resource allocation and time domain resource allocation). A CRC scrambled with any one of identifiers including the C-RNTI, the CS-RNTI, the MCS-C-RNTI, a Paging RNTI (P-RNTI), a System Information (SI)-RNTI, a Random Access (RA)-RNTI, and/or a TC-RNTI may be added to DCI format 1_0. DCI format 1_0 may be monitored in the common search space or the UE-specific search space.

DCI format 1_1 may be used for scheduling of the PDSCH in a certain serving cell. DCI format 1_1 may include information indicating PDSCH scheduling information (frequency domain resource allocation and time domain resource allocation), information indicating the bandwidth part (BWP), Transmission Configuration Indication (TCI), and/or information related to the antenna ports. A CRC scrambled with any one of RNTIs including the C-RNTI, the CS-RNTI, and/or the MCS-C-RNTI may be added to DCI format 1_1. DCI format 1_1 may be monitored in the UE-specific search space.

DCI format 1_2 may be used for scheduling of the PDSCH in a certain serving cell. DCI format 1_2 may include information indicating PDSCH scheduling information (frequency domain resource allocation and time domain resource allocation), information indicating the BWP, TCI, and/or information related to the antenna ports. A CRC scrambled with, among the RNTIs, any one of the C-RNTI, the CS-RNTI, and/or the MCS-C-RNTI may be added to DCI format 1_2. DCI format 1_2 may be monitored in the UE-specific search space. DCI format 1_2 may be referred to as DC format 1_1A or the like.

DCI format 2_0 is used to notify the slot format of one or multiple slots. The slot format is defined as a format in which each OFDM symbol in the slot is classified as downlink, flexible, or uplink. For example, in a case that the slot format is 28, DDDDDDDDDDDDFU is applied to the 14 OFDM symbols in the slot for which slot format 28 is indicated. Here, D is a downlink symbol, F is a flexible symbol, and U is an uplink symbol. Note that the slot will be described below.

DCI format 2_1 is used to notify the terminal apparatus 1 of physical resource blocks (PRBs or RBs) and OFDM symbols which may be assumed to involve no transmission. Note that this information may be referred to as a pre-emption indication (intermittent transmission indication).

DCI format 2_2 is used for transmission of the PUSCH and a Transmit Power Control (TPC) command for the PUSCH.

DCI format 2_3 is used to transmit a group of TPC commands for transmission of sounding reference signals (SRSs) by one or multiple terminal apparatuses 1. Additionally, the SRS request may be transmitted along with the TPC command. In addition, the SRS request and the TPC command may be defined in the DCI format 2_3 for uplink with no PUSCH and PUCCH or uplink in which the transmit power control for the SRS is not associated with the transmit power control for the PUSCH.

Here, the DCI for the downlink is also referred to as downlink grant or downlink assignment. Here, the DCI for the uplink is also referred to as uplink grant or uplink assignment. The DCI may also be referred to as a DCI format.

CRC parity bits added to the DCI format transmitted on one PDCCH are scrambled with the SI-RNTI, the P-RNTI, the C-RNTI, the CS-RNTI, the RA-RNTI, or the TC-RNTI. The SI-RNTI may be an identifier used for broadcasting of the system information. The P-RNTI may be an identifier used for paging and notification of system information modification. The C-RNTI, the MCS-C-RNTI, and the CS-RNTI are identifiers for identifying a terminal apparatus within a cell. The TC-RNTI is an identifier for identifying the terminal apparatus 1 that has transmitted a random access preamble during a contention based random access procedure.

The C-RNTI is used to control the PDSCH or the PUSCH in one or multiple slots. The CS-RNTI is used to periodically allocate a resource for the PDSCH or the PUSCH. The MCS-C-RNTI is used to indicate the use of a prescribed MCS table for grant-based transmission. The TC-RNTI is used to control PDSCH transmission or PUSCH transmission in one or multiple slots. The TC-RNTI is used to schedule re-transmission of a random access message 3 and transmission of a random access message 4. The RA-RNTI is determined in accordance with frequency and time location information regarding the physical random access channel on which the random access preamble has been transmitted.

For the C-RNTI and/or the other RNTIs, different values corresponding to the type of traffic on the PDSCH or the PUSCH may be used. For the C-RNTI and the other RNTIs, different values corresponding to the service type (eMBB, URLLC, and/or mMTC) of the data transmitted on the PDSCH or PUSCH may be used. The base station apparatus 3 may use the RNTI having a different value corresponding to the service type of the data transmitted. The terminal apparatus 1 may identify the service type of the data transmitted on the associated PDSCH or PUSCH, based on the value of the RNTI applied to the received DCI (used for the scrambling).

The PUCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

The PDSCH is used to transmit downlink data (Downlink Shared CHannel (DL-SCH)) from a Medium Access Control (MAC) layer. For the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive a Radio Resource Control (RRC) message (also referred to as RRC information or RRC signaling) in an RRC layer. The base station apparatus 3 and the terminal apparatus 1 may transmit and/or receive a Medium Access Control (MAC) control element in a Medium Access Control (MAC) layer. Additionally, the RRC layer of the terminal apparatus 1 acquires system information broadcast from the base station apparatus 3. In this regard, the RRC message, the system information, and/or the MAC control element is also referred to as higher layer signaling or a higher layer parameter. Each of the parameters included in the higher layer signal received by the terminal apparatus 1 may be referred to as a higher layer parameter. The higher layer as used herein means a higher layer as viewed from the physical layer, and thus may include one or multiple of the MAC layer, the RRC layer, an RLC layer, a PDCP layer, a Non Access Stratum (NAS) layer, and the like. For example, in the processing of the MAC layer, the higher layer may include one or multiple of the RRC layer, the RLC layer, the PDCP layer, the NAS layer, and the like. Hereinafter, "A is given (provided) in the higher layer" or "A is given (provided) by the higher layer" may mean that the higher layer (mainly the RRC layer, the MAC layer, or the like) of the terminal apparatus 1 receives A from the base station apparatus 3 and that A received is given (provided) from the higher layer of the terminal apparatus 1 to the physical layer of the terminal apparatus 1. For example, in the terminal apparatus 1, "a higher layer parameter is provided" may mean that a higher layer signal is received from the base station apparatus 3, and that the higher layer parameter included in the received higher layer signal is provided to the physical layer of the terminal apparatus 1 from the higher layer of the terminal apparatus 1. Configuring a higher layer parameter for the terminal apparatus 1 may mean that the higher layer parameter is given (provided) to the terminal apparatus 1. For example, the configuring the higher layer parameter to the terminal apparatus 1 may mean that the terminal apparatus 1 receives the higher layer signal from the base station apparatus 3, and configures the received higher layer parameter in the higher layer. However, the higher layer parameter being configured for the terminal apparatus 1 may include configuration of the default parameter given in advance to the higher layer of the terminal apparatus 1.

The PDSCH or the PUSCH may be used to transmit the RRC signaling and the MAC control element. The RRC signaling transmitted from the base station apparatus 3 by using the PDSCH may be signaling common to multiple terminal apparatuses 1 in a cell. The RRC signaling transmitted from the base station apparatus 3 may be dedicated signaling for a certain terminal apparatus 1 (also referred to as dedicated signaling). In other words, terminal apparatus-specific (UE-specific) information may be transmitted through dedicated signaling to the certain terminal apparatus 1. Additionally, the PUSCH may be used to transmit UE capabilities in the uplink.

In FIG. 1, the following downlink physical signals are used for downlink radio communication. Here, the downlink physical signals are not used to transmit information output from the higher layers but are used by the physical layer.

Synchronization signal (SS)

Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration, or a spatial domain transmission filter or a spatial domain reception filter.

A reference signal is used for the terminal apparatus 1 to perform channel compensation on a physical channel. Here, the reference signal may be used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)

Channel State Information Reference Signal (CSI-RS)

Phase Tracking Reference Signal (PTRS)

Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and a transmission method for a periodic, semi-persistent, or aperiodic CSI reference signal is applied to the CSI-RS. For the CSI-RS, a Non-Zero Power (NZP) CSI-RS and a CSI-RS with zero transmit power (or receive power) (Zero Power (ZP)) may be defined. Here, the ZP CSI-RS may be defined as a CSI-RS resource that has zero transmit power or that is not transmitted. The PTRS is used to track phase on the time axis to ensure frequency offset caused by phase noise. The TRS is used to ensure Doppler shift during fast movement. Note that the TRS may be used as one configuration of the CSI-RS. For example, a radio resource may be configured with the CSI-RS for one port as a TRS.

According to the present embodiment, one or multiple of the following uplink reference signals are used.

Demodulation Reference Signal (DMRS)
Phase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management. The PTRS is used to track phase on the time axis to ensure frequency offset caused by phase noise.

In the present embodiment, the downlink physical channels and/or the downlink physical signals are collectively referred to as downlink signals. In the present embodiment, the uplink physical channels and/or the uplink physical signals are collectively referred to as uplink signals. In the present embodiment, downlink physical channels and/or uplink physical channels are collectively referred to as physical channels. In the present embodiment, downlink physical signals and/or uplink physical signals are collectively referred to as physical signals.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
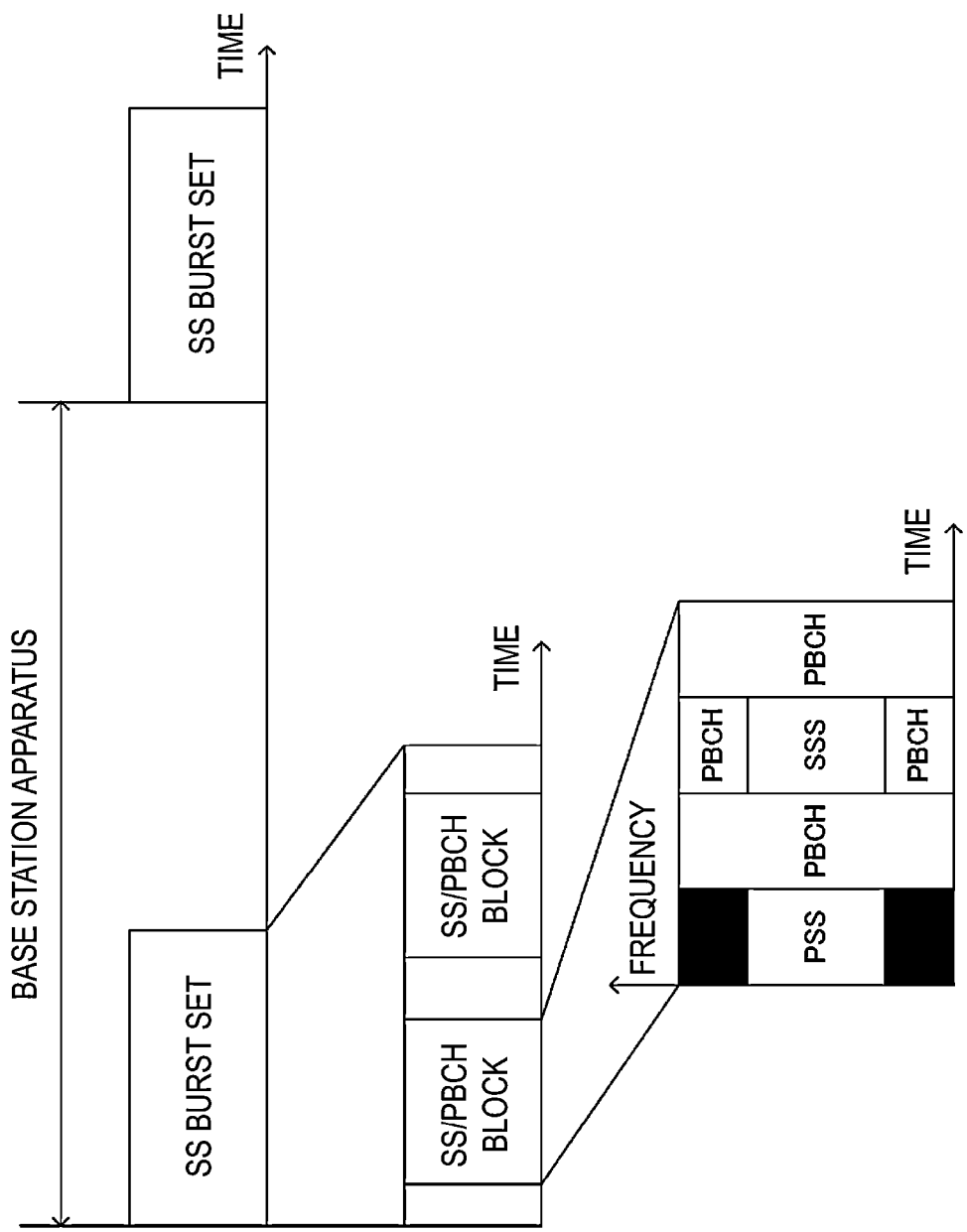
FIG. 2 is a diagram illustrating an example of an SS/PBCH block and an SS burst set according to an embodiment of the present invention.

FIG. 2 is a diagram illustrating an example of SS/PBCH blocks (also referred to as synchronization signal blocks, SS blocks, and SSBs) and SS burst sets (also referred to as synchronization signal burst sets) according to the present embodiment. FIG. 2 illustrates an example in which two SS/PBCH blocks are included in a periodically transmitted SS burst set, and the SS/PBCH block includes continuous four OFDM symbols.

The SS/PBCH block is a unit block including at least synchronization signals (PSS, SSS) and/or PBCHs. Transmitting the signals/channels included in the SS/PBCH block is described as transmitting the SS/PBCH block. In a case of transmitting the synchronization signals and/or the PBCHs using one or multiple SS/PBCH blocks in the SS burst set, the base station apparatus 3 may use an independent downlink transmit beam for each SS/PBCH block.

In FIG. 2, PSS, SSS, and PBCHs are time/frequency multiplexed in one SS/PBCH block. However, the order in which the PSS, the SSS, and/or the PBCHs are multiplexed in the time domain may be different from the order in the example illustrated in FIG. 2.

The SS burst set may be periodically transmitted by the base station apparatus 3. For example, a period may be defined with which the SS/PBCH block is used for initial access, and a period may be defined that is configured for a connected (Connected or RRC_Connected) terminal apparatus 1. Furthermore, the period configured for the connected (Connected or RRC_Connected) terminal apparatus 1 may be configured by the RRC layer. Additionally, the period configured for the connected (Connected or RRC_Connected) terminal apparatus 1 may be a period of a radio resource in the time domain during which transmission is potentially to be performed, and in practice, whether the transmission is to be performed during the period may be determined by the base station apparatus 3. Furthermore, the period with which the SS/PBCH block is used for the initial access may be predefined in specifications or the like.

The SS burst set may be determined based on a System Frame Number (SFN). Additionally, a start position of the SS burst set (boundary) may be determined based on the SFN and the period. The SS/PBCH block is assigned with an SSB index (which may be referred to as the SSB/PBCH block index) depending on the temporal position in the SS burst set. The terminal apparatus 1 calculates the SSB index, based on the information of the PBCH and/or the information of the reference signal included in the detected SS/PBCH block.

The SS/PBCH blocks with the same relative time in each SS burst set in the multiple SS burst sets are assigned with the same SSB index. The SS/PBCH blocks with the same relative time in each SS burst set in the multiple SS burst sets may be assumed to be QCLed (or the same downlink transmit beam may be assumed to be applied to these SS/PBCH blocks). In addition, antenna ports in the SS/PBCH blocks with the same relative time in each SS burst set in the multiple SS burst sets may be assumed to be QCLed for average delay, Doppler shift, and spatial correlation.

Within a certain SS burst set period, the SS/PBCH block assigned with the same SSB index may be assumed to be QCLed for average delay, average gain, Doppler spread, Doppler shift, and spatial correlation. A configuration corresponding to one or multiple SS/PBCH blocks (or the SS/PBCH blocks may be reference signals) that are QCLed may be referred to as a QCL configuration.

The number of SS/PBCH blocks (which may be referred to as the number of SS blocks or the SSB number) may be defined as, for example, the number of SS/PBCH blocks within an SS burst, an SS burst set, or an SS/PBCH block period. Additionally, the number of SS/PBCH blocks may indicate the number of beam groups for cell selection within the SS burst, the SS burst set, or the SS/PBCH block period. Here, the beam group may be defined as the number of different SS/PBCH blocks or the number of different beams included in the SS burst, the SS burst set, or the SS/PBCH block period.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, in the present embodiment, the downlink reference signal, the synchronization signal, and/or the SS/PBCH block may be referred to as a reference signal. The reference signals used in the downlink include a downlink reference signal, a synchronization signal, an SS/PBCH block, a downlink DM-RS, a CSI-RS, and the like. The reference signals used in the uplink include an uplink reference signal, an SRS and/or an uplink DM-RS, and the like.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the procedures described below may be included as a procedure for configuring, setting, or establishing a beam pair link.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and beam refinement. Note that the beam recovery may include the following procedures.

Detection of beam failure
Discovery of a new beam
Transmission of a beam recovery request
Monitoring of a response to the beam recovery request For example, the Reference Signal Received Power (RSRP) of the SSS included in the CSI-RS or the SS/PBCH block may be used or a CSI may be used in selecting the transmit beam of the base station apparatus 3 at the terminal apparatus 1. Additionally, as a report to the base station apparatus 3, the CSI-RS Resource Index (CRI) may be used, or an index indicated in the PBCHs included in the SS/PBCH block and/or in a sequence of demodulation reference signals (DMRSs) used for demodulation of the PBCHs may be used.

Additionally, the base station apparatus 3 indicates the CRI or the time index of the SS/PBCH in indicating the beam to the terminal apparatus 1, and the terminal apparatus 1 receives the beam, based on the CRI or the time index of the SS/PBCH that is indicated. At this time, the terminal apparatus 1 may configure a spatial filter, based on the CRI or the time index of the SS/PBCH that is indicated, and receive the beam. Additionally, the terminal apparatus 1 may receive the beam by using the assumption of Quasi Co-Location (QCL). One signal (such as an antenna port, a synchronization signal, a reference signal, etc.) being "QCLed" with another signal (such as an antenna port, a synchronization signal, a reference signal, etc.) or "using the assumption of QCL" for these signals may be interpreted as the one signal being associated with the other signal.

In a case that a long term property of a channel on which one symbol in one antenna port is carried may be estimated from a channel on which one symbol in the other antenna port is carried, the two antenna ports are said to be quasi co-located. The long term property of the channel includes at least one of a delay spread, a Doppler spread, a Doppler shift, an average gain, or an average delay. For example, in a case that an antenna port 1 and an antenna port 2 are quasi co-located with respect to the average delay, this means that a reception timing for the antenna port 2 may be estimated from a reception timing for the antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSD), or Spatial Correlation, or a reception spatial parameter in a radio link or channel.

For example, in a case that the antenna port 1 and the antenna port 2 may be considered to be QCLed with respect to a reception spatial parameter, this means that a reception beam (reception spatial filter) in which a signal from the antenna port 2 is received may be inferred from a reception beam in which a signal from the antenna port 1 is received.

As QCL types, combinations of long term properties that may be considered to be QCLed may be defined. For example, the following types may be defined.

Type A: Doppler shift, Doppler spread, average delay, delay spread
Type B: Doppler shift, Doppler spread
Type C: Average delay, Doppler shift
Type D: Reception spatial parameter The above-described QCL types may configure and/or indicate the assumption of QCL of the one or two reference signals and the PDCCH or the PDSCH DMRS in the RRC and/or MAC layer and/or DCI as a Transmission Configuration Indication (TCI). For example, in a case that the index #2 of the SS/PBCH block and the QCL type A+QCL type B are configured and/or indicated as one state of the TCI in a case that the terminal apparatus 1 receives the PDCCH, then at the time of reception of the PDCCH DMRS, the terminal apparatus 1 may receive the PDCCH DMRS and perform synchronization and channel estimation, with the Doppler shift, Doppler spread, average delay, delay spread, and reception spatial parameter in the reception of SS/PBCH block index #2 considered as the long term properties of the channels. At this time, the reference signal (in the example described above, the SS/PBCH block) indicated by the TCI may be referred to as a source reference signal, and the reference signal (in the above-described example, the PDCCH DMRS) affected by the long term property inferred from the long term property of the channel in a case that the source reference signal is received may be referred to as a target reference signal. Additionally, for the TCI, the RRC configures one or multiple TCI states and a combination of the source reference signal and the QCL type for each state, and the TCI may be indicated to the terminal apparatus 1 by using the MAC layer or DCI.

According to this method, operations of the base station apparatus 3 and the terminal apparatus 1 equivalent to beam management may be defined based on the QCL assumption for the spatial domain and radio resources (time and/or frequency) as beam management and beam indication/report.

The subframe will now be described. In the present embodiment, the followings are referred to as the subframe, but the subframe in the present embodiment may also be referred to as a resource unit, a radio frame, a time period, or a time interval.

Figure 3:
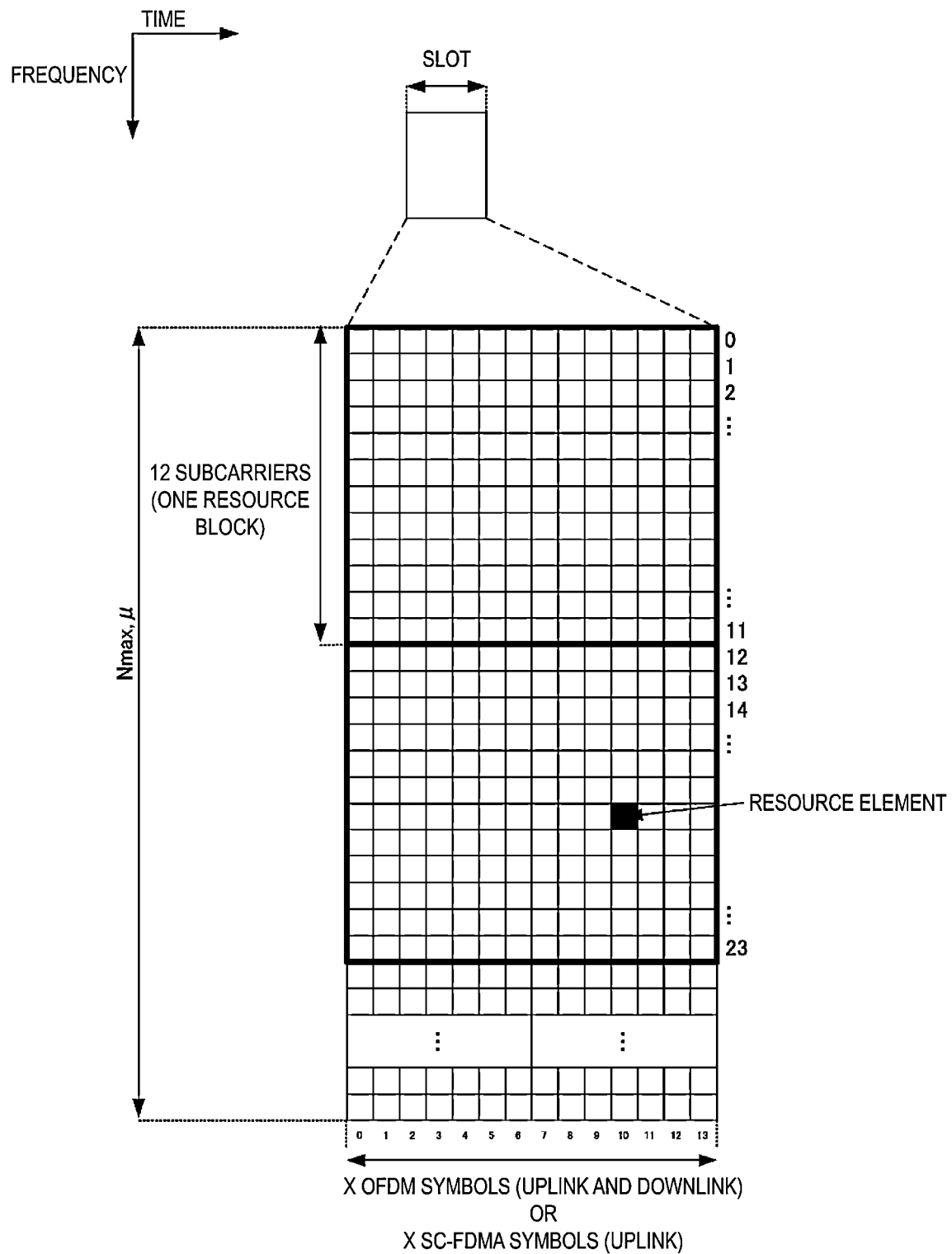
FIG. 3 is a diagram illustrating a schematic configuration of an uplink slot and a downlink slot according to an embodiment of the present invention.

FIG. 3 is a diagram illustrating a general configuration of an uplink and a downlink slots according to a first embodiment of the present invention. Each of the radio frames is 10 ms in length. Additionally, each of the radio frames includes 10 subframes and W slots. In addition, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. Additionally, for example, for X=14, W=10 in a case that the subcarrier spacing is 15 kHz, and W=40 in a case that the subcarrier spacing is 60 kHz. FIG. 3 illustrates a case of X=7 as an example. Note that the example in FIG. 3 may be similarly expanded to a case of X=14. Furthermore, the uplink slot is defined similarly, and the downlink slot and the uplink slot may be defined separately. Additionally, the bandwidth of the cell of FIG. 3 may also be defined as a part of the band (BandWidth Part (BWP)). In addition, the slot may be referred to as a Transmission Time Interval (TTI). The slot need not be defined as a TTI. The TTI may be a transmission period for transport blocks.

The signal or the physical channel transmitted in each of the slots may be represented by a resource grid. The resource grid is defined by multiple subcarriers and multiple OFDM symbols for each numerology (subcarrier spacing and cyclic prefix length) and for each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, for a subcarrier spacing of 15 kHz, in a case that the number X of OFDM symbols included in a subframe is 14 and NCPs are used, one physical resource block is defined by 14 continuous OFDM symbols in the time domain and by 12*Nmax continuous subcarriers in the frequency domain. Nmax is the maximum number of resource blocks (RBs) determined by a subcarrier spacing configuration p described below. In other words, the resource grid includes (14*12*Nmax, μ) resource elements. Extended CPs (ECPs) are supported only at a subcarrier spacing of 60 kHz, and thus one physical resource block is defined by 12 (the number of OFDM symbols included in one slot)*4 (the number of slots included in one subframe) in the time domain=48 continuous OFDM symbols, 12*Nmax, p continuous subcarriers in the frequency domain, for example. In other words, the resource grid includes (48*12*Nmax, p) resource elements.

As resource blocks (RBs), a reference resource block, a common resource block, a physical resource block, and a virtual resource block are defined. One resource block is defined as 12 subcarriers that are continuous in the frequency domain. Reference resource blocks are common to all subcarriers, and for example, resource blocks may be configured at a subcarrier spacing of 15 kHz and may be numbered in ascending order. Subcarrier index 0 at reference resource block index 0 may be referred to as reference point A (point A) (which may simply be referred to as a "reference point"). The common resource blocks are resource blocks numbered in ascending order from 0 at each subcarrier spacing configuration p starting at the reference point A. The resource grid described above is defined by the common resource blocks. The physical resource blocks are resource blocks numbered in ascending order from 0 included in a bandwidth part (BWP) described below, and the physical resource blocks are resource blocks numbered in ascending order from 0 included in the bandwidth part (BWP). A certain physical uplink channel is first mapped to a virtual resource block. Thereafter, the virtual resource block is mapped to a physical resource block. Hereinafter, the resource block may be a virtual resource block, a physical resource block, a common resource block, or a reference resource block.

Now, the subcarrier spacing configuration μ will be described. As described above, one or multiple OFDM numerologies are supported in NR. In a certain BWP, the subcarrier spacing configuration μ (μ=0, 1, . . . , 5) and the cyclic prefix length are given for a downlink BWP by the higher layer and for an uplink BWP by the higher layer. In this regard, given μ, a subcarrier spacing Δf is given by Δf=2^μ*15 (kHz).

At the subcarrier spacing configuration p, the slots are counted in ascending order from 0 to N^{subframe, μ}_{slot}−1 within the subframe, and counted in ascending order from 0 to N^{frame, μ}_{slot}−1 within the frame. N^{slot}_{symb} continuous OFDM symbols are in the slot, based on the slot configuration and the cyclic prefix. N^{slot}_{symb} is 14. The start of the slot n^{μ}_{s} within the subframe is temporally aligned with the start of the n^{μ}_{s}*N^{slot}_{symb}th OFDM symbol within the same subframe.

Figure 4:
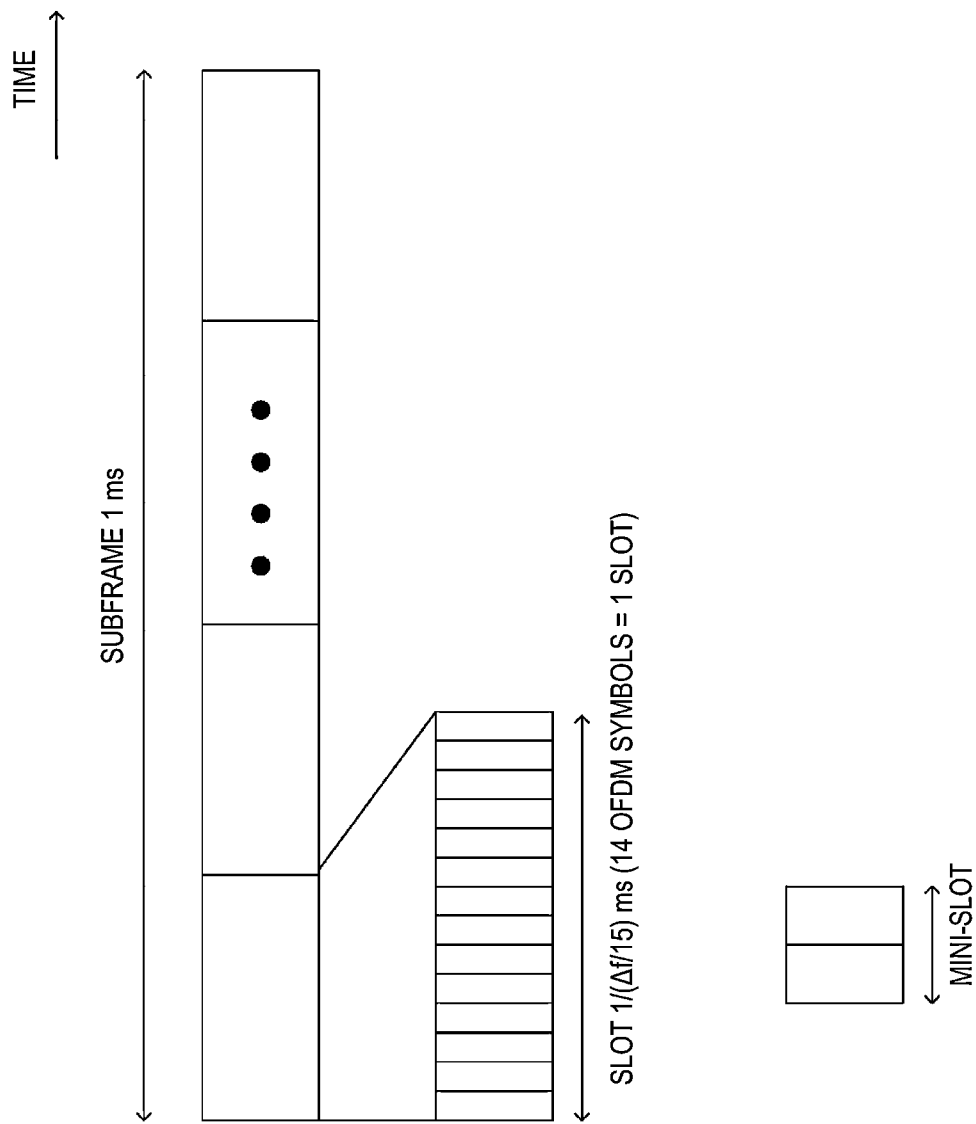
FIG. 4 is a diagram illustrating a relationship of a subframe, a slot, and a mini-slot in a time domain according to an embodiment of the present invention.

The subframe, the slot, and a mini-slot will now be described. FIG. 4 is a diagram illustrating an example of the relationship of a subframe, slots, and mini-slots in the time domain. As illustrated in FIG. 4, three types of time units are defined. The subframe is 1 ms regardless of the subcarrier spacing. The number of OFDM symbols included in the slot is 7 or 14 (however, the number may be 6 or 12 in a case that the cyclic prefix (CP) added to each symbol is an Extended CP), and the slot length depends on the subcarrier spacing. Here, in a case that the subcarrier spacing is 15 kHz, 14 OFDM symbols are included in one subframe. The downlink slot may be referred to as PDSCH mapping type A. The uplink slot may be referred to as PUSCH mapping type A.

The mini-slot (which may be referred to as a subslot) is a time unit including OFDM symbols that are less in number than the OFDM symbols included in one slot. FIG. 4 illustrates, by way of example, a case in which the mini-slot includes 2 OFDM symbols. The OFDM symbols in the mini-slot may match the timing for the OFDM symbols constituting the slot. Note that the minimum unit of scheduling may be a slot or a mini-slot. Additionally, allocation of mini-slots may be referred to as non-slot based scheduling. Mini-slots being scheduled may also be expressed as resources being scheduled for which the relative time positions of the start positions of the reference signal and the data are fixed. The downlink mini-slot may be referred to as PDSCH mapping type B. The uplink mini-slot may be referred to as PUSCH mapping type B.

In the terminal apparatus 1, the transmission direction (uplink, downlink, or flexible) of the symbols in each slot is configured by the higher layer by using an RRC message including a prescribed higher layer parameter received from the base station apparatus 3 or is configured by using the PDCCH of a specific DCI format (for example, DCI format 2_0) received from the base station apparatus 3. In the present embodiment, a slot format refers to a component making a configuration as to whether, for each slot, each symbol in the slot is an uplink symbol, a downlink symbol, or a flexible symbol. One slot format may include a downlink symbol, an uplink symbol, and a flexible symbol.

Figure 5:
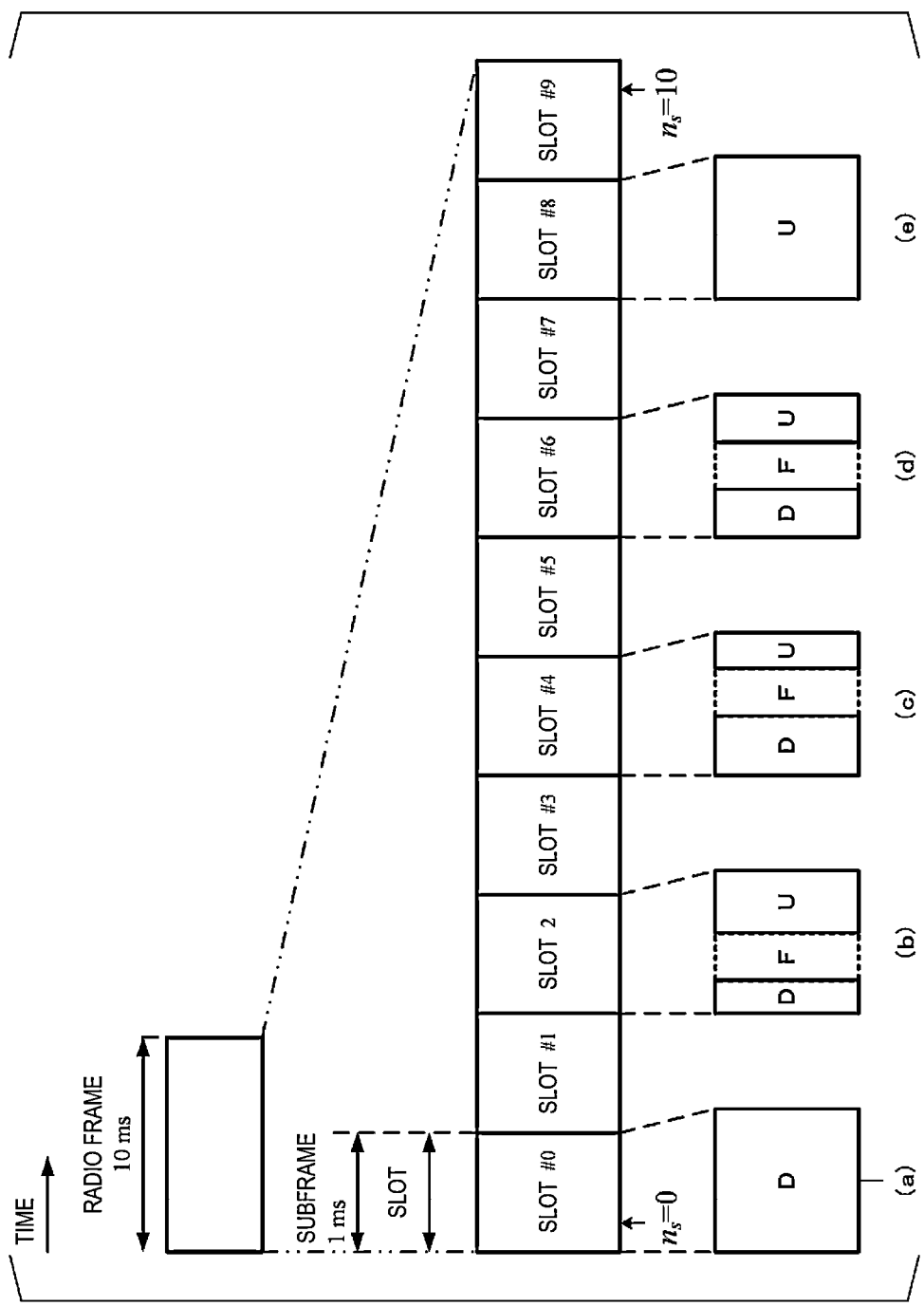
FIG. 5 is a diagram illustrating an example of a slot or a subframe according to an embodiment of the present invention.

FIG. 5 is a diagram illustrating an example of a slot format. In this regard, a case in which the slot length is 1 ms at a subcarrier spacing of 15 kHz is illustrated as an example. In FIG. 5, D represents the downlink, and U represents the uplink. As illustrated in FIG. 5, during a certain time period (for example, the minimum time period to be allocated to one UE in the system), one or multiple of the following types of symbols may be included:

downlink symbols, flexible symbols, and uplink symbols. Note that the ratio of these symbols in a certain slot may be preset as a slot format. Additionally, the ratio of these symbols in a certain slot may be defined by the number of downlink OFDM symbols included in the slot, and the start position and/or end position of the symbols within the slot. Additionally, the ratio of these symbols in a certain slot may be defined by the number of uplink OFDM symbols or DFT-S-OFDM symbols included in the slot or the start position and/or end position of the symbols within the slot. Note that the slot being scheduled for the terminal apparatus 1 may be expressed as scheduling of resources for which the relative temporal positions of the reference signal and a slot boundary are fixed.

In a case that the higher layer parameter TDD-UL-DL-ConfigurationCommon is provided, the terminal apparatus 1 sets the slot format for each of one or multiple slots as indicated by TDD-UL-DL-ConfigurationCommon. TDD-UL-DL-ConfigurationCommon provides the following parameters.

Reference subcarier spacing (SCS) configuration $\mu_{ref}$

Slot format pattern 1

Slot format pattern 1 provides the following parameters:

Configuration period P of slots (milliseconds)

Number $d_{slots}$ of slots including only downlink symbols within the configuration period P of slots (downlink slots)

Number $d_{sym}$ of downlink symbols excluding symbols within the downlink slots within the configuration period P of the slot Number $u_{slots}$ of slots including only uplink symbols within the configuration period P of slots (uplink slots)

Number $u_{sym}$ of uplink symbols excluding symbols within the uplink slots within the configuration period P of the slot The configuration period P of slots (milliseconds) includes ($S=P*2^{(\mu_{ref})}$) slots in the reference SCS configuration $\mu_{ref}$. Within S slots, the first $d_{slots}$ slots include only downlink symbols, and the last $u_{slots}$ slots include only uplink symbols. The $d_{sym}$ symbols following the first $d_{slots}$ symbols are downlink symbols, and the $u_{sym}$ symbols preceding the last $u_{slots}$ are uplink symbols. The remaining symbols in the S slots are flexible symbols.

TDD-UL-DL-ConfigurationCommon may provide, in addition to slot format pattern 1, slot format pattern 2. Slot format pattern 2 may include parameters similar to those of slot format pattern 1, and the parameters may be configured with values different from the values of the respective parameters of slot format pattern 1. Slot format pattern 2 includes $S_2$ slots, and provides a configuration for a slot format in $S_2$ slots following the S slots.

Based on slot format pattern 1 and/or the slot format pattern 2 provided in TDD-UL-DL-ConfigurationCommon, the terminal apparatus 1 sets the slot format for each slot for every S slots (in a case that only the slot format pattern 1 is provided) or for every (S+$S_2$) slots (in a case that slot format pattern 1 and slot format pattern 2 are provided). However, a parameter indicating other slot format pattern including similar parameters (e.g., slot format pattern 3 indicating a slot format for $S_3$ slots) may be provided, and a slot format of each slot may be set. However, in a case that a reference SCS configuration $\mu_{ref}$ indicated by TDD-UL-DL-ConfigurationCommon differs from an SCS configuration $\mu$ of a DL BWP or an UL BWP described below, the terminal apparatus 1 may apply, to continuous $2^{(\mu-\mu_{ref})}$ symbols of the DL BWP or UL BWP, the transmission direction of each symbol in the slot format set by TDD-UL-DL-ConfigurationCommon.

In a case that the terminal apparatus 1 is provided with the higher layer parameter TDD-UL-DL-ConfigurationDedicated, the terminal apparatus 1 may overwrite flexible symbols in the slot format of multiple slots set by the higher layer parameter TDD-UL-DL-ConfigurationCommon with uplink symbols, downlink symbols, or the flexible symbols.

An RRC message including TDD-UL-DL-ConfigurationCommon and/or TDD-UL-DL-ConfigurationDedicated may be referred to as an RRC message including higher layer slot format configuration information, and setting the slot format (uplink symbol/downlink symbol/flexible symbol) using TDD-UL-DL-ConfigurationCommon and/or TDD-UL-DL-ConfigurationDedicated may be referred to as setting the slot format (uplink symbol/downlink symbol/flexible symbol) based on higher layer slot format configuration information.

The terminal apparatus 1 considers symbols indicated as downlink by the higher layer slot format configuration information (also referred to as semi-static downlink symbols) to be available for reception, and does not transmit an uplink signal (e.g., the PUSCH, the PUCCH, the PRACH, and/or the SRS). The terminal apparatus 1 considers symbols indicated as uplink by the higher layer slot format configuration information (also referred to as semi-static uplink symbols) to be available for transmission, and does not receive a downlink signal (e.g., the PDCCH, the PDSCH, or the CSI-RS).

In a case that the terminal apparatus 1 is not configured with monitoring of the PDCCH for a DCI format (e.g., DCI format 2_0) configuring the slot format, the terminal apparatus 1 may receive a downlink signal (e.g., the PDSCH or the CSI-RS) specified in a prescribed DCI format (e.g., DCI format 1_0, 1_1, or 0_1) or transmit an uplink signal (e.g., the PUSCH, the PUCCH, the PRACH, or the SRS) specified in the prescribed DCI format (e.g., DCI format 0_0, 0_1, 1_0, 1_1, or 2_3), in symbols indicated as flexible in the higher layer slot format configuration information (also referred to as semi-static flexible symbols) (which may include any symbols in a case that no higher layer slot format configuration information is provided).

In a case that the terminal apparatus 1 is not configured with monitoring of the PDCCH for a DCI format (e.g., DCI format 2_0) configuring the slot format and that the terminal apparatus is configured with reception of a downlink signal (e.g., the PDCCH, the PDSCH, or the CSI-RS) in a set of symbols corresponding to the higher layer, in symbols indicated as flexible by the higher layer slot format configuration information (which may include any symbols in a case that no higher layer slot format configuration information is provided), then the terminal apparatus 1 receives the downlink signal in a case that a prescribed DCI format (e.g., DCI format 0_0, 0_1, 1_0, 1_1, or 2_3) indicating transmission of an uplink signal (e.g., the PUSCH, the PUCCH, the PRACH, or the SRS) is not detected in any one symbol in the set of symbols, and otherwise does not receive the downlink signal in the set of symbols.

In a case that the terminal apparatus 1 is not configured with monitoring of the PDCCH for a DCI format (e.g., DCI format 2_0) including a slot format indicator (SFI) and that the terminal apparatus is configured with transmission of an uplink signal (e.g., the SRS, the PUCCH, the PUSCH, or the PRACH) in a set of symbols corresponding to the higher layer, in symbols indicated as flexible by the higher layer slot format configuration information (which may include any symbols in a case that no higher layer slot format configuration information is provided), then the terminal apparatus 1 transmits the uplink signal in a case that a prescribed DCI format (e.g., DCI format 1_0, 1_1, or 0_1) indicating reception of a downlink signal (e.g., the CSI-RS or the PDSCH) is not detected in any one symbol in the set of symbols.

In a case that the terminal apparatus 1 is configured with a higher layer parameter SlotFormatIndicator by the higher layer, the terminal apparatus 1 monitors a DCI format (e.g., DCI format 2_0) including a slot format indicator (SFI) field. The DCI format including the SFI field may be referred to as slot format configuration DCI or slot format configuration information based on the PDCCH.

The value of the SFI field in the DCI format indicates, to the terminal apparatus 1, a combination (slot format combination) of slot formats of respective multiple slots starting with the slot in which the DCI format is detected. The value of the SFI field indicates an index value corresponding to one of the set of slot format combinations configured by the higher layer.

The terminal apparatus 1 is configured with the parameters described below for each serving cell by the SlotFormatIndicator.

Identifier of the serving cell

Position of the corresponding SFI field within the DCI format

The set of slot format combinations (each slot format combination indicates a combination of the indexes of the slot formats corresponding to the respective multiple slots from among a table of slot formats given in advance)

Reference SCS configuration in FDD (reference SCS configuration) $\mu_{SFI}$

Reference SCS configuration $\mu_{SFI,\ DL}$ of DL BWP in TDD and reference SCS configuration $\mu_{SFI,\ UL}$ of UL BWP FIG. 6 is a diagram illustrating an example of the table of slot formats according to the present embodiment. The table in FIG. 6 indicates 256 slot formats to which indexes 0 to 255 are assigned (although slot formats with indexes 5 to 254 are omitted in FIG. 6). For each slot format, in "Symbol number in a slot," the index in the slot corresponds to symbol 0 to symbol 13, D denotes a downlink symbol (also referred to as a dynamic downlink symbol), U denotes an uplink symbol (also referred to as a dynamic uplink symbol), and F denotes a flexible symbol (also referred to as a dynamic flexible symbol). In addition, the table of slot formats may include a slot format index that determines the slot format based on the higher layer slot format configuration information without directly indicating a slot format, as is the case with slot format index 255 in FIG. 6.

In FDD, the downlink symbols, uplink symbols, and flexible symbols in the reference SCS configuration $\mu_{SFI}$ in each slot format in the slot format combination indicated by the value of SFI field respectively correspond to continuous $2^{(\mu-\mu_{SFI})}$ downlink symbols, uplink symbols, and flexible symbols in the SCS configuration p.

In TDD, in a case that $\mu_{SFI,\ DL} > \mu_{SFI,\ UL}$, then for $2^{(\mu_{SFI,\ DL}-\mu_{SFI,\ UL})}+1$ slot formats in the slot format combination indicated by the SFI field value, the first $2^{(\mu_{SFI,\ DL}-\mu_{SFI,\ DL})}$ slot formats are applied to the reference DL BWP, and the next one slot format is applied to the reference UL BWP. In TDD, in a case that $\mu_{SFI,\ DL} < \mu_{SFI,\ DL}$, then for $2^{(\mu_{SFI,\ UL}-\mu_{SFI,\ DL})}+1$ slot formats in the slot format combination indicated by the SFI field value, the first one slot format is applied to the reference DL BWP, and the next $2^{(\mu_{SFI,\ UL}-\mu_{SFI,\ DL})}$ slot formats are applied to the reference UL BWP.

In TDD, the downlink symbols, uplink symbol, and flexible symbols in the reference SCS configuration $\mu_{SFI,\ DL}$ in each slot format of the reference DL BWP in the slot format combination indicated by the value of SFI field respectively correspond to continuous $2^{(\mu_{DL}-\mu_{SFI,\ DL})}$ downlink symbols, uplink symbols, and flexible symbols in the active DL BWP of the SCS configuration $\mu_{DL}$, and the downlink symbols, uplink symbols, and flexible symbols in the reference SCS configuration $\mu_{SFI,\ UL}$ in each slot format of the reference UL BWP respectively correspond to continuous $2^{(\mu_{UL}-\mu_{SFI,\ UL})}$ downlink symbols, uplink symbols, and flexible symbols of the active UL BWP in the SCS configuration $\mu_{UL}$.

The terminal apparatus 1 may receive a downlink signal or a downlink channel in the downlink symbols or the flexible symbols. The terminal apparatus 1 may transmit an uplink signal or a downlink channel in the uplink symbols or the flexible symbols.

FIG. 5(*a*) corresponds to an example in which in a certain time period (which may be referred to as, for example, the minimum unit of time resources that can be allocated to one UE, a time unit, or the like. Additionally, multiple minimum units of time resources may collectively be referred to as a time unit), all symbols are used for downlink transmission. In FIG. 5(*b*), the first time resource is used to, for example, schedule the uplink via the PDCCH, and the uplink signal is transmitted via flexible symbols including processing delay of the PDCCH, the time for switching from downlink to uplink, and generation of a transmit signal. In FIG. 5(*c*), the slot is used such that in the first time resource, the PDCCH and/or the downlink PDSCH is transmitted and that after a gap for a processing delay, a time for switching from downlink to uplink, and generation of a transmit signal, the PUSCH or PUCCH is transmitted. Here, for example, the uplink signal may be used to transmit the HARQ-ACK and/or CSI, namely, the UCI. In FIG. 5(*d*), the slot is used such that in the first time resource, the PDCCH and/or the PDSCH is transmitted and that after a gap for a processing delay, a time for switching from downlink to uplink, and generation of a transmit signal, the uplink PUSCH and/or PUCCH is transmitted. Here, for example, the uplink signal may be used to transmit the uplink data, namely, the UL-SCH. In FIG. 5(*e*), the entire slot is used for uplink transmission (PUSCH or PUCCH).

The above-described downlink part and uplink part may include multiple OFDM symbols as is the case with LTE.

Figure 7:
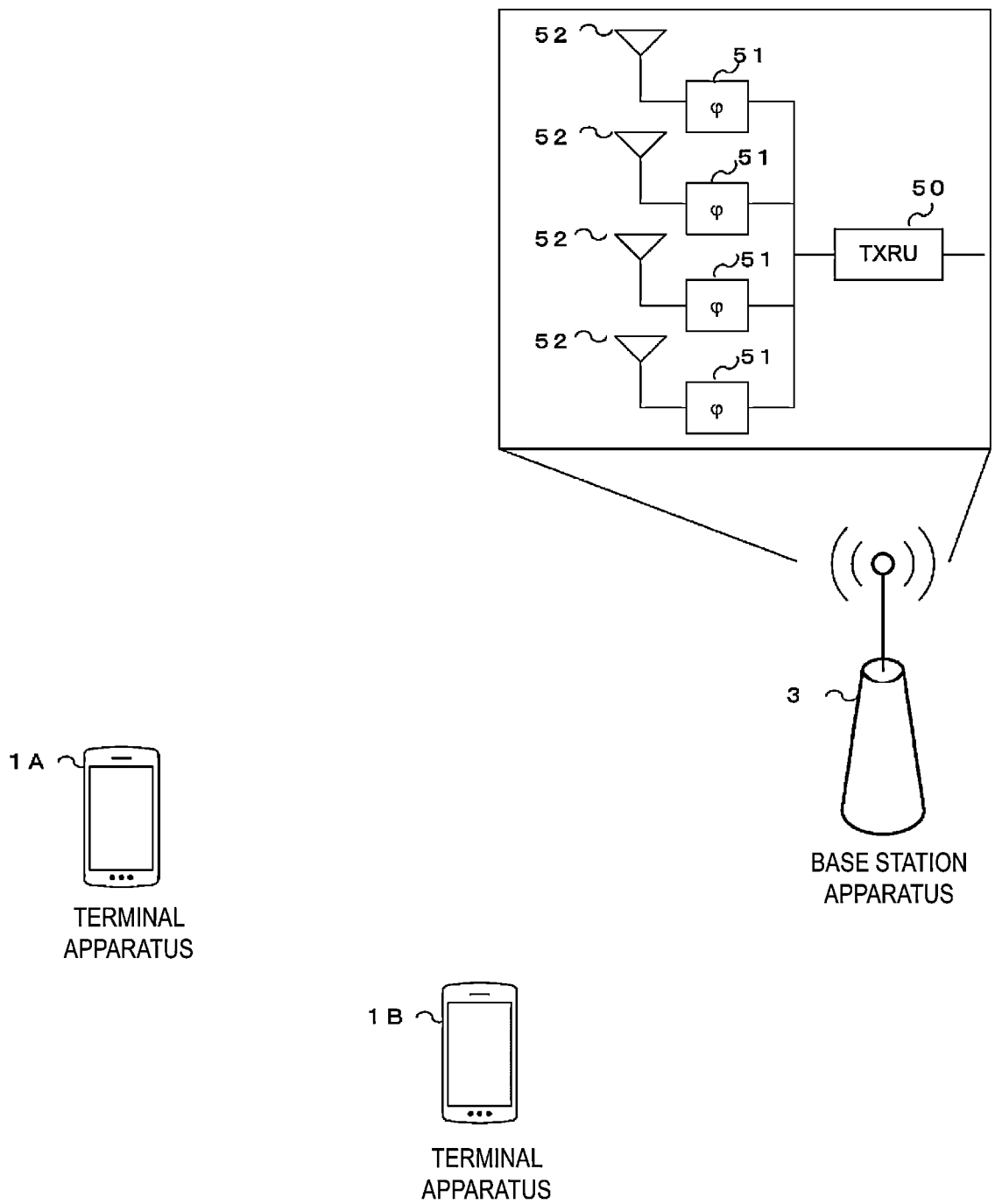
FIG. 7 is a diagram illustrating an example of beamforming according to an embodiment of the present invention.

FIG. 7 is a diagram illustrating an example of beamforming. Multiple antenna elements are connected to one Transmission unit (Transceiver unit (TXRU)) 50. The phase is controlled by using a phase shifter 51 for each antenna element and a transmission is performed from an antenna element 52, thus allowing a beam for a transmit signal to be directed in any direction. Typically, the TXRU may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

Hereinafter, the bandwidth part (BWP) will be described. The BWP is also referred to as a carrier BWP. The BWP may be configured for each of the downlink and the uplink. The BWP is defined as a set of continuous physical resources selected from continuous subsets of common resource blocks. The terminal apparatus 1 can be configured with up to four BWPs such that one downlink carrier BWP (DL BWP) is activated at a certain time. The terminal apparatus 1 can be configured with up to four BWPs such that one uplink carrier BWP (UL BWP) is activated at a certain time. In a case of carrier aggregation, the BWP may be configured in each serving cell. At this time, one BWP being configured in a certain serving cell may be expressed as "no BWP being configured." Two or more BWPs being configured may also be expressed as the "BWP being configured."

MAC Entity Operation

An activated serving cell always includes one active (activated) BWP. BWP switching for a certain serving cell is used to activate an inactive (deactivated) BWP and to deactivate an active (activated) BWP. BWP switching for a certain serving cell is controlled by the PDCCH indicating downlink allocation or uplink grant. BWP switching for a certain serving cell may be further controlled by a BWP inactivity timer or RRC signaling, or by the MAC entity itself at the initiation of a random access procedure. In the addition of the SpCell (PCell or PSCell) or the activation of the SCell, one of the BWPs is a first active BWP without reception of the PDCCH indicating downlink allocation or uplink grant. A first active DL BWP and a first active UL BWP may be designated in an RRC message sent from the base station apparatus 3 to the terminal apparatus 1. The active BWP for a certain serving cell is designated in the RRC or PDCCH sent from the base station apparatus 3 to the terminal apparatus 1. Additionally, the first active DL BWP and the first active UL BWP may be included in the message 4. In an unpaired spectrum (TDD bands or the like), the DL BWP and the UL BWP are paired, and the BWP switching is common to the UL and DL. In the active BWP for each of the activated serving cells for which the BWP is configured, the MAC entity of the terminal apparatus 1 applies normal processing. The normal processing includes transmitting a UL-SCH, transmitting an RACH, monitoring the PDCCH, transmitting the PUCCH, transmitting the SRS, and receiving the DL-SCH. In the inactive BWP for each of the activated serving cells for which the BWP is configured, the MAC entity of the terminal apparatus 1 does not transmit the UL-SCH, does not transmit the RACH, does not monitor the PDCCH, does not transmit the PUCCH, does not transmit the SRS, and does not receive the DL-SCH. In a case that a certain serving cell is deactivated, the active BWP may be configured to be absent (e.g., the active BWP is deactivated).

RRC Operation

BWP information elements (IEs) included in the RRC message (broadcast system information or information sent in a dedicated RRC message) is used to configure the BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one uplink BWP (such as a case that the serving cell is configured with the uplink) or two uplink BWPs (such as a case that a supplementary uplink is used). Furthermore, the network may configure an additional uplink BWP or downlink BWP for a certain serving cell. The BWP configuration is divided into uplink parameters and downlink parameters. Additionally, the BWP configuration is also divided into common parameters and dedicated parameters. The common parameters (such as a BWP uplink common IE and a BWP downlink common IE) are cell specific. The common parameters for the initial BWP of the primary cell are also provided by using system information. For all the other serving cells, the network provides the common parameters through dedicated signals. The BWP is identified by a BWP ID. For the initial BWP, the BWP ID is 0. For each of the other BWPs, the BWP ID takes a value ranging from 1 to 4.

In a case that the higher layer parameter initialDownlinkBWP is not configured (provided) for the terminal apparatus 1, an initial DL BWP (initial active DL BWP) may be defined by the position and number of continuous PRBs, the subcarrier spacing, and the cyclic prefix for PDCCH reception in a control resource set (CORESET) for a Type0-PDCCH common search space. The position of each of the continuous PRBs corresponds to the PRBs in the control resource set for the Type0-PDCCH common search space, and starts with the PRB with the smallest index and ends with the PRB with the largest index. In a case that the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in the SIB 1 (systemInformationBlockType1, ServingCellConfigCommonSIB) or ServingCellConfigCommon. The information element ServingCellConfigCommonSIB is used to configure a cell-specific parameter for the serving cell for the terminal apparatus 1 in SIB1.

In other words, in a case that the higher layer parameter initialDownlinkBWP is not configured (provided) for the terminal apparatus 1, the size of the initial DL BWP may correspond to the number of resource blocks in the control resource set (CORESET #0) for the Type0-PDCCH common search space. In a case that the higher layer parameter initialDownlinkBWP is configured (provided) for the terminal apparatus 1, the size of the initial DL BWP may be given by locationAndBandwidth included in the higher layer parameter initialDownlinkBWP. The higher layer parameter locationAndBandwidth may indicate the location and bandwidth of the frequency domain of the initial DL BWP.

As described above, multiple DL BWPs may be configured for the terminal apparatus 1. In the DL BWPs configured for the terminal apparatus 1, a default DL BWP can be configured by a higher layer parameter defaultDownlinkBWP-Id. In a case that the higher layer parameter defaultDownlinkBWP-Id is not provided for the terminal apparatus 1, the default DL BWP is the initial DL BWP.

The terminal apparatus 1 may be provided with an initial UL BWP by SIB1 (systemInformationBlockType1) or initialUplinkBWP. The information element initialUplinkBWP is used to configure the initial UL BWP. For an operation on the SpCell or the secondary cell, the initial UL BWP (initial active UL BWP) may be configured (provided) for the terminal apparatus 1 by the higher layer parameter initialUplinkBWP. In a case that a supplementary uplink carrier (supplementary UL carrier) is configured for the terminal apparatus 1, the initial UL BWP in the supplementary uplink carrier may be configured for the terminal apparatus 1 by initialUplinkBWP included in the higher layer parameter supplementaryUplink.

The control resource set (CORESET) in the present embodiment will be described below.

The control resource set (CORESET) includes time and frequency resources for a search for downlink control information. The configuration information of the CORESET includes the identifier of the CORESET (ControlResourceSetId, CORESET-ID) and information identifying the frequency resource for the CORESET. The information element ControlResourceSetId (the identifier of the CORESET) is used to identify the control resource set in a certain serving cell. The identifier of the CORESET is used among the BWPs in a certain serving cell. The identifier of CORESET is unique among the BWPs in the serving cell. The number of CORESETs in each BWP is limited to three, including the initial CORESET. In a certain serving cell, the value of the identifier of each CORESET takes a value ranging from 0 to 11.

The control resource set identified by the identifier 0 (ControlResourceSetId 0) of the CORESET is referred to as CORESET #0. CORESET #0 may be configured by pdcch-ConfigSIB1 included in the MIB or PDCCH-ConfigCommon included in ServingCellConfigCommon. In other words, the configuration information of CORESET #0 may be pdcch-ConfigSIB1 included in the MIB or PDCCH-ConfigCommon included in ServingCellConfigCommon. The configuration information of CORESET #0 may be configured by controlResourceSetZero included in the PDCCH-ConfigSIB1 or PDCCH-ConfigCommon. In other words, the information element controlResourceSetZero is used to indicate CORESET #0 (common CORESET) of the initial DL BWP. The CORESET denoted by pdcch-ConfigSIB1 is CORESET #0. The information element pdcch-ConfigSIB1 in the MIB or the dedicated configuration is used to configure the initial DL BWP. CORESET configuration information pdcch-ConfigSIB1 for CORESET #0 does not include information explicitly identifying the identifier of the CORESET and the frequency resource (e.g., the number of continuous resource blocks) and the time resource (the number of continuous symbols) for the CORESET, but the frequency resource (e.g., the number of continuous resource blocks) and time resource (the number of continuous symbols) for the CORESET for CORESET #0 can be implicitly identified by information included in pdcch-ConfigSIB1. The information element PDCCH-ConfigCommon is used to configure a cell-specific PDCCH parameter provided by using the SIB. Additionally, PDCCH-ConfigCommon may also be provided in a case that handover and the PSCell and/or the SCell are added. The configuration information of CORESET #0 is included in the configuration of the initial BWP. That is, the configuration information of CORESET #0 need not be included in the configuration of the BWP other than the initial BWP. controlResourceSetZero corresponds to four bits in pdcch-ConfigSIB1 (e.g., four MSB bits, four most significant bits). CORESET #0 is a control resource set for Type0-PDCCH common search space.

The configuration information of the additional common control resource (additional common CORESET) set may be configured by commonControlResourceSet included in PDCCH-ConfigCommon. Additionally, the configuration information of the additional common CORESET may also be used to specify additional common CORESET for system information and/or a paging procedure. The configuration information of the additional common CORESET may be used to specify an additional common CORESET used in a random access procedure. The configuration information of the additional common CORESET may be included in the configuration of each BWP. The identifier of the CORESET indicated in commonControlResourceSet takes a value other than 0.

The common CORESET may be a CORESET used in the random access procedure (e.g., an additional common CORESET). Additionally, in the present embodiment, the common CORESET may include CORESET #0 and/or the CORESET configured by the configuration information of the additional common CORESET. In other words, the common CORESET may include CORESET #0 and/or the additional common CORESET. CORESET #0 may be referred to as common CORESET #0. Also in the BWP other than the BWP for which the common CORESET is configured, the terminal apparatus 1 may reference (acquire) the configuration information of the common CORESET.

The configuration information of the one or multiple CORESETs may be configured by PDCCH-Config. The information element PDCCH-Config is used to configure UE-specific PDCCH parameters (e.g., CORESET, a search space, etc.) for a certain BWP. PDCCH-Config may be included in the configuration of each BWP.

In other words, in the present embodiment, the configuration information of the common CORESET indicated by the MIB is pdcch-ConfigSIB1, and the configuration information of the common CORESET indicated by PDCCH-ConfigCommon is controlResourceSetZero, and the configuration information of the common CORESET (additional common CORESET) indicated by PDCCH-ConfigCommon is commonControlResourceSet. Additionally, the configuration information of one or multiple CORESETs (UE specifically configured Control Resource Sets, UE-specific CORESETs) indicated by PDCCH-Config is controlResourceSetToAddModList.

The search space is defined to search for PDCCH candidates. searchSpaceType included in the search space configuration information indicates whether the search space is a Common Search Space (CSS) or a UE-specific Search Space (USS). The UE-specific search space is derived at least from the value of the C-RNTI set by the terminal apparatus 1. In other words, the UE-specific search space is derived separately for each terminal apparatus 1. The common search space is a search space common to the multiple terminal apparatuses 1, and includes a Control Channel Element (CCE) with a prescribed index. The CCE includes multiple resource elements. The configuration information of the search space includes information regarding a DCI format monitored in the search space.

The configuration information of the search space includes the identifier of the CORESET identified by the configuration information of the CORESET. The CORESET identified by the identifier of the CORESET included in the configuration information of the search space is associated with the search space. In other words, the CORESET associated with the search space is the CORESET identified by the identifier of the CORESET included in the search space. The DCI format indicated by the configuration information of the search space is monitored by the associated CORESET. Each search space is associated with a single CORESET. For example, the configuration information of the search space for the random access procedure may be configured by ra-SearchSpace. In other words, the CORESET associated with ra-SearchSpace is used to monitor the DCI format provided with a CRC scrambled with the RA-RNTI or TC-RNTI is added.

The terminal apparatus 1 monitors the set of candidates for the PDCCH in one or multiple CORESETs allocated in each active serving cell configured to monitor the PDCCH.

The set of candidates for the PDCCH corresponds to one or multiple search space sets. "Monitoring" may mean decoding of candidates for the respective PDCCHs in accordance with one or multiple DCI formats to be monitored. The set of candidates for the PDCCH monitored by the terminal apparatus 1 is defined by the PDCCH search space sets. One search space set is a common search space set or a UE-specific search space set. In the above, the search space set is referred to as a search space, the common search space set is referred to as a common search space, and the UE-specific search space set is referred to as a UE-specific search space. The terminal apparatus 1 monitors the PDCCH candidates by using one or multiple search space sets described below. —Type0-PDCCH common search space set (Type0 common search space): the search space set is configured by a search space SIB1 (searchSpaceSIB1) indicated by pdcch-ConfigSIB1 or PDCCH-ConfigCommon indicated by the MIB, or searchSpaceZero included in PDCCH-ConfigCommon, searchSpaceSIB1 and searchSpaceZero corresponding to higher layer parameters. The search space is for monitoring of the DCI format with the CRC scrambled with SI-RNRI in the primary cell. —Type0A-PDCCH common search space set (Type0A common search space): the search space set is configured by a search space (searchSpaceOtherSystemInformation) corresponding to a higher layer parameter and indicated by PDCCH-ConfigCommon. The search space is for monitoring of the DCI format with the CRC scrambled with SI-RNRI in the primary cell. —Type1-PDCCH common search space set (Type1 common search space): the search space set is configured by a search space for a random access procedure (ra-SearchSpace) corresponding to a higher layer parameter and indicated by PDCCH-ConfigCommon. The search space is for monitoring of the DCI format with the CRC scrambled with RA-RNRI or TC-RNTI in the primary cell. Type1-PDCCH common search space set is a search space set for the random access procedure. —Type2-PDCCH common search space set (Type2 common search space): the search space set is configured by a search space for the paging procedure (pagingSearchSpace) corresponding to a higher layer parameter and indicated by PDCCH-ConfigCommon. The search space is for monitoring of the DCI format with the CRC scrambled with P-RNTI in the primary cell. —Type3-PDCCH common search space set (Type3 common search space): the search space set is configured by a search space of a common search space type (SearchSpace) corresponding to a higher layer parameter and indicated by PDCCH-Config. The search space is for monitoring of the DCI format with the CRC scrambled with NT-RNTI, SFI-RNTI, TPC-PUSCH-RNTI, TPC-PUCCH-RNTI, or TPC-SRS-RNTI. For the primary cell, the search space is for monitoring of the DCI format with the CRC scrambled with C-RNTI, CS-RNTI(s), or MCS-C-RNTI. —UE-specific search space set: the search space set is configured by a search space of a UE-specific search space type (SearchSpace) corresponding to a higher layer parameter and indicated by PDCCH-Config. The search space is for monitoring of the DCI format with the CRC scrambled with C-RNTI, CS-RNTI(s), or MCS-C-RNTI.

In a case that the terminal apparatus 1 is provided with one or multiple search space sets by the corresponding higher layer parameter (searchSpaceZero, searchSpaceSIB1, searchSpaceOtherSystemInformation, pagingSearchSpace, ra-SearchSpace, etc.) and provided with C-RNTI or CS-RNTI, the terminal apparatus 1 may use the one or multiple search space sets to monitor PDCCH candidates for DCI format 0_0 and DCI format 1_0 with the C-RNTI or CS-RNTI.

The configuration information of the BWP is divided into the configuration information of the DL BWP and the configuration information of the UL BWP. The configuration information of the BWP includes an information element bwp-Id (identifier of the BWP). The identifier of the BWP included in the configuration information of the DL BWP is used to identify (reference) the DL BWP in a certain serving cell. The identifier of the BWP included in the configuration information of the UL BWP is used to identify (reference) the UL BWP in a certain serving cell. The identifier of the BWP is assigned to each of the DL BWP and UL BWP. For example, the identifier of the BWP corresponding to the DL BWP may be referred to as a DL BWP index. The identifier of the BWP corresponding to the UL BWP may be referred to as a UL BWP index. The initial DL BWP is referenced by identifier 0 of the DL BWP. The initial UL BWP is referenced by identifier 0 of the UL BWP. Each of the other DL BWPs or the other UL BWPs may be referenced by any of the identifiers of the BWPs ranging from 1 to maxNrofBWPs. In other words, the identifier of the BWP set to 0 (bwp-Id=0) is associated with the initial BWP and prevented from being used for the other BWPs. maxNrofBWPs is the maximum number of BWPs per serving cell and is 4. In other words, each of the identifiers of the other BWPs takes a value ranging from 1 to 4. Other higher layer configuration information is associated with a particular BWP by utilizing the identifier of the BWP. The DL BWP and UL BWP having the same BWP identifier may mean that the DL BWP and UL BWP are paired.

For the terminal apparatus 1, one primary cell and up to 15 secondary cells may be configured.

A procedure for transmitting the PUSCH will be described below.

A repetition transmission of a PUSCH to which a first repetition transmission scheme according to the present embodiment is applied will be described. The first repetition transmission scheme is a scheme in which one PUSCH (for example, one transport block) is continuously repeatedly transmitted in the time domain in uplink resources available for transmission of the PUSCH. For example, by allocating multiple time resources to one transport block and coding and transmitting the transport block in accordance with each of the multiple time resources, the same transport block is repeatedly transmitted a number of times equal to the number of multiple time resources used for transmission.

In response to detection of the PDCCH including DCI format 0_0, DCI format 0_1, or DCI format 0_2, the terminal apparatus 1 may transmit the corresponding PUSCH. In other words, the corresponding PUSCH may be scheduled (indicated) by the DCI format (DCI). For example, in a case of transmitting the PUSCH scheduled by DCI format 0_2 within the PDCCH CRC scrambled with a prescribed RNTI (e.g., C-RNTI, MCS-C-RNTI, or CS-RNTI with NDI=1), the terminal apparatus 1 may apply the first repetition transmission scheme to transmit the PUSCH. For example, in a case of transmitting the PUSCH scheduled by DCI format 0_2 within the PDCCH CRC scrambled with a prescribed RNTI (e.g., C-RNTI, MCS-C-RNTI, or CS-RNTI with NDI=1), the terminal apparatus 1 may apply the first repetition transmission scheme to transmit the PUSCH in a case that a prescribed parameter (for example, pusch-Aggregation-v16) is configured by the higher layer. For example, in a case of transmitting the PUSCH scheduled by DCI format 0_1 within the PDCCH CRC scrambled with a prescribed RNTI (e.g., C-RNTI, MCS-C-RNTI, or CS-RNTI with NDI=1), the terminal apparatus 1 may apply the first repetition transmission scheme to transmit the PUSCH in a case that a prescribed parameter (for example, pusch-Aggregation-v16) is configured by the higher layer. Additionally, the PUSCH may also be scheduled by RAR UL grant included in an RAR message. The start position (starting symbol) of the scheduled PUSCH may be defined as S. The starting symbol S of the PUSCH may be the symbol index of first symbol in which the PUSCH is transmitted (mapped) within a certain slot. For example, in a case that 14 symbols are included in the slot, the value available for S may range from 0 to 13. The starting symbol S indicates the order of the symbol with respect to the first symbol of the slot. For example, in a case that S has a value of 2, the terminal apparatus 1 may start transmission of the PUSCH in the third symbol of the certain slot. The number of continuous symbols of the scheduled PUSCH is referred to as L. The number of continuous symbols L is counted from the starting symbol S. Determination of S and L allocated to the PUSCH will be described later. However, in a case that the first repetition transmission scheme is applied to transmission of the PUSCH, the S may be the index of the starting symbol of the first PUSCH to be repeatedly transmitted. However, in a case that the first repetition transmission scheme is applied to transmission of the PUSCH, the L may be a nominal number of symbols for the PUSCH to be repeatedly transmitted. For example, in a case that the first repetition transmission scheme is applied to transmission of the PUSCH, the number of symbols used for one PUSCH to be repeatedly transmitted may have a value different from the value of the number of symbols indicated by L. For example, in a case that the first repetition transmission scheme is applied to transmission of the PUSCH, the maximum value of the number of symbols available for one PUSCH to be repeatedly transmitted may be L. In response to detection of DCI format 0_2, the terminal apparatus 1 may transmit corresponding multiple PUSCHs.

The type of PUSCH mapping may include the PUSCH mapping type A and the PUSCH mapping type B. For the PUSCH mapping type A, S has a value of 0. L takes a value ranging from 4 to 14. However, the sum of S and L takes a value ranging from 4 to 14. For the PUSCH mapping type B, S takes a value ranging from 0 to 13. L takes a value ranging from 1 to 14. However, the sum of S and L may be limited to a value ranging from 1 to 14. However, the sum of S and L need not be limited under prescribed conditions. For example, in a case that a certain higher layer parameter is configured, the sum of S and L is not limited. In a case that the higher layer parameter is not configured, the sum of S and L may be limited. However, in a case that a certain higher layer parameter is configured, a different mapping type (for example, the PUSCH mapping type C) may be configured instead of the PUSCH mapping type B. The PUSCH mapping type C may be a mapping type corresponding to allocation in a mini-slot unit similarly to the PUSCH mapping type B. For example, for the PUSCH mapping type B, the sum of S and L may be limited to a value from 1 to 14, and for the PUSCH mapping type C, the sum of S and L need not be limited. The description regarding the PUSCH mapping type B below may be applied to the PUSCH mapping type C.

The position of the DMRS symbol for the PUSCH may depend on the type of the PUSCH mapping. The position of the first DMRS symbol (first DM-RS symbol) for the PUSCH may depends on the type of the PUSCH mapping. For the PUSCH mapping type A, the position of the first DMRS symbol may be indicated in the higher layer parameter dmrs-TypeA-Position. For example, dmrs-TypeA-Position is set to one of 'pos2' or 'pos3'. For example, in a case that dmrs-TypeA-Position is set to 'pos2', the position of the first DMRS symbol for the PUSCH may correspond to the third symbol in the slot. For example, in a case that dmrs-TypeA-Position is set to 'pos3', the position of the first DMRS symbol for the PUSCH may correspond to the fourth symbol in the slot. For the PUSCH mapping type B and the PUSCH mapping type C, the position of the first DMRS symbol may correspond to the first symbol of the allocated PUSCH.

A method of identifying the PUSCH time domain resource allocation will be described below.

The base station apparatus 3 may use the DCI to perform scheduling such that the terminal apparatus 1 transmits the PUSCH. By detecting the DCI addressed to the terminal apparatus 1, the terminal apparatus 1 may transmit the PUSCH. In a case of identifying the PUSCH time domain resource allocation, the terminal apparatus 1 determines a resource allocation table to be applied to the corresponding PUSCH. The resource allocation table includes one or multiple PUSCH time domain resource allocation configurations. The terminal apparatus 1 may select one PUSCH time domain resource allocation configuration in the determined resource allocation table, based on the value indicated in the 'Time domain resource assignment' field included in the DCI scheduling the PUSCH. In other words, the base station apparatus 3 determines the PUSCH resource allocation for the terminal apparatus 1, generates a value for the 'Time domain resource assignment' field, and transmits, to the terminal apparatus 1, the DCI including the 'Time domain resource assignment' field. The terminal apparatus 1 identifies the resource allocation in the time domain for the PUSCH, based on the value set in the 'Time domain resource assignment' field.

FIG. 8 and FIG. 9 illustrate tables defining a selection rule for a resource allocation table to be applied to the PUSCH time domain resource allocation. The terminal apparatus 1 may determine/select, based on the higher layer parameter, DCI, and/or RNTI, whether to use, for the PUSCH time domain resource allocation, the table illustrated in FIG. 8 or the table illustrated in FIG. 9. For example, in a case that the higher layer parameter pusch-tdra-r16 is configured, the terminal apparatus 1 may determine/select the resource allocation table to be applied to the PUSCH time domain resource allocation by using the table illustrated in FIG. 9, and otherwise, the terminal apparatus 1 may determine/select the resource allocation table to be applied to the PUSCH time domain resource allocation by using the table illustrated in FIG. 8. However, the tables of FIG. 8 and FIG. 9 may be combined into one table. The terminal apparatus 1 may determine/select the resource allocation table to be applied to the PUSCH time domain resource allocation based on the RNTI, the PDCCH search space, the presence or absence of the prescribed higher layer parameter pusch-TimeDomainAllocationList or pusch-TimeDomainAllocationList2, and/or the configuration or the presence or absence of the higher layer parameter pusch-tdra-r16. The resource allocation table includes one or multiple PUSCH time domain resource allocation configurations. In the present embodiment, each resource allocation table is classified as one of (I) a predefined resource allocation table and (II) a resource allocation table configured from higher layer RRC signaling. The predefined resource allocation table is defined as a default PUSCH time domain resource allocation A and/or a default PUDSCH time domain resource allocation B. Hereinafter, the default PUSCH time domain resource allocation A is referred to as the PUSCH default table A, and the default PUSCH time domain resource allocation B is referred to as the PUSCH default table B.

FIG. 10 is a diagram illustrating an example of the PUSCH default table A for the Normal Cyclic Prefix (NCP). In FIG. 10, the PUSCH default table A includes 16 rows, and each row indicates a PUSCH time domain resource allocation configuration. In FIG. 10, indexed rows each define the PUSCH mapping type, a slot offset $K_2$ between the PDCCH including the DCI and the corresponding PUSCH, the starting symbol S for the PUSCH in the slot, and the number L of continuous allocated symbols. FIG. 11 is a diagram illustrating an example of the PUSCH default table B for the NCP. In FIG. 11, the PUDSCH default table B includes 16 rows, and each row indicates a PUSCH time domain resource allocation configuration. In FIG. 11, indexed rows each defines a slot offset $K_2$ between the PDCCH including the DCI and the corresponding PUSCH, the starting symbol S for the PUSCH in the slot, the number L of continuous allocated symbols, and/or the number of repetition transmissions Rep of the PUSCH. However, the number of rows in the PUSCH default table A and/or the PUSCH default table B need not be 16. For example, the value of the number of rows may vary between the PUSCH default table A and the PUSCH default table B. In other words, the terminal apparatus 1 may use PUSCH default tables with different numbers of rows depending on the configuration of the higher layer parameter, the information contained in the DCI field, and/or the RNTI. For example, the terminal apparatus 1 may use PUSCH default tables with different numbers of rows depending on the number of bits constituting the field of the time domain resource allocation indicated by the DCI. However, the columns constituting the PUSCH default table A may differ from the columns constituting the PUSCH default table B. For example, any of the indexed row, the PUSCH mapping type, the offset $K_2$, the starting symbol S, and the number of symbols L indicated in the PUSCH default table A need not be indicated in the PUSCH default table B, and in contrast, the other columns may be indicated exclusively in the PUSCH default table B.

The slot offset $K_2$ will be described below.

As described above, at the subcarrier spacing configuration μ, the slots are counted in ascending order from 0 to $N^{\{subframe, \mu\}}\_\{slot\}-1$ within the subframe, and counted in ascending order from 0 to $N^{\{frame, \mu\}}\_\{slot\}-1$ within the frame. $K_2$ is the number of slots based on the subcarrier spacing of the PUSCH. $K_2$ may take a value ranging from 0 to 32. In a certain subframe or frame, the number of the slots is counted in ascending order from 0. Slot number n with a subcarrier spacing configuration of 15 kHz corresponds to slot numbers 2n and 2n+1 with a subcarrier spacing configuration of 30 kHz.

In a case that the terminal apparatus 1 detects DCI scheduling the PUSCH, the slot assigned to the PUSCH is given by floor $(n*2^{\mu PUSCH}/2^{\mu PDCCH})+K_2$. The function floor (A) outputs a maximum integer that does not exceed A. n is a slot in which a PDCCH is detected that schedules the PUSCH. $\mu_{PUSCH}$ is a subcarrier spacing configuration for the PUSCH. $\mu_{PDCCH}$ is a subcarrier spacing configuration for the PDCCH.

The resource allocation table configured by the higher layer RRC signaling may be given by higher layer signaling pusch-TimeDomainAllocationList. An information element PUSCH-TimeDomainResourceAllocation indicates a PUSCH time domain resource allocation configuration. PUSCH-TimeDomainResourceAllocation may be used to configure a time domain relationship between the PDCCH including the DCI and the PUSCH. pusch-TimeDomainAllocationList includes one or multiple information elements PUSCH-TimeDomainResourceAllocation. In other words, pusch-TimeDomainAllocationList is a list including one or multiple elements (information elements). One information element PUSCH-TimeDomainResourceAllocation may also be referred to as one entry (or one row). FIG. 12 is a diagram illustrating an example of PUSCH-TimeDomainResourceAllocation, in other words, a parameter configuration of each entry. Each entry may be defined by k2, mappingType, and startSymbolAndLength. k2 indicates a slot offset between the PDCCH including the DCI and the PUSCH scheduled by the DCI. In a case that PUSCH-TimeDomainResourceAllocation does not indicate k2, the terminal apparatus 1 may assume that k2 has a prescribed value according to the subcarrier spacing used to transmit the PUSCH. For example, the terminal apparatus 1 may assume that k2 has a value of 1 in a case that the PUSCH has a subcarrier spacing of 15 kHz or 30 kHz, and that k2 has a value of 2 in a case that the PUSCH has a subcarrier spacing of 60 kHz, and that k2 has a value of 3 in a case that the PUSCH has a subcarrier spacing of 120 kHz. mappingType indicates one of the PUSCH mapping type A or the PUSCH mapping type A. startSymbolAndLength is an index providing an effective combination of the starting symbol S of the PUSCH and the number L of continuous allocated symbols. startSymbolAndLength may be referred to as a start and length indicator SLIV. In other words, unlike in the default table directly defining the starting symbol S and the continuous symbols L, the starting symbol S and the continuous symbols L are given based on the SLIV. The base station apparatus 3 can set the SLIV value such that the time domain resource allocation of the PUSCH does not exceed the slot boundary.

FIG. 13 is a diagram illustrating an example of calculation of the SLIV.

In FIG. 13, 14 is the number of symbols included in one slot. FIG. 13 illustrates an example of calculation of the SLIV for the Normal Cyclic Prefix (NCP). The value of the SLIV is calculated based on the number of symbols included in the slot, the starting symbol S, and the number L of continuous symbols. Here, the value of L is equal to or greater than 1 and does not exceed (14-S). In a case of calculation of the SLIV for the ECP, instead of values 7 and 14 in FIG. 13, 6 and 12 are used.

The resource allocation table configured by the higher layer RRC signaling may be given by higher layer signaling pusch-TimeDomainAllocationList2. In this regard, the parameter pusch-TimeDomainAllocationList2 may differ from the parameter pusch-TimeDomainAllocationList. An information element PUSCH-TimeDomainResourceAllocation2 indicates a PUSCH time domain resource allocation configuration. PUSCH-TimeDomainResourceAllocation2 may be used to configure a time domain relationship between the PDCCH including the DCI and the PUSCH. pusch-TimeDomainAllocationList2 includes one or multiple information elements PUSCH-TimeDomainResourceAllocation2. In other words, pusch-TimeDomainAllocationList2 is a list including one or multiple elements (information elements). One information element PUSCH-TimeDomainResourceAllocation2 may also be referred to as one entry (or one row).

FIG. 14 is a diagram illustrating an example of PUSCH-TimeDomainResourceAllocation2, in other words, a parameter configuration of each entry. Each entry may be defined by k2, mappingType, startSymbol, length, and/or repetition. However, the PUSCH-TimeDomainResourceAllocation2 may include a parameter mappingType indicating a mapping type. k2 indicates a slot offset between the PDCCH including the DCI and the PUSCH scheduled by the DCI. In a case that k2 is not provided (not present/absent) in PUSCH-TimeDomainResourceAllocation2, the terminal apparatus 1 may assume that k2 has a prescribed value in accordance with the subcarrier spacing used for transmission of the PUSCH. For example, the terminal apparatus 1 may assume that k2 has a value of 1 in a case that the PUSCH has a subcarrier spacing of 15 kHz or 30 kHz, and that k2 has a value of 2 in a case that the PUSCH has a subcarrier spacing of 60 kHz, and that k2 has a value of 3 in a case that the PUSCH has a subcarrier spacing of 120 kHz. mappingType indicates the PUSCH mapping type. For example, mappingType indicates one of the PUSCH mapping type A or the PUSCH mapping type A. startSymbol indicates the starting symbol S of the PUSCH. For example, startSymbol indicates any integer ranging from 0 to 13. Length indicates the length of one PUSCH, in other words, the number L of symbols that are continuously allocated. For example, L indicates one of a multiple integer values. However, L indicated by length may be a nominal length (number of symbols) over which the PUSCH is virtually continuously allocated regardless of whether the symbol is available or not, and the value of L may differ from the value for the symbols actually used for transmission of the PUSCH. However, L indicated by length may be the number of symbols in which the PUSCH is continuously allocated to available uplink symbols. repetition indicates the number of repetition transmissions Rep of the PUSCH. For example, repetition may indicate any one of the integers from 2 to 8. However, Rep indicated by repetition may be the nominal number of repetitions of the PUSCH, and actually, the number of repetitions of the PUSCH may differ from the value of Rep. However, in a case that repetition is not provided (not present/absent) in PUSCH-TimeDomainResourceAllocation2, the terminal apparatus 1 may assume that the value of repetition is 1 (the number of repetition transmissions of the PUSCH is 1). However, in a case that the repetition is not provided in PUSCH-TimeDomainResourceAllocation2, the terminal apparatus 1 may select/determine the number of repetition transmissions based on the value of the higher layer parameter repetitionCommon. However, the higher layer parameter repetitionCommon indicates the number of repetition transmissions of the PUSCH that is used in all entries in common. However, in a case that repetition is not provided in the PUSCH-TimeDomainResourceAllocation2 and that the higher layer parameter repetitionCommon is not provided/configured, the terminal apparatus 1 may assume that the value of the repetition is 1 (the number of repetition transmissions of the PUSCH is 1). However, the values of startSymbol, length and/or repetition may be given by one parameter by using joint coding. For example, a parameter may be used that uses, as candidates, values excluding a combination of startSymbol, length, and/or repetition that is not in use.

The resource allocation table configured by the RRC signaling of higher layer may given by higher layer signaling pusch-TimeDomainAllocationList3. The parameter pusch-TimeDomainAllocationList3 may differ from the parameters pusch-TimeDomainAllocationList and pusch-TimeDomainAllocationList2. An information element PUSCH-TimeDomainResourceAllocation3 indicates a PUSCH time domain resource allocation configuration. PUSCH-TimeDomainResourceAllocation3 may be used to configure a time domain relationship between the PDCCH including the DCI and the PUSCH. pusch-TimeDomainAllocationList3 includes one or multiple information elements PUSCH-TimeDomainResourceAllocation3. In other words, pusch-TimeDomainAllocationList3 is a list including one or multiple elements (information elements). One information element PUSCH-TimeDomainResourceAllocation3 may also be referred to as one entry (or one row).

FIG. 15 is a diagram illustrating an example of PUSCH-TimeDomainResourceAllocation3, in other words, a parameter configuration of each entry. Each entry may include PUSCH-TDRAperRep with the number of elements ranging from 1 to maxNrofReps, and each PUSCH-TDRAperRep may be defined by k2, and/or startSymbolAndLength. k2 indicates a slot offset between the PDCCH including the DCI and the PUSCH scheduled by the DCI. In a case that k2 is not provided (not present/absent) in the PUSCH-TDRAperRep, the terminal apparatus 1 may assume that k2 has a prescribed value in accordance with the subcarrier spacing used for transmission of the PUSCH. For example, the terminal apparatus 1 may assume that k2 has a value of 1 in a case that the PUSCH has a subcarrier spacing of 15 kHz or 30 kHz, and that k2 has a value of 2 in a case that the PUSCH has a subcarrier spacing of 60 kHz, and that k2 has a value of 3 in a case that the PUSCH has a subcarrier spacing of 120 kHz. startSymbolAndLength is an index providing an effective combination of the starting symbol S of the PUSCH and the number L of continuous allocated symbols. startSymbolAndLength may be referred to as a start and length indicator SLIV. In other words, unlike in the default table directly defining the starting symbol S and the continuous symbols L, the starting symbol S and the continuous symbols L are given based on the SLIV. The base station apparatus 3 can set the SLIV value such that the time domain resource allocation of the PUSCH does not exceed the slot boundary. The value of the SLIV is calculated based on the number of symbols included in the slot, the starting symbol S, and the number L of continuous symbols, as in the expression in FIG. 13.

The higher layer signaling pusch-TimeDomainAllocationList, pusch-TimeDomainAllocationList2, and/or pusch-TimeDomainAllocationList3 may be included in a cell-specific RRC parameter pusch-ConfigCommon and/or a terminal apparatus 1 (UE)-specific RRC parameter pusch-Config. pusch-ConfigCommon is used to configure a cell-specific parameter for the PUSCH for a certain BWP. pusch-Config is used to configure a terminal apparatus 1 (UE) specific parameter for the PUSCH for the certain BWP. However, the terminal apparatus 1 may determine/identify whether the resource allocation table used for the time domain resource allocation of the PUSCH is given by pusch-TimeDomainAllocationList, or is given by pusch-TimeDomainAllocationList2, or is given by pusch-TimeDomainAllocationList3, based on the higher layer parameter, DCI, and/or RNTI. However, the terminal apparatus 1 may determine/identify whether the respective entries in the pusch-TimeDomainAllocationList, pusch-TimeDomainAllocationList2, or pusch-TimeDomainAllocationList3 are given by the PUSCH-TimeDomainResourceAllocation, or are given by the PUSCH-TimeDomainAlloceAllocation2, or are given by pusch-TimeDomainAllocation3, based on the higher layer parameter, DCI, and/or RNTI.

The terminal apparatus 1 detects the DCI scheduling the PUSCH. The slot in which the PUSCH is transmitted is given by floor $(n*2^{\mu PUSCH}/2^{\mu PDCCH})+k_2$. n is a slot in which a PDCCH is detected that schedules the PUSCH. $\mu_{PUSCH}$ is a subcarrier spacing configuration for the PUSCH. $\mu_{PDCCH}$ is a subcarrier spacing configuration for the PDCCH.

In FIG. 10 and FIG. 11, $K_2$ has a value of one of j, j+1, j+2, and j+3. The value of j is a value specified for the subcarrier spacing of the PUSCH. For example, in a case that the subcarrier spacing to which the PUSCH is applied is 15 kHz or 30 kHz, the value of j may be one slot. For example, in a case that the subcarrier spacing to which the PUSCH is applied is 60 kHz, the value of j may be two slots. For example, in a case that the subcarrier spacing to which the PUSCH is applied is 120 kHz, the value of j may be three slots.

As described above, the terminal apparatus 1 may determine/identify, based on the table as illustrated in FIG. 9, which resource allocation table is applied to the PUSCH time domain resource allocation.

In Example A, the terminal apparatus 1 may determine/identify a resource allocation table to be applied to the PUSCH scheduled by RAR UL grant. In a case that pusch-ConfigCommon includes pusch-TimeDomainAllocationList2 for the terminal apparatus 1, the terminal apparatus 1 may determine/identify a resource allocation table configured by the higher layer RRC signaling. The resource allocation table is given by pusch-TimeDomainAllocationList2 included in pusch-ConfigCommon. Additionally, in a case that pusch-ConfigCommon does not include pusch-TimeDomainAllocationList2 for the terminal apparatus 1, the terminal apparatus 1 may determine/identify the PUSCH default table B. In other words, the terminal apparatus 1 may use and apply, to the determination/identification of the PUSCH time domain resource allocation, the default table B indicating the PUSCH time domain resource allocation configuration.

In Example B, the terminal apparatus 1 may detect the DCI in any common search space associated with CORE-SET #0. The detected DCI is provided with the CRC scrambled with one of the C-RNTI, the MCS-C-RNTI, the TC-RNTI, and the CS-RNTI. The terminal apparatus 1 may determine/identify a resource allocation table to be applied to the PUSCH scheduled by the DCI. In a case that pusch-ConfigCommon includes pusch-TimeDomainAllocationList2 for the terminal apparatus 1, the terminal apparatus 1 may determine/identify a resource allocation table given from pusch-TimeDomainAllocationList2 provided by pusch-ConfigCommon to be a resource allocation table to be applied to the PUSCH time domain resource allocation. Additionally, in a case that pusch-ConfigCommon does not include pusch-TimeDomainAllocationList2, the terminal apparatus 1 may determine/identify the PUSCH default table A to be a resource allocation table to be applied to the PUSCH time domain resource allocation.

In Example C, the terminal apparatus 1 may detect the DCI in (I) any common search space associated with CORE-SET #0 or (II) the UE-specific search space. The detected DCI is provided with the CRC scrambled with one of the C-RNTI, the MCS-C-RNTI, the TC-RNTI, and the CS-RNTI. The terminal apparatus 1 may determine/identify a resource allocation table to be applied to the PUSCH scheduled by the DCI. In a case that the pusch-Config includes pusch-TimeDomainAllocationList2 for the terminal apparatus 1, the terminal apparatus 1 may determine/identify a resource allocation table given from pusch-TimeDomainAllocationList2 provided by pusch-Config to be a resource allocation table to be applied to the PUSCH time domain resource allocation. In other words, in a case that pusch-Config includes pusch-TimeDomainAllocationList2, the terminal apparatus 1 may use and apply, to the determination/identification of the PUSCH time domain resource allocation, pusch-TimeDomainAllocationList2 provided by using pusch-Config, regardless of whether pusch-ConfigCommon includes pusch-TimeDomainAllocationList2. Additionally, in a case that pusch-Config does not include pusch-TimeDomainAllocationList2 and that pusch-ConfigCommon includes pusch-TimeDomainAllocationList2, the terminal apparatus 1 may determine/identify a resource allocation table given from pusch-TimeDomainAllocationList2 provided by pusch-ConfigCommon to be a resource allocation table to be applied to the PUSCH time domain resource allocation. In other words, the terminal apparatus 1 uses and applies pusch-TimeDomainAllocationList2 provided by using pusch-ConfigCommon to the determination/identification of the PUSCH time domain resource allocation. Additionally, in a case that pusch-Config does not include pusch-TimeDomainAllocationList2 and that pusch-ConfigCommon does not include pusch-TimeDomainAllocationList2, the terminal apparatus 1 may determine/identify the PUSCH default table B to be a resource allocation table to be applied to the PUSCH time domain resource allocation.

The terminal apparatus 1 may select one PUSCH time domain resource allocation configuration in the determined/identified resource allocation table, based on the value indicated in the 'Time domain resource assignment' field included in the DCI scheduling the PUSCH. For example, in a case that the resource allocation table applied to the PUSCH time domain resource allocation is the PUSCH default table A (or the PUSCH default table B), the value m indicated in the 'Time domain resource assignment' field may indicate the row index m+1 of the PUSCH default table A (or the PUSCH default table B). At this time, the PUSCH time domain resource allocation is a time domain resource allocation configuration indicated by the row index m+1. The terminal apparatus 1 assumes the time domain resource allocation configuration indicated by the row index m+1, and transmits the PUSCH. For example, in a case that the value m indicated in the 'Time domain resource assignment' field is 0, the terminal apparatus 1 uses a PUSCH time domain resource allocation configuration with the row index 1 of the PUSCH default table A (or the PUSCH default table B) to identify the resource allocation in the time direction for the PUSCH scheduled by the corresponding DCI.

In a case that the resource allocation table applied to the PUSCH time domain resource allocation is a resource allocation table given from pusch-TimeDomainAllocationList, the value m indicated in the 'Time domain resource assignment' field corresponds to the (m+1)th element (entry, row) in the list pusch-TimeDomainAllocationList. For example, in a case that the value m indicated in the 'Time domain resource assignment' field is 0, the terminal apparatus 1 may reference the first element (entry) in the list pusch-TimeDomainAllocationList. For example, in a case that the value m indicated in the 'Time domain resource assignment' field is 1, the terminal apparatus 1 may reference the second element (entry) in the list pusch-TimeDomainAllocationList.

Additionally, in a case that the resource allocation table applied to the PDSCH time domain resource allocation is a resource allocation table given from pusch-TimeDomainAllocationList2, the value m indicated in the 'Time domain resource assignment' field corresponds to the (m+1)th element (entry or row) in the list pusch-TimeDomainAllocationList2. For example, in a case that the value m indicated in the 'Time domain resource assignment' field is 0, the terminal apparatus 1 may reference the first element (entry) in the list pusch-TimeDomainAllocationList2. For example, in a case that the value m indicated in the 'Time domain resource assignment' field is 1, the terminal apparatus 1 may reference the second element (entry) in the list pusch-TimeDomainAllocationList2.

Hereinafter, the number of bits (size) of the 'Time domain resource assignment' field included in the DCI will be described.

In response to detection of the PDCCH including DCI format 0_0, DCI format 0_1, or DCI format 0_2, the terminal apparatus 1 may transmit the corresponding PUSCH. The number of bits in the 'Time domain resource assignment' field in DCI format 0_0 may be a fixed number. For example, the fixed number of bits may be six. In other words, the size of the 'Time domain resource assignment' field included in DCI format 0_0 is six bits. Additionally, the size of the 'Time domain resource assignment' field included in DCI format 0_1 or DCI format 0_2 may be a variable number of bits. For example, the number of bits in the 'Time domain resource assignment' field included in DCI format 0_1 or DCI format 02 may be one of 0, 1, 2, 3, 4, 5, and 6.

The determination/identification of the number of bits in the 'Time domain resource assignment' field included in DCI format 0_1 or DCI format 0_2 will be described below.

The number of bits in the 'Time domain resource assignment' field may be given as ceil ($\log_2$ (I)). In a case that pusch-TimeDomainAllocationList (or pusch-TimeDomainAllocationList2, pusch-TimeDomainAllocationList3) is configured (provided) for the terminal apparatus 1, the value of I may be the number of entries included in pusch-TimeDomainAllocationList (or pusch-TimeDomainAllocationList2, pusch-TimeDomainAllocationList3). In a case that pusch-TimeDomainAllocationList (or pusch-TimeDomainAllocationList2, pusch-TimeDomainAllocationList3) is not configured (provided) for the terminal apparatus 1, the value of I may be the number of rows in the PUSCH default table A (or the PUSCH default table B). In other words, in a case that pusch-TimeDomainAllocationList (or pusch-TimeDomainAllocationList2, pusch-TimeDomainAllocationList3) is configured for the terminal apparatus 1, the number of bits in the Time domain resource assignment' field may be given based on the number of entries included in pusch-TimeDomainAllocationList (or pusch-TimeDomainAllocationList2, pusch-TimeDomainAllocationList3). In a case that pusch-TimeDomainAllocationList (or pusch-TimeDomainAllocationList2, pusch-TimeDomainAllocationList3) is not configured for the terminal apparatus 1, the number of bits in the Time domain resource assignment' field may be given based on the number of rows in the default table (PUSCH default table A or PUSCH default table B). Specifically, in a case that pusch-Config includes pusch-TimeDomainAllocationList (or pusch-TimeDomainAllocationList2, pusch-TimeDomainAllocationList3), the value of I may be the number of entries included in pusch-TimeDomainAllocationList (or pusch-TimeDomainAllocationList2, pusch-TimeDomainAllocationList3) provided by using pusch-Config. Additionally, in a case that pusch-Config does not include pusch-TimeDomainAllocationList (or pusch-TimeDomainAllocationList2, pusch-TimeDomainAllocationList3) and that pusch-ConfigCommon includes pusch-TimeDomainAllocationList (or pusch-TimeDomainAllocationList2, pusch-TimeDomainAllocationList3), the value of I may be the number of entries included in pusch-TimeDomainAllocationList (or pusch-TimeDomainAllocationList2, pusch-TimeDomainAllocationList3) provided by using pusch-ConfigCommon. Additionally, in a case that pusch-Config does not include pusch-TimeDomainAllocationList (or pusch-TimeDomainAllocationList2, pusch-TimeDomainAllocationList3) and that pusch-ConfigCommon does not include pusch-TimeDomainAllocationList (or pusch-TimeDomainAllocationList2, pusch-TimeDomainAllocationList3), the value of I may be the number of rows included in the PUSCH default table A (or the PUSCH default table B).

Hereinafter, the repetition transmission (also referred to as repetition or aggregation transmission) of the PUSCH according to the present embodiment will be described. The repetition transmission of the PUSCH in the present embodiment is a repetition transmission in which multiple PUSCHs are continuously transmitted for one or multiple slots by one uplink grant, and is also referred to as mini-slot level repetition, or multi-segment transmission. In other words, the terminal apparatus 1 may repeatedly transmit one PUSCH in the same slot a multiple times. However, one PUSCH may refer to a PUSCH generated from one transport block. For example, the repeated transmission of one PUSCH may be to code, in multiple time resource, one transport block in accordance with the size of each of multiple time resources to generate multiple PUSCHs and to transmit each of the multiple PUSCHs in corresponding time resource of the multiple time resources.

The terminal apparatus 1 repeatedly transmits the PUSCH in time resources determined/identified based on the starting symbol S of a time domain resource for the PUSCH, the nominal duration of the PUSCH (which may be the number of symbols) L, and/or the number of repetition transmissions Rep, which are provided by the higher layer parameter notified by the RRC message (e.g., pusch-TimeDomainAllocationList 2 described above) and the field of downlink control information (for example, Time domain resource assignment field described above) using a prescribed DCI format (e.g., DCI format 0_2) received on the PDCCH. In other words, the terminal apparatus 1 may determine/identify the starting symbol, the duration, and/or the number of repetition transmissions of the PUSCH used for repetition transmission, from the S, L, and/or Rep given by the higher layer parameter notified by the RRC message and the field of downlink control information received on the PDCCH. However, the S, L, and/or Rep may respectively be the nominal starting symbol, the nominal duration, and/or the nominal number of repetition transmissions. For example, the S, L, and/or Rep may respectively be different from the starting symbol, the transmission duration, and/or the number of repetition transmissions used for the actual transmission of the PUSCH. The terminal apparatus 1 may determine/identify the actual starting symbol, the actual duration, and/or the number of repetition transmissions for the PUSCH for the repetition transmission, from the time domain resource parameters for the PUSCH provided by the higher layer parameter notified by the RRC message and the field of downlink control information received on the PDCCH (the starting symbol S, the nominal duration L, and/or the nominal number of repetitions Rep), a slot boundary position, the allocation of symbols (uplink symbol and/or flexible symbol) available for transmission of the PUSCH, and/or the time resource allocation of the downlink signal provided in the downlink control information. For example, the allocation of uplink symbols available for transmission of the PUSCH may be set by the higher layer slot format configuration information transmitted in the RRC message and/or the slot format configuration DCI transmitted on the PDCCH. The terminal apparatus 1 may determine/identify the actual starting symbol, the actual duration, and/or the actual number of repetition transmissions for each of multiple PUSCHs generated from one transport block, based on the resource allocation information indicated by the RRC message and/or the DCI, the higher layer slot format configuration information transmitted by the RRC message, the slot format configuration DCI received on the PDCCH, and/or the time resource allocation of the downlink signal.

Figure 16:
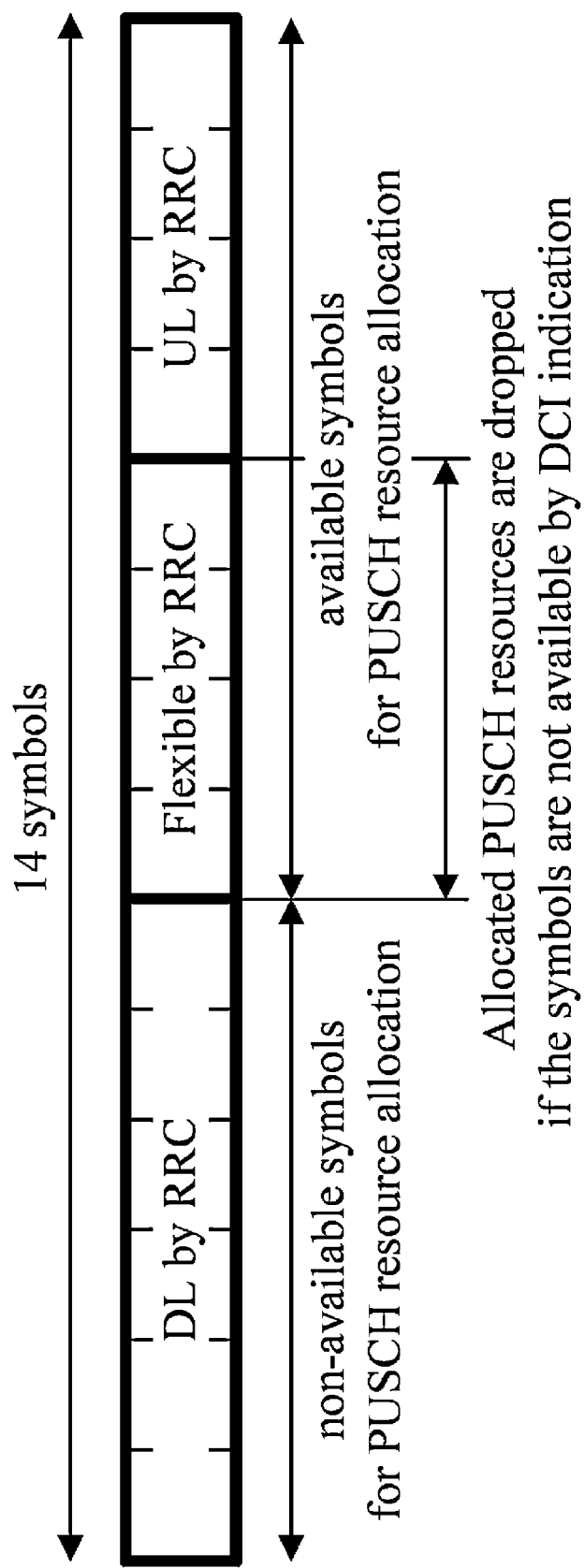
FIG. 16 is a diagram illustrating an example of an uplink symbol available for transmission of the PUSCH according to an embodiment of the present invention.

FIG. 16 is a diagram illustrating an example of symbols available for transmission of the PUSCH configured based on the higher layer slot format configuration information transmitted in the RRC message and the higher layer slot format configuration DCI transmitted on the PDCCH according to the present embodiment.

In FIG. 16, for a slot including 14 symbols, the higher layer slot format configuration information indicates the first 6 symbols as downlink (DL by RRC: semi-static downlink symbols), the subsequent four symbols as flexible (Flexible by RRC: semi-static flexible symbols), and the last 4 symbols as uplink (UL by RRC: semi-static uplink symbols). In this case, the terminal apparatus 1 may determine the symbols indicated as downlink by the higher layer slot format configuration information to be unavailable for the allocation of time resources (PUSCH resources) for the PUSCH, and determine the symbols indicated as flexible or uplink by the higher layer slot format configuration information to be available for the allocation of PUSCH resources. For example, the symbols indicated as downlink by the higher layer slot format configuration information may be excluded from the resources available for the PUSCH transmission using the first repetition transmission scheme, and multiple PUSCH resources may be allocated temporally continuously to symbols indicated as flexible or uplink by the higher layer slot format configuration information. However, regardless of the content of the higher layer slot format configuration information, after temporally continuously allocating PUSCH resources to all of one or multiple symbols, the terminal apparatus 1 may postpone and allocate the PUSCH resources allocated to the symbols unavailable for allocation of the PUSCH resources (e.g., semi-static downlink symbols) and the subsequent PUSCH resources, to the symbols (e.g., semi-static uplink symbols or semi-static flexible symbols) available for allocation of the PUSCH resources next to the semi-static downlink symbols. However, regardless of the content of the higher layer slot format configuration information, after temporally continuously allocating PUSCH resources to all of one or multiple symbols, the terminal apparatus 1 may drop (cancel) the PUSCH resources allocated to the symbols indicated as downlink by the higher layer slot format configuration information. However, "dropping" may refer to the terminal apparatus 1 not postponing or utilizing the resources allocated to the symbols for transmission of the PUSCH. However, "dropping" may also be referred to as "canceling" or "not transmitting." However, in accordance with information included in the DCI included in the RRC message received by the higher layer and/or the PDCCH received from the base station apparatus 3, the terminal apparatus 1 may switch between the operation of postponing and allocating the PUSCH resources allocated to the symbols indicated as downlink by the higher layer slot format configuration information to the symbols available next to the semi-static downlink symbols (e.g., semi-static uplink symbols or semi-static flexible symbols) and the operation of dropping (canceling) the PUSCH resources without postponement.

However, among the symbols indicated as flexible by the higher layer slot format configuration information (semi-static flexible symbols), prescribed symbols may be determined to be unavailable for allocation of the PUSCH resources. Here, the prescribed symbols may refer to symbols for which the higher layer parameter (RRC parameter) notifies that downlink signals and/or uplink signals are to be allocated to the symbols.

For example, the symbols (which may be semi-static flexible symbols) for which the higher layer parameter (for example, ssb-PositionsInBurst) indicates that SS/PBCH blocks are to be allocated to the symbols may be determined to be unavailable for allocation of the PUSCH resources. In a case that the symbols in which the SS/PBCH blocks indicated by the higher layer parameter are to be transmitted overlap/collide with the symbols to which time domain resources for the PUSCH provided by the field of downlink control information received on the PDCCH are to be allocated, the terminal apparatus 1 may determine the symbols to be unavailable for allocation of the PUSCH resources.

For example, the symbols (which may be semi-static flexible symbols) for which the higher layer parameter (for example, SearchSpace, SearchSpaceZero, ControlResourceSet, and/or ControlResourceSetZero) indicates that type-0 CSS in CORESET #0 is to be allocated to the symbols may be determined to be unavailable for allocation of the PUSCH resources. In a case that the symbols to which type-0 CSS in CORESET #0 is to be allocated and which is indicated by the higher layer parameter overlap/collide with the symbols to which time domain resources for the PUSCH provided by the field of downlink control information received on the PDCCH are to be allocated, the terminal apparatus 1 may determine the symbols to be unavailable for allocation of the PUSCH resources.

For example, the symbols (which may be semi-static flexible symbols) for which the higher layer parameter indicates that no PUSCH resources are to be allocated to the symbols may be determined to be unavailable for allocation of the PUSCH resources. In a case that the symbols for which the higher layer parameter indicates that no PUSCH resources are to be allocated to the symbols overlap/collide with the symbols to which time domain resources for the PUSCH provided by the field of downlink control information received on the PDCCH are to be allocated, the terminal apparatus 1 may determine the symbols to be unavailable for allocation of the PUSCH resources. However, the higher layer parameter indicating the symbols to which no PUSCH resources are to be allocated may be indicated by a higher layer parameter indicating that no PDSCH is to be allocated (e.g., rateMatchPatternGroup 1, rateMatchPatternGroup2, and/or rateMatchPatternToAddModList). However, the higher layer parameter indicating the symbols to which no PUSCH resources are to be allocated may be information of a bitmap indicating symbol numbers and/or slot numbers, index information, or information directly indicating symbol numbers and slot numbers.

The terminal apparatus 1 may determine the following symbols (which may be semi-static flexible symbols) to be unavailable for allocation of the PUSCH resources: the symbols being indicated by a higher layer parameter indicating that no PDSCH is to be allocated (for example, rateMatchPatternGroup1, rateMatchPatternGroup2, and/or rateMatchPatternToAddModList) aside from the higher layer parameter indicating the symbols (which may be semi-static flexible symbols) to which no PUSCH resources are to be allocated.

The multiple PUSCH resources allocated based on the higher layer slot format configuration information may be referred to as multiple temporary PUSCH resources. The multiple temporary PUSCH resources may be determined/ identified based on the resource allocation information (e.g., S, L and/or Rep), the higher layer slot format configuration information, and/or other higher layer parameters included in the DCI. The terminal apparatus 1 may determine/identify multiple temporary PUSCH resources based on the resource allocation information (e.g., S, L, and/or Rep) and the higher layer slot format configuration information and/or other higher layer parameters included in the DCI.

A time resource for the PUSCH determined/identified by the terminal apparatus 1 based on the resource allocation information included in the DCI may be referred to as nominal time resource. For example, the terminal apparatus 1 may determine L continuous symbols starting with the starting symbol indicated by S to be a nominal time resource for one PUSCH, and determine Rep×L continuous symbols for Rep>1 to be a nominal time resource for PUSCH repetition transmission. The terminal apparatus 1 may identify one or multiple temporary PUSCH resources based on the nominal time resource for the PUSCH, the slot boundary position, and/or the RRC parameter provided by the higher layer. For example, in a case that the nominal time resource for a certain PUSCH extends across a slot boundary, the terminal apparatus 1 may identify multiple temporary PUSCH resources by dividing the nominal time resource at the slot boundary. For example, in a case that the nominal time resource for a certain PUSCH is allocated to symbols indicated as downlink symbols by the higher layer slot format configuration information, the terminal apparatus 1 may postpone the nominal time resource allocated to the symbols to the next available uplink symbols or flexible symbols and identify this time resource to be a temporary PUSCH resource.

In FIG. 16, a time resource for the PUSCH using the first repetition transmission scheme (temporary PUSCH resource) is allocated to the symbols indicated as flexible symbols by the higher layer slot format configuration information. In a case that any of the symbols to which the temporary PUSCH resource is allocated is determined to be unavailable for transmission of the PUSCHs by the slot format configuration DCI transmitted on the PDCCH, the terminal apparatus 1 drops the allocated temporary PUSCH resource at the corresponding symbol. However, "dropping" may refer to the terminal apparatus 1 not utilizing the resource at the symbol for transmission of the PUSCH. However, "dropping" may also be referred to as "canceling" or "not transmitting." For example, the symbols indicated to be unavailable for transmission of the PUSCHs in the slot format configuration DCI may be symbols set as downlink symbols in the slot format configuration DCI. For example, the symbols indicated to be unavailable for transmission of the PUSCHs in the slot format configuration DCI may be symbols set as downlink symbols or flexible symbols in the slot format configuration DCI. For example, in a case that temporary PUSCH resources include symbols indicated as uplink symbols and symbols indicated as downlink symbols (or as flexible symbols) in the slot format configuration DCI, the terminal apparatus 1 drops the time resource for the symbols indicated as downlink symbols (or flexible symbols) out of the temporary PUSCH resources, and allocates the PUSCH only to the time resource for the symbols indicated as uplink symbols.

However, by indicating a specific slot format index (e.g., index 255) of the slot format configuration DCI, the terminal apparatus 1 may identify flexible symbols to be available for transmission of the PUSCHs in a case that the terminal apparatus 1 complies with the slot format set in accordance with the higher layer slot format configuration information.

However, in a case that the terminal apparatus 1 is configured with monitoring of the slot format configuration DCI using the RRC parameter, and does not detect the slot format configuration DCI, the terminal apparatus 1 may drop all of the temporary PUSCH resource including the symbols indicated as flexible symbols by the higher layer slot format configuration information. In other words, in a case that the terminal apparatus 1 fails to detect the slot format configuration DCI the monitoring of which is configured for the terminal apparatus 1 and that a certain temporary PUSCH resource includes both symbols indicated as flexible symbols and symbols indicated as uplink symbols by the higher layer slot format configuration information, then terminal apparatus 1 may drop all of the temporary PUSCH resource and need not transmit the PUSCH by using the temporary PUSCH resource. In other words, in a case that the terminal apparatus 1 is configured with monitoring of the slot format configuration DCI, then the terminal apparatus 1 determining/identifying multiple actual PUSCH resources (for example, the first symbol and the number of symbols) based on multiple temporary PUSCH resources (for example, the first symbol and the number of symbols) and the slot format configuration DCI may include using the information indicated in the higher layer slot format configuration information to determine/identify the multiple actual PUSCH resources in a case that the terminal apparatus 1 does not detect the slot format configuration DCI.

With such an operation, the base station apparatus 3 can perform processing for receiving multiple PUSCHs in prescribed PUSCH resources without recognizing whether the terminal apparatus 1 detects the slot format configuration DCI.

However, in a case that symbols indicated as uplink symbols and symbols indicated as downlink symbols (or flexible symbols) by the slot format configuration DCI are included in a certain temporary PUSCH resource allocated by the higher layer slot format configuration information, the terminal apparatus 1 may drop all of the temporary PUSCH resource.

However, in a case that the terminal apparatus 1 is configured with monitoring of the slot format configuration DCI using the RRC parameter, and does not detect the slot format configuration DCI, then for certain temporary PUSCH resources allocated by the higher layer slot format configuration information, the terminal apparatus 1 may exclusively drop a resource included in the temporary PUSCH resources and used for the symbols indicated as downlink symbols and/or flexible symbols by the higher layer slot format configuration information.

Among multiple temporary PUSCH resources allocated based on the higher layer slot format configuration information, the temporary PUSCH resources that are not dropped in the slot format configuration DCI may be referred to as actual PUSCH resources. The multiple actual PUSCH resources (e.g., the first symbol and the number of symbols for each of the multiple actual PUSCH resources) may be determined/identified based on the multiple temporary PUSCH resources (e.g., the first symbol and the number of symbols for each of the multiple temporary PUSCH resources) and the slot format configuration DCI. The terminal apparatus 1 may determine/identify multiple actual PUSCH resources based on the multiple temporary PUSCH resources and the slot format configuration DCI. However, in a case that the terminal apparatus 1 is not configured with monitoring of the slot format configuration DCI on the PDCCH, and/or that no flexible symbols are configured in the higher layer slot format configuration information, the multiple actual PUSCH resources may be identical to the multiple temporary PUSCH resources.

In a case that the terminal apparatus 1 is not configured with monitoring of the slot format configuration DCI on the PDCCH, the terminal apparatus 1 may use, as actual PUSCH resources, the temporary PUSCH resources allocated to the symbols indicated as flexible symbols by the higher layer slot format configuration information.

However, in a case that the terminal apparatus 1 detects a DCI format that allocates a downlink signal (e.g., a PDSCH or CSI-RS) to the flexible symbols allocated the temporary PUSCH resource, the terminal apparatus 1 may drop a part or all of the temporary PUSCH resource including the symbols allocated the downlink signal. FIG. 17 is a diagram illustrating an example of dropping of the PUSCH in the repetition transmission of the PUSCH according to an embodiment of the present invention. More specifically, FIG. 17 is a diagram illustrating an example of dropping of a temporary PUSCH resource including symbols allocated a downlink signal, the temporary PUSCH resource being included in the temporary PUSCH resources allocated to the symbols indicated as flexible symbols by the higher layer slot format configuration information. Each of (a), (b), and (c) of FIG. 17 indicates a case in which, for two slots, all symbols are indicated as flexible symbols by the higher layer slot format configuration information (Flexible by RRC: semi-static flexible symbols) and in which a downlink signal (DL signal by DCI) (which may be a downlink signal scheduled by dynamic grant) is allocated by DCI to four symbols corresponding to the 9th to 12th symbols in the first slot. Additionally, each of (a), (b), and (c) of FIG. 17 indicates that S=2, L=4, and Rep=4 are indicated by the DCI and that a temporary PUSCH resource with four symbols starting with the third symbol in the first slot is repeatedly allocated four times. In this case, as illustrated in FIG. 17(a), the terminal apparatus 1 may drop (cancel) all of the temporary PUSCH resources (the second and third temporary PUSCH resources) that collide with the resource for the downlink signal. As another example, as illustrated in FIG. 17(b), the terminal apparatus 1 may drop the resource for the symbols (the third and fourth symbols of the second temporary PUSCH resource and the first and second symbols of the third temporary PUSCH resource) that collides, in the temporary PUSCH resources, with the resource for the downlink signal. The use of a method for such dropping allows the use of flexible scheduling with high efficiency of usage of time resources in a case of the mixture of transmission of the PUSCH using many symbols due to repetition transmission and reception of downlink signals. As another example, as illustrated in FIG. 17(c), the terminal apparatus 1 may drop the resource for the symbols that collides, in the temporary PUSCH resources, with the resource for the downlink signal, and further drop, as guard symbols, a prescribed number of symbols immediately after the resource allocated to the downlink signal (in FIG. 17(c), one symbol (the third symbol of the third temporary PUSCH resource)). With guard symbols provided between the symbols receiving the downlink signal and the symbols transmitting the PUSCH, the terminal apparatus 1 can provide time for switching from the downlink to the uplink, suppressing the interference between downlink signals and uplink signals. However, the number of guard symbols may have a fixed value. However, the number of guard symbols may be based on the subcarrier spacing. However, the terminal apparatus 1 may configure/identify/determine the number of guard symbols based on signals notified from the base station apparatus 3 (e.g., the RRC parameter, the downlink control information, and/or a random access response).

In a case that the terminal apparatus 1 detects a DCI format (e.g., DCI format 0_2) including uplink allocation information indicating that one transport block is repeatedly transmitted on multiple PUSCHs, and detects a DCI format (for example, DCI format 1_0, DCI format 1_1, or DCI format 0_1) including downlink allocation information indicating that the downlink signal is to be received, and that a collision of at least one symbol occurs between one or more of the multiple temporary PUSCH resources identified from the uplink allocation information and the downlink time resources identified from the downlink allocation information, then the terminal apparatus 1 may drop the temporary PUSCH resources including the colliding symbols.

In a case that the terminal apparatus 1 detects a DCI format (e.g., DCI format 0_2) including uplink allocation information indicating that one transport block is repeatedly transmitted on multiple PUSCHs, and detects a DCI format (e.g., DCI format 1_0, DCI format 1_1, or DCI format 0_1) including downlink allocation information indicating that the downlink signal is to be received, and that a collision of at least one symbol occurs between one or more of the multiple temporary PUSCH resources identified from the uplink allocation information and the downlink time resources identified from the downlink allocation information, then the terminal apparatus 1 may exclusively drop the resource for the colliding symbol included in the temporary PUSCH resources including the colliding symbol.

In a case that the terminal apparatus 1 detects a DCI format (e.g., DCI format 0_2) including uplink allocation information indicating that one transport block is repeatedly transmitted on multiple PUSCHs, and detects a DCI format e.g., DCI format 1_0, DCI format 1_1, or DCI format 0_1) including downlink allocation information indicating that the downlink signal is to be received, that a collision of at least one symbol occurs between one or more of the multiple temporary PUSCH resources identified from the uplink allocation information and the downlink time resources identified from the downlink allocation information, and/or that a gap of the number of symbols between one of the multiple temporary PUSCH resources and the downlink time resource is smaller than the defined number of guard symbols, then the terminal apparatus 1 may drop the resource for the colliding symbol included in the temporary PUSCH resources including the colliding symbol and the resource for a prescribed number of symbols (guard symbols) immediately after the resource.

In a case that the terminal apparatus 1 detects a DCI format (e.g., DCI format 0_2) including uplink allocation information indicating that one transport block is repeatedly transmitted on multiple PUSCHs, and detects a DCI format (e.g., DCI format 1_0, DCI format 1_1, or DCI format 0_1) including downlink allocation information indicating that the downlink signal is to be received, that a collision of at least one symbol occurs between one or more of the multiple temporary PUSCH resources identified from the uplink allocation information and the downlink time resources identified from the downlink allocation information, and/or that a gap of the number of symbols between one of the multiple temporary PUSCH resources and the downlink time resource is smaller than the defined number of guard symbols, then the terminal apparatus 1 may drop the temporary PUSCH resource including the symbol colliding with the downlink time resource and the temporary PUSCH resource with the gap of the number of symbols between the temporary PUSCH resource and the downlink time resource being smaller than the defined number of guard symbols.

The repetition transmission of the PUSCH involves a case in which the base station apparatus 3 indicates, to the terminal apparatus transmitting a scheduling request (SR), time resources for the repetition transmission by using the DCI (this transmission is also referred to as a PUSCH transmission scheduled by dynamic grant or DG PUSCH transmission) and a case in which the base station apparatus 3 periodically configures multiple time resources for the repetition transmission in advance, and the terminal apparatus 1 performs the repetition transmission of the PUSCH by using one of the multiple time resources for the repetition transmission without transmitting SR (this transmission is also referred to as PUSCH transmission configured by using configured grant or CG PUSCH). The dropping of temporary PUSCH resources may be applied exclusively in a case that the temporary PUSCH resources are configured in the configuration grant. However, the same method of dropping may be applied both to the case in which the temporary PUSCH resources are configured in the configuration grant and to the case in which the temporary PUSCH resources are configured in the dynamic grant. However, different methods of dropping may be applied to the case in which the temporary PUSCH resources are configured in the configuration grant and to the case in which the temporary PUSCH resources are configured in the dynamic grant.

In the repetition transmission of the PUSCH using the first repetition transmission scheme according to the present embodiment, the total number of symbols in multiple temporary PUSCH resources may be equal to L*Rep, corresponding to the product of L and Rp indicated by the resource allocation information included in the DCI. In the repetition transmission of the PUSCH using the first repetition transmission scheme according to the present embodiment, the total number of symbols in multiple actual PUSCH resources may be equal to or less than L*Rep, corresponding to the product of L and Rp indicated by the resource allocation information included in the DCI.

FIG. 18 is a diagram illustrating an example of the time resource allocation of the PUSCH in the repetition transmission of the PUSCH according to the present embodiment. FIG. 18 illustrates an example of the allocation of the PUSCH in a case that the DCI including the resource allocation (RA) information indicates S=6, L=4, and Rep=4, and FIGS. 18(a), (b), and (c) illustrate three examples with different notified slot formats.

FIG. 18(a) is a diagram illustrating an example of a case in which all symbols of two slots are set as uplink symbols (UL by RRC) by the higher layer slot format configuration information. In this case, all of the symbols of the two slots are available for the PUSCH, and thus the terminal apparatus 1 determines the first PUSCH resource to be a time resource with a starting symbol corresponding to the seventh symbol in the first slot and a symbol duration of four symbols, determines the second PUSCH resource to be a time resource with a starting symbol corresponding to the 11th symbol in the first slot and a symbol duration of four symbols, determines the third PUSCH resource to be a time resource with a starting symbol corresponding to the first symbol in the second slot and a symbol duration of four symbols, and determines the fourth PUSCH resource to be a time resource with a starting symbol corresponding to the fifth symbol in the second slot and a symbol duration of four symbols, and continuously transmits the PUSCH four times.

FIG. 18(b) is a diagram illustrating an example of a case in which in accordance with the higher layer slot format configuration information, for both the first and second slots, the first to sixth symbols are set as downlink symbols (DL by RRC), and the remaining symbols are set as uplink symbols (UL by RRC). In this case, the last eight symbols of each slot are available for the PUSCH, and thus the terminal apparatus 1 determines the first PUSCH resource to be a time resource with a starting symbol corresponding to the seventh symbol in the first slot and a symbol duration of four symbols, determines the second PUSCH resource to be a time resource with a starting symbol corresponding to the 11th symbol in the first slot and a symbol duration of four symbols, determines the third PUSCH resource to be a time resource with a starting symbol corresponding to the seventh symbol in the second slot and a symbol duration of four symbols, and determines the fourth PUSCH resource to be a time resource with a starting symbol corresponding to the 11th symbol in the second slot and a symbol duration of four symbols, and continuously transmits the PUSCH four times. However, the terminal apparatus 1 may determine several symbols immediately after the symbols receiving the downlink signal to be symbols that cannot be allocated as guard symbols even in a case that the higher layer slot format configuration information indicates the symbols as uplink. For example, in a case that higher layer slot format configuration information similar to that in FIG. 18(b) is received and that a downlink signal is received in the first to sixth symbols in the first slot, the seventh symbol, corresponding to an uplink symbol, may be used as a guard symbol, and PUSCH resources may be allocated to symbols starting with the eighth symbol. However, for the guard symbol, a PUSCH resource may be allocated to the guard symbol, and the PUSCH resource of the guard symbol may be dropped. However, the number of guard symbols may have a fixed value. However, the number of guard symbols may be based on the subcarrier spacing. However, the terminal apparatus 1 may configure/identify/determine the number of guard symbols based on signals notified from the base station apparatus 3 (e.g., the RRC parameter, the downlink control information, and/or a random access response).

FIG. 18(c) illustrates a case in which in accordance with the higher layer slot format configuration information, all symbols of two slots are set as flexible symbols (Flexible by RRC) and in which in the slot format configuration DCI, for both the first and second slots, the first to sixth symbols are set as downlink symbols (DL by DCI), and the remaining symbols are set as uplink symbols (UL by DCI). In this case, all symbols of the two slots are available for allocation of the PUSCHs, and thus the terminal apparatus 1 allocates PUSCH resources (temporary PUSCH resources) as in the case of FIG. 18(a). However, the PUSCH resources for the symbols indicated as downlink symbols by the slot format configuration DCI are dropped, and thus the terminal apparatus 1 drops all of the third PUSCH resource and the first two symbols of the fourth PUSCH resource. Accordingly, the terminal apparatus 1 determines the first PUSCH resource (actual PUSCH resource) to be a time resource with a starting symbol corresponding to the seventh symbol in the first slot and a symbol duration of four symbols, determines the second PUSCH resource (actual PUSCH resource) to be a time resource with a starting symbol corresponding to the 11th symbol in the first slot and a symbol duration of four symbols, and determines the third PUSCH resource (actual PUSCH resource) to be a time resource with a starting symbol corresponding to the seventh symbol in the second slot and a symbol duration of two symbols and transmits the PUSCH three times by using three actual PUSCH resources.

However, for several symbols immediately after the symbols receiving the downlink signal to be symbols, the terminal apparatus 1 may drop the PUSCH resource as guard symbols even in a case that the higher layer slot format configuration information indicates the symbols as uplink. For example, in a case that higher layer slot format configuration information and slot format configuration DCI similar to those in FIG. 18(c) are received and that a downlink signal is received in the first to sixth symbols in the first slot, then the seventh symbol, corresponding to an uplink symbol, may be used as a guard symbol, and the PUSCH resource allocated to the symbols may be dropped. However, the number of guard symbols may have a fixed value. However, the number of guard symbols may be based on the subcarrier spacing. However, the terminal apparatus 1 may configure/identify/determine the number of guard symbols based on signals notified from the base station apparatus 3 (e.g., the RRC parameter, the downlink control information, and/or a random access response).

In a case of determining/setting a certain PUSCH resource for a certain slot based on the higher layer slot format configuration information and the RA information, the terminal apparatus 1 may segment the PUSCH resources into multiple PUSCH resources and transmit multiple PUSCHs in a case that the number of continuous uplink symbols and/or flexible symbols available in the slot is less than L due to a slot boundary or downlink symbols.

Figure 19:
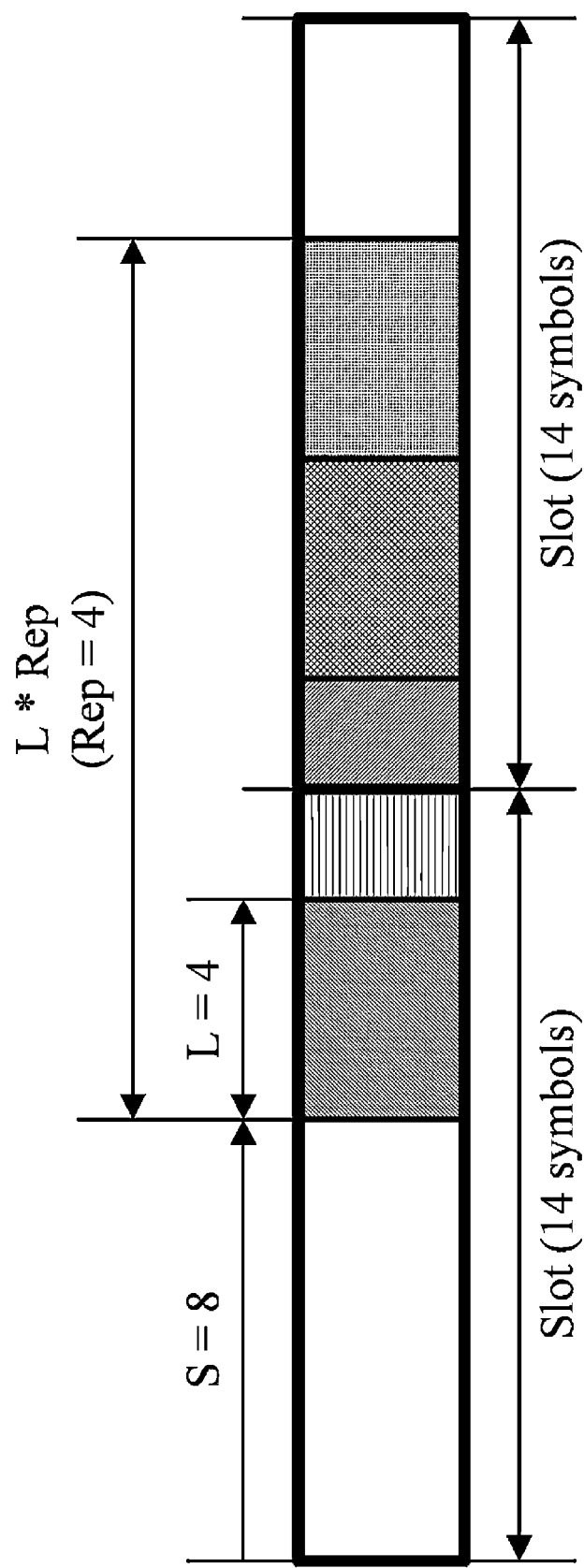
FIG. 19 is a diagram illustrating an example of segmentation of the PUSCH according to an embodiment of the present invention.

FIG. 19 illustrates, as an example of segmentation of the PUSCH according to the present embodiment, a case in which all the symbols of two slots (uplink symbols or flexible symbols) can be allocated the PUSCH and in which S=8, L=4, and Rep=4. In this case, the parameter configuration is such that a PUSCH is repeated four times that starts with the ninth symbol within the slot and that has a duration of four symbols, but the second PUSCH resource in the repetition transmission extends across a slot boundary, and is thus segmented into two PUSCHs each with two symbols. This prevents each PUSCH from extending across the slot boundary, and the terminal apparatus 1 transmits a PUSCH with a duration of 4 symbols or 2 symbols five times.

Figure 20:
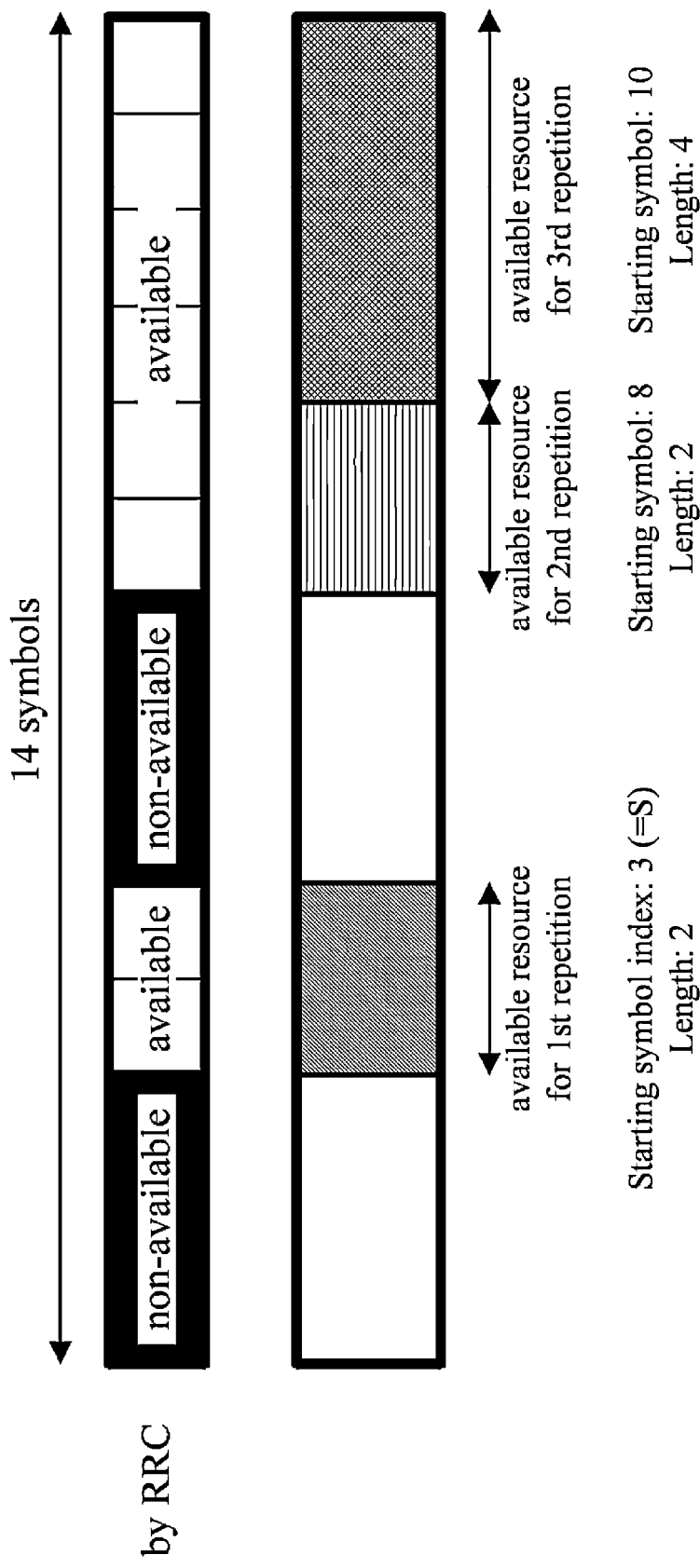
FIG. 20 is a diagram illustrating another example of segmentation of the PUSCH according to an embodiment of the present invention.

FIG. 20 illustrates, as another example, a case in which in a certain slot, in accordance with the higher layer slot format configuration information, the first to third symbols and the sixth to eighth symbols are set as symbols unavailable for transmission of the PUSCHs (for example, downlink symbols and/or several symbols (guard symbols) immediately after the downlink symbols), and remaining symbols are set as symbols (for example, uplink symbols or flexible symbols excluding guard symbols) available for transmission of the PUSCHs. In this case, the PUSCH resources are allocated to the fourth and subsequent symbols, but the number of symbols starting with the fourth symbols and being available for the PUSCH is 2 (<L=4), and thus the first PUSCH resource is segmented. As a result, the first PUSCH resource has a starting symbol corresponding to the fourth symbol and a duration of 2, the second PUSCH resource has a starting symbol corresponding to the ninth symbol and a duration of 2, the third PUSCH resource has a starting symbol corresponding to the 11th symbol and a duration of 4, and the terminal apparatus 1 transmits the PUSCH three times.

In other words, Rep notified by the higher layer parameter may differ from the number of repetition transmissions of the PUSCH actually transmitted. In other words, L notified by the higher layer parameter may differ from the number of symbols in which the PUSCH is actually transmitted. For example, the terminal apparatus 1 may determine/identify the actual number of repetition transmissions of the PUSCH from Rep, the number of segments of each PUSCH, and/or the number of PUSCH resources dropped. For example, in a case that a Rep (the nominal number of repetitions) of 1 is indicated in the RRC message and/or the DCI and that the time domain resource for the PUSCH determined/identified by S and L extends across the slot boundary or that the time domain resource partly includes symbols unavailable for transmission of the PUSCHs, the terminal apparatus 1 may repeatedly transmit the PUSCH in multiple segmented time domain resources. More specifically, in a case that one slot includes 14 symbols and that S=8, L=14, and Rep=1 are notified, the terminal apparatus 1 may transmit one PUSCH in six symbols in the first slot having symbol numbers 8 to 13, and one PUSCH in the eight symbols in the second slot having symbol numbers 0 to 7. In this case, the terminal apparatus 1 performs two repetition transmissions of the PUSCH by using a time domain resource including six symbols in the first slot starting with symbol number 8 and a time domain resource including eight symbols in the second slot starting with symbol number 0.

However, in a case that a time domain resource for L×Rep symbols indicated by S, L, and Rep extends across the slot boundary or that the time domain resource partly includes DL symbols, the terminal apparatus 1 may segment the time domain resource and transmit one PUSCH for each group of continuous, available uplink symbols in the slot. In other words, in a case that a time domain resource for L×Rep symbols indicated by S, L, and Rep extends across the slot boundary or that the time domain resource partly includes DL symbols, the terminal apparatus 1 need not transmit multiple PUSCHs within a group of continuous, available uplink symbols in the slot.

In this manner, the terminal apparatus 1 according to the present embodiment determines/identifies the first symbol and the duration for multiple temporary PUSCH resources based on the DCI including the uplink RA information and the higher layer slot format configuration information. Furthermore, in a case that the terminal apparatus 1 is configured with monitoring of the slot format configuration DCI on the PDCCH, the terminal apparatus 1 determines/identifies the first symbol and the duration for each of multiple PUSCH resources (which may be referred to as actual PUSCH resources) based on the first symbols and the durations for the multiple temporary PUSCH resources and the slot format configuration DCI. Furthermore, in a case that the terminal apparatus 1 is not configured with monitoring of the slot format configuration DCI on the PDCCH, the terminal apparatus 1 determines/identifies the first symbol and the duration for each of multiple actual PUSCH resources based on the first symbols and the durations for the multiple temporary PUSCH resources. In a case that the terminal apparatus 1 receives the DCI including the downlink RA information and that the time resource for the downlink signal indicated by the downlink RA information collides with at least one symbol in the multiple temporary PUSCH resources, the terminal apparatus 1 determines/identifies the first symbol and the duration for each of multiple actual PUSCH resources based on the first symbols and the durations for the multiple temporary PUSCH resources and the downlink RA information. Furthermore, the terminal apparatus 1 transmits the PUSCH in each of the multiple actual PUSCH resources determined/identified.

Additionally, the terminal apparatus 1 according to the present embodiment determines/identifies multiple temporary PUSCH resources based on the DCI including the RA information and the higher layer slot format configuration information. Furthermore, in a case that the terminal apparatus 1 is configured with monitoring of the slot format configuration DCI on the PDCCH and detects the slot format configuration DCI, then in each of the multiple PUSCH resources, the terminal apparatus 1 determines/identifies a set of multiple continuous symbols as multiple actual PUSCH resources, the set of multiple continuous symbols being indicated as uplink symbols by at least one of the higher layer slot format configuration information and the slot format configuration DCI. Moreover, in a case that the terminal apparatus 1 is configured with monitoring of the slot format configuration DCI on the PDCCH and does not detect the slot format configuration DCI, then in each of the multiple temporary PUSCH resources, the terminal apparatus 1 determines/identifies, as an actual PUSCH resource, only a temporary PUSCH resource including only symbols indicated as uplink symbols by the higher layer slot format configuration information. Furthermore, in a case that the terminal apparatus 1 is not configured with monitoring of the slot format configuration DCI on the PDCCH, the terminal apparatus 1 determines/identifies multiple actual PUSCH resources based on multiple temporary PUSCH resources. In a case that the terminal apparatus 1 receives the DCI including the downlink RA information and that the time resource for the downlink signal indicated by the downlink RA information collides with at least one symbol in the multiple temporary PUSCH resources, the terminal apparatus 1 determines/identifies multiple actual PUSCH resources based on the multiple temporary PUSCH resources and the downlink RA information. Furthermore, the terminal apparatus 1 transmits the PUSCH in each of the multiple actual PUSCH resources determined/identified.

The terminal apparatus 1 according to an embodiment of the present invention may change symbols available and/or unavailable for actual PUSCH resources in accordance with a value of a bit field $b_1$ included in information notified from the base station apparatus 3. For example, the bit field $b_1$ may be included in the DCI (e.g., DCI in DCI format 0_2) including the RA information of the repetition transmission of the PUSCH. For example, the bit field $b_1$ may be included in the PDCCH received from the base station apparatus 3. For example, the bit field $b_1$ may be included in the RRC message received by the higher layer.

In a case that the bit field $b_1$ has a first value, the terminal apparatus 1 may determine the symbols indicated as uplink (semi-static uplink symbols) and the symbols indicated as flexible (semi-static flexible symbols) by the higher layer slot format configuration information to be symbols available for actual PUSCH resources, and may determine the symbols indicated as downlink (semi-static downlink symbols) and the symbols indicated as flexible (semi-static flexible symbols) to be symbols unavailable for actual PUSCH resources.

In a case that the bit field $b_1$ has a second value, the terminal apparatus 1 may determine the symbols indicated as uplink (semi-static uplink symbols) by the higher layer slot format configuration information to be symbols available for actual PUSCH resources, and may determine the symbols indicated as downlink (semi-static downlink symbols) and the symbols indicated as flexible (semi-static flexible symbol) to be symbols unavailable for actual PUSCH resources.

In a case that the bit field $b_1$ has a third value, the terminal apparatus 1 may determine the symbols indicated as uplink by the higher layer slot format configuration information (semi-static uplink symbols) and the symbols indicated as uplink by the slot format configuration DCI (dynamic uplink symbols) to be symbols available for actual PUSCH resources, and may determine the symbols indicated as downlink by the higher layer slot format configuration information (semi-static downlink symbols), the symbols indicated as flexible by the slot format configuration DCI (dynamic flexible symbols), and the symbols indicated as downlink by the slot format configuration DCI (dynamic downlink symbols) by the higher layer slot format configuration information to be symbols unavailable for actual PUSCH resources. However, in a case of failing to detect the slot format configuration DCI, the terminal apparatus 1 may determine the symbols indicated as flexible by the higher layer slot format configuration information (semi-static flexible symbols) to be symbols unavailable for actual PUSCH resources.

In a case that the bit field $b_1$ has a fourth value, the terminal apparatus 1 may determine the symbols indicated as uplink by the higher layer slot format configuration information (semi-static uplink symbols), the symbols indicated as uplink by the slot format configuration DCI (dynamic uplink symbols), and the symbols indicated as flexible by the slot format configuration DCI (dynamic flexible symbols) to be symbols available for actual PUSCH resources, and may determine the symbols indicated as downlink by the higher layer slot format configuration information (semi-static downlink symbols) and the symbols indicated as downlink by the slot format configuration DCI (dynamic downlink symbols) by the higher layer slot format configuration information to be symbols unavailable for actual PUSCH resources. However, in a case of failing to detect the slot format configuration DCI, the terminal apparatus 1 may determine the symbols indicated as flexible by the higher layer slot format configuration information (semi-static flexible symbols) to be symbols unavailable for actual PUSCH resources.

However, the number of bits in the bit field $b_1$ may be 1 bit, and the bit field may indicate one of two of the first to fourth values described above. For example, bit field $b_1=0$ corresponds to the first value, bit field $b_1=1$ corresponds to the third value, and bit field $b_1$, and the value of the bit field $b_1$ (0 or 1) may be used to switch between an operation for the first value and an operation for the third value.

However, the number of bits in the bit field $b_1$ may be 2 bits, and the bit field may indicate one of the first to fourth values described above. For example, bit field $b_1=00$ corresponds to the first value, bit field $b_1=01$ corresponds to the second value, bit field $b_1=10$ corresponds to the third value, bit field $b_1=11$ corresponds to the fourth value, and the value of the bit field may be used to switch among operations for the first to fourth values.

However, the number of bits in the bit field $b_1$ may be 2 or more bits, and the bit field may indicate one of the operations for the first to fourth values described above or any other operation.

However, the operation indicated by the bit field $b_1$ may be indicated by a combination of the RRC message and the DCI. For example, the number of bits in the bit field $b_1$ included in the $DCI_1$ is 1 bit, and the operation indicated by the 1 bit may be configured by the RRC message.

In the present embodiment, at least based on the (I) higher layer parameter and/or a field included in the uplink grant, the terminal apparatus 1 may determine/identify whether the repetition transmission is applied to the PUSCH transmission scheduled by the uplink grant or which of multiple repetition transmission types is to be applied. The types of the repetition transmission may include, in addition to repetition transmission in continuous available uplink symbols in one or continuous multiple available slots described above (referred to as the first repetition transmission), slot aggregation in which the PUSCH is transmitted once in each slot in defined symbols common to the slots (hereinafter referred to as the second repetition transmission).

In an aspect A of the present embodiment, the base station apparatus 3 may use a higher layer parameter to notify the terminal apparatus 1 which of the first repetition transmission and the second repetition transmission is to be configured/applied. For example, pusch-AggregationFactor may be used to indicate the number of repetition transmissions of the second repetition transmission. For example, pusch-AggregationFactor-r16 may be used to indicate the number of repetitions of the first repetition transmission common to the indexes notified by a Time domain resource assignment field in the DCI. For example, repetition may be used to indicate the number of repetitions of the first repetition transmission for each of the indexes notified by the Time domain resource assignment field in the DCI. In a case that the terminal apparatus 1 is not configured with pusch-AggregationFactor, a pusch-AggregationFactor-r16, and/or repetition, the terminal apparatus 1 may consider that the repetition transmission is not applied, and may transmit one PUSCH for which the uplink grant is scheduled.

In an aspect B of the present embodiment, the terminal apparatus 1 may determine/identify which of the first repetition transmission and the second repetition transmission is to be applied based on the 'Time domain resource assignment' field included in the uplink grant transmitted from the base station apparatus 3. As described above, the 'Time domain resource assignment' field is used to indicate PUSCH time domain resource allocation.

In an aspect C of the present embodiment, the base station apparatus 3 may use a higher layer parameter to notify the terminal apparatus 1 which of the first repetition transmission and the second repetition transmission is to be configured. For example, the base station apparatus 3 may individually configure a higher layer parameter indicating the number of repetition transmissions for each of the first repetition transmission and the second repetition transmission. For example, pusch-AggregatinFactor-r16 and/or repetition may be used to indicate the number of repetition transmissions of the first repetition transmission.

Additionally, in the aspect A, aspect B, or aspect C of the present embodiment, the terminal apparatus 1 may determine/identify which of the first repetition transmission and the second repetition transmission is to be applied based on a PUSCH mapping type obtained based on the 'Time domain resource assignment' field included in the uplink grant.

In the aspect A, aspect B, or aspect C of the present embodiment, the terminal apparatus 1 may determine/identify which of the first repetition transmission and the second repetition transmission is to be applied based on S, L, and/or Rep indicated in the 'Time domain resource assignment' field included in the uplink grant.

Hereinafter, frequency hopping applied in the uplink according to the present embodiment will be described.

In the terminal apparatus 1, first frequency hopping is configured for PUSCH transmission scheduled or configured by the higher layer parameter frequencyHopping. In frequencyHopping, one of two frequency hopping modes below is configured.

Intra-slot frequency hopping
Inter-slot frequency hopping

Figure 21:
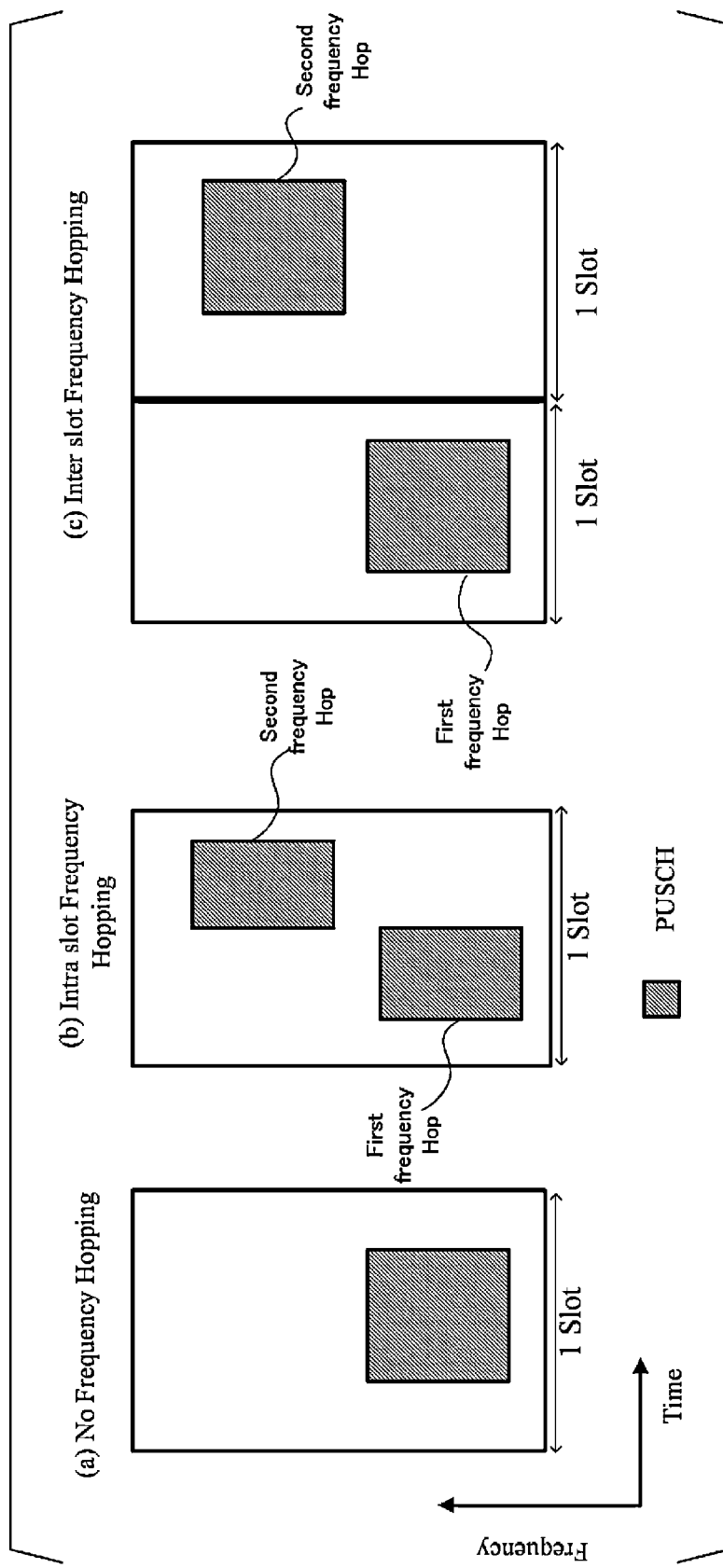
FIG. 21 is a schematic diagram of first frequency hopping according to an embodiment of the present invention.

FIG. 21 is a diagram illustrating an example of first frequency hopping according to the present embodiment.

FIG. 21(*a*) illustrates an example of PUSCH transmission with no frequency hopping. FIG. 21(*b*) is an example of PUSCH transmission with intra-slot frequency hopping. FIG. 21(*c*) is an example of PUSCH transmission with inter-slot frequency hopping.

In the terminal apparatus 1, second frequency hopping is configured for PUSCH transmission scheduled or configured by the higher layer parameter frequencyHopping-r16. In frequency Hopping-r16, one of three frequency hopping modes below may be configured.

Inter-PUSCH frequency hopping
Intra-PUSCH frequency hopping
Inter-slot frequency hopping However, the second frequency hopping that can be configured by the frequencyHopping-r16 may be some of the three hopping modes. For example, the second frequency hopping that can be configured by the frequencyHoppin-r16 may be inter-PUSCH frequency hopping and inter-slot frequency hopping.

Figure 22:
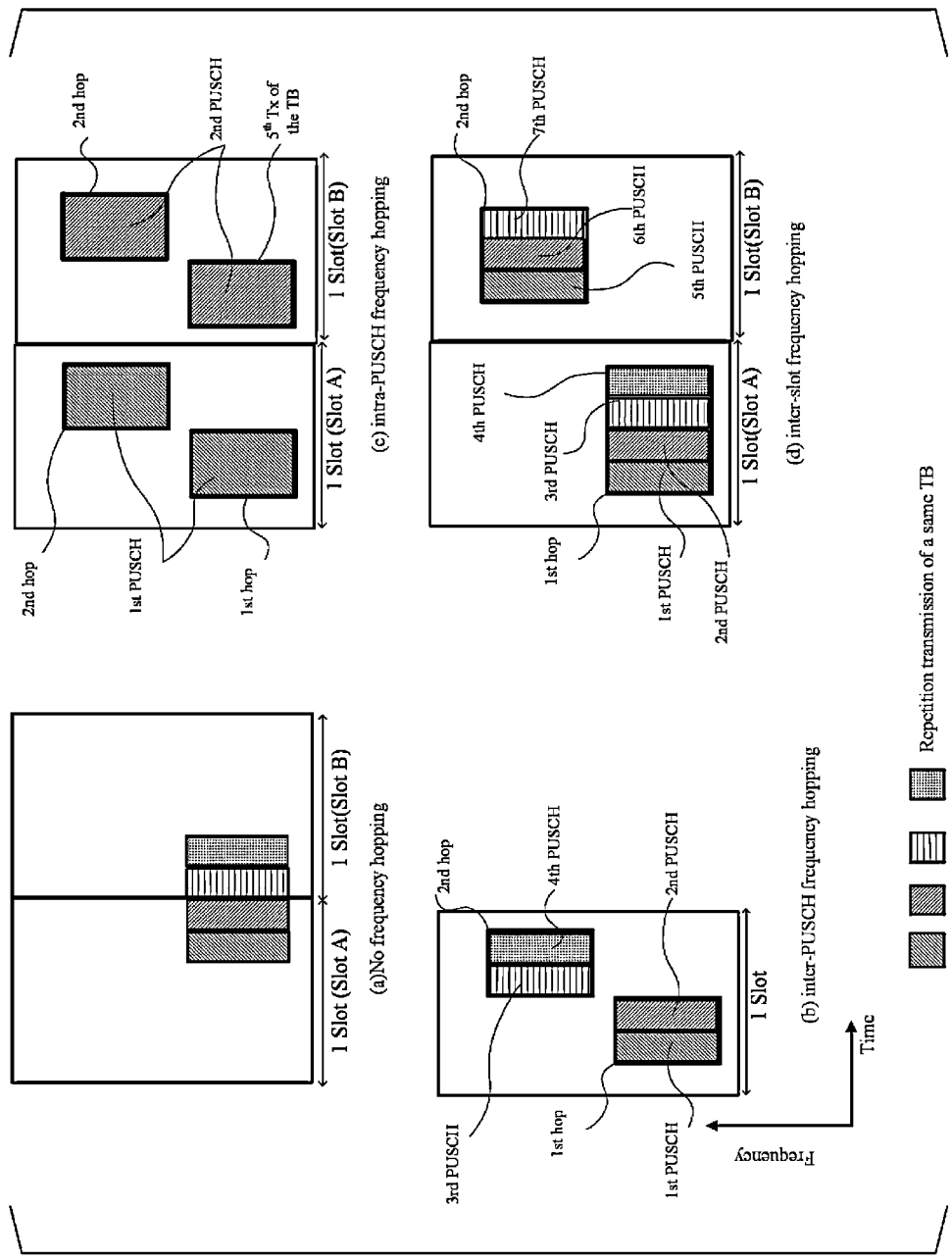
FIG. 22 is a schematic diagram of second frequency hopping according to an embodiment of the present invention.

FIG. 22 is a diagram illustrating an example of second frequency hopping according to the present embodiment. FIG. 22(*a*) is an example of PUSCH transmission with no frequency hopping. FIG. 22(*b*) is an example of PUSCH transmission with inter-PUSCH frequency hopping. FIG. 22(*c*) is an example of PUSCH transmission with intra-PUSCH frequency hopping. FIG. 22(*d*) is an example of PUSCH transmission with inter-slot frequency hopping.

In FIG. 21(*b*), FIG. 22(*b*), and FIG. 22(*c*), the PUSCH transmission with frequency hopping in a slot includes a first hop (first frequency hop, first frequency unit) and a second hop (second frequency hop, second frequency unit) in the slot. However, the frequency hopping in the slot in the present embodiment is similarly applicable to a case in which three or more hops are present. In other words, in the slot, a third hop, a fourth hop, . . . , may be present besides the first hop and the second hop. The maximum number of hops in the slot may be configured by the RRC message or the like.

However, an identical RRC parameter may be used to indicate frequency hopping modes indicated by frequencyHopping and frequencyHopping-r16 (the frequency hopping mode included in the first frequency hopping and the frequency hopping mode included in the second frequency hopping). For example, frequencyHopping-r16 (or frequencyHopping) may be a parameter configuring a frequency hopping mode for one of intra-slot frequency hopping, inter-slot frequency hopping, intra-PUSCH frequency hopping, and/or inter-PUSCH frequency hopping. For example, the frequency hopping mode indicated by frequencyHopping-r16 may be implicitly switched based on the type of the DCI format, information of the fields included in the DCI format, the RNTI, and/or other information. For example, in the PUSCH scheduled in DCI format 0_0 or 0_1, the frequency hopping mode indicated by frequencyHopping-r16 may be any of the frequency hopping modes of the first frequency hopping, and in the PUSCH scheduled in DCI format 0_2, the frequency hopping mode indicated by frequencyHopping-r16 is any of the frequency hopping modes of the second frequency hopping.

The terminal apparatus 1 performs frequency hopping of the PUSCH in a case that the frequency hopping field included in the detected DCI format or a random access response UL grant is set to 1 or the higher layer parameter frequencyHoppingOffset is provided in the PUSCH transmission of configured grant, and otherwise does not perform frequency hopping of the PUSCH. However, frequencyHoppingOffset is a parameter indicating the frequency offset between hops in a case that frequency hopping is performed in the PUSCH transmission of configured grant.

In the PUSCH scheduled in DCI format 0_0, 0_1, and/or 0_2, the frequency offset is configured by the higher layer parameter frequencyHoppingOffsetLists.

In a case that intra-slot frequency hopping is configured, the starting RB of each hop is given by Equation (1).

$$RB_{start} = \begin{cases} RB_{start} & i = 0 \\ (RB_{start} + RB_{offset}) \bmod N_{BWP}^{size} & i = 1 \end{cases} \quad \text{Expression 1}$$

However, i=0 and i=1 are respectively a first hop and a second hop, $RB_{start}$ is a starting RB in the UL BWP, and $RB_{offset}$ is the frequency offset between the two frequency hops in units of RBs. The terminal apparatus 1 configured with the intra-slot frequency hopping may determine/identify frequency resources for the first hop and the second hop based on Expression (1).

In a case that the terminal apparatus 1 is configured with the intra-slot frequency hopping, the number of symbols for the first hop is given by $\text{ceil}(N^{PUSCH,s}_{symb})$, and the number of symbols for the second hop is given by $N^{PUSCH,s}_{symb} - \text{ceil}(N^{PUSCH,s}_{symb})$. However, $N^{PUSCH,s}_{symb}$ is the number of OFDM symbols for PUSCH transmission per slot. The terminal apparatus 1 configured with the intra-slot frequency hopping may determine the number of symbols for the first hop to be $\text{ceil}(N^{PUSCH,s}_{symb})$ and determine/identify the number of symbols for the second hop to be $N^{PUSCH,s}_{symb} - \text{ceil}(N^{PUSCH,s}_{symb})$.

In a case that the inter-slot frequency hopping is configured, the starting RB in the slot $n^\mu_s$ is given by Equation (2).

$$RB_{start}(n^\mu_s) = \begin{cases} RB_{start} & n^\mu_s \bmod 2 = 0 \\ (RB_{start} + RB_{offset}) \bmod N_{BWP}^{size} & n^\mu_s \bmod 2 = 1 \end{cases} \quad \text{Expression 2}$$

Here, $n^\mu_s$ is a current slot number in one radio frame, and $RB_{start}$ is the starting RB in the UL BWP, and $RB_{offset}$ is the frequency offset two frequency hops in units of RBs. The terminal apparatus 1 configured with the inter-slot frequency hopping may determine/identify frequency resources for each slot based on Expression (2).

In a case that the terminal apparatus 1 is configured with the inter-PUSCH frequency hopping, the starting RB for each hop may be given by Expression (1). The terminal apparatus 1 configured with the inter-PUSCH frequency hopping may determine/identify frequency resources for the first hop and the second hop based on Expression (1).

In a case that the terminal apparatus 1 is configured with the inter-PUSCH frequency hopping, the number of PUSCHs included in each hop (first hop/second hop) and/or the number of OFDM symbols for each hop may be determined based on the time resource allocation information included in the DCI format or the random access response UL grant. In a case that the terminal apparatus 1 is configured with the inter-PUSCH frequency hopping, the terminal apparatus 1 may determine/identify the number of PUSCH included in each hop and/or the number of OFDM symbols for each hop based on the time resources allocated to one or multiple PUSCHs allocated to one or multiple slots. The terminal apparatus 1 may determine whether each of one or multiple scheduled PUSCHs and/or configured PUSCHs are included in the first hop or in the second hop based on the downlink control information.

For example, in a case that the terminal apparatus 1 is configured with inter-PUSCH frequency hopping, then in the slot $n^\mu_s$, the number of PUSCH transmissions for the first hop may be given by $\text{ceil}(N_{PUSCH}(n^\mu_s)/2)$, and the number of PUSCH transmissions for the second hop is given by $N_{PUSCH}(n^\mu_s) - \text{ceil}(N_{PUSCH}(n^\mu_s)/2)$ (or $\text{floor}(N^{PUSCH}(n^\mu_s)/2)$). However, $N^{PUSCH}(n^\mu_s)$ is the number of scheduled PUSCH transmissions and/or configured PUSCH transmissions in the slot $n^\mu_s$. The terminal apparatus 1 configured with the inter-PUSCH frequency hopping may determine/identify the number of PUSCH transmissions for the first hop by using $\text{ceil}(N_{PUSCH}(n^\mu_s)/2)$, and determine/identify the number of PUSCH transmissions for the second hop by using $N_{PUSCH}(n^\mu_s) - \text{ceil}(N^{PUSCH}(n^\mu_s)/2)$ (or $\text{floor}(N^{PUSCH}(n^\mu_s)/2)$. However, the expression for determining/identifying the number of PUSCH transmissions for the first hop and the second hop may be reversed, e.g., the number of PUSCH transmissions for the first hop may be given by $N^{PUSCH}(n^\mu_s) - \text{ceil}(N^{PUSCH}(n^\mu_s)/2)$ (or $\text{floor}(N^{PUSCH}(n^\mu_s)/2)$), and the number of PUSCH transmissions for the second hop may be given by $\text{ceil}(N^{PUSCH}(n^\mu_s)/2)$.

As another example, in a case that the terminal apparatus 1 is configured with the inter-PUSCH frequency hopping, then in the slot $n^\mu_s$, the number of PUSCH transmissions for the first hop and the number of PUSCH transmissions for the second hop may be based on the total number of symbols for PUSCH transmissions scheduled and/or configured for the slot $n^\mu_s$. The terminal apparatus 1 configured with the inter-PUSCH frequency hopping may determine/identify, in the slot $n^\mu_s$, the number of PUSCH transmissions for the first hop and the number of PUSCH transmissions for the second hop based on the total number of symbols for PUSCH transmissions scheduled and/or configured for the slot $n^\mu_s$.

As another example, in a case that the terminal apparatus 1 is configured with the inter-PUSCH frequency hopping, then in the slot $n^\mu_s$, PUSCHs with the starting symbol in the former half of slot may be included in the first hop, and PUSCHs with the starting symbol in the latter half of slot may be included in the second hop. In the slot $n^\mu_s$, the terminal apparatus 1 configured with the inter-PUSCH frequency hopping may include, in the first hop, PUSCHs with the starting symbol in the former half of slot, and include, in the second hop, PUSCHs with the starting symbol in the latter half of slot.

As another example, in a case that the terminal apparatus 1 is configured with the inter-PUSCH frequency hopping, then in the slot $n^\mu_s$, PUSCHs with an ending symbol in the former half of the slot may be included in the first hop, and PUSCHs with an ending symbol in the latter half of the slot may be included in the second hop. In the slot $n^\mu_s$, the terminal apparatus 1 configured with the inter-PUSCH frequency hopping may include, in the first hop, PUSCHs with the ending symbol in the former half of the slot, and include, in the second hop, PUSCHs with the ending symbol in the latter half of the slot.

As another example, in a case that the terminal apparatus 1 is configured with the inter-PUSCH frequency hopping, then in the slot $n^\mu_s$, the terminal apparatus 1 may determine or identify, for each uplink period in the slot, whether one or multiple PUSCHs are included in the first hop or the second hop. However, the uplink period is a time period within the slot during which one or multiple PUSCH can be continuously allocated. For example, one or multiple PUSCHs in the uplink period may be included in an identical hop, and an identical hop or different hops may be used during different uplink periods. In the slot $n^\mu_s$, the terminal apparatus 1 configured with the inter-PUSCH frequency hopping may determine or identify, for each uplink period in the slot, whether one or multiple PUSCHs are included in the first hop or the second hop.

In a case that the terminal apparatus 1 is configured with the inter-PUSCH frequency hopping, the terminal apparatus 1 may determine the number of PUSCHs included in each hop (first hop/second hop) and/or the number of OFDM symbols for each hop based on the number of repetition transmissions identified by the downlink control information (or the number of PUSCHs allocated by one grant). For example, the transmission number may be numbered in each of the one or multiple PUSCH allocated in one UL grant, and the terminal apparatus 1 may determine/identify whether or not being included in the first hop or included in the second hop based on the transmission number. For example, in each of the one or multiple PUSCH in the same slot allocated in one UL grant, the terminal apparatus 1 may determine or identify whether or not the terminal apparatus 1 is included in the first hop based on the transmission number, and is included in the second hop. However, in a case that a certain PUSCH allocated by one UL grant is segmented into multiple PUSCHs due to the boundary between slots, switching between the DL symbol and the UL symbol, and/or any other signal, an identical transmission number or different transmission numbers may be assigned to multiple PUSCHs resulting from the segmentation. For example, in a case that a certain PUSCH allocated by one UL grant is segmented into multiple PUSCHs due to the boundary between slots, switching between the DL symbol and the UL symbol, and/or any other signal, the multiple PUSCHs resulting from the segmentation may constantly be included in an identical hop or may be included in an identical hop or different hops similarly to other PUSCHs allocated by an identical grant.

As an example, in a case that the terminal apparatus 1 is configured with inter-PUSCH frequency hopping and that the number of PUSCH transmissions scheduled and/or configured for the slot $n^\mu_s$ is $N_{PUSCH}(n^\mu_s)$, a threshold $X_{PUSCH}=\text{ceil}(N_{PUSCH}(n^\mu_s)/2)$ is defined, and the PUSCHs allocated to the slot $n^\mu_s$ by an identical UL grant are numbered in accordance with $n_{PUSCH}=1$ to $N_{PUSCH}(n^\mu_s)$. The terminal apparatus 1 may include, in the first hop, PUSCHs with $n_{PUSCH} \leq X_{PUSCH}$, and include, in the second hop, PUSCHs with $n_{PUSCH} > X_{PUSCH}$.

In a case that the terminal apparatus 1 is configured with inter-PUSCH frequency hopping, then for multiple PUSCHs allocated by using an identical DL format or an identical UL grant, the terminal apparatus 1 may switch the inclusion of every prescribed number of PUSCHs between the first hop and the second hop in the time domain. The number of continuous PUSCHs included in an identical hop may be determined by the starting symbol (S), the duration (D), and/or the number of repetitions (Rep) for the PUSCH indicated by the downlink control information. However, for the number of continuous PUSCHs included in an identical hop, the terminal apparatus 1 may consider, as one PUSCH, multiple PUSCHs resulting from segmentation due to the slot boundary, a switching point between the DL symbol and the UL symbol, and/or any other channel/signal, or may consider, as one PUSCH, each of the multiple PUSCHs resulting from the segmentation. However, in a case that inclusion of each prescribed number of PUSCHs is switched between the first hop and the second hop in the time domain, the maximum value of the number of switchings within the slot may be limited.

However, applying the intra-PUSCH frequency hopping in the second frequency hopping may be applying the intra-slot frequency hopping in the first frequency hopping.

However, applying the inter-slot frequency hopping in the second frequency hopping may be applying the inter-slot frequency hopping in the first frequency hopping.

However, frequency hopping modes indicated by frequencyHopping-r16 may include the following two modes.
Inter-PUSCH frequency hopping
Frequency hopping mode indicated by the higher layer parameter frequencyHopping Implicit switching may be performed between the inter-PUSCH frequency hopping and intra-PUSCH frequency hopping (or intra-slot frequency hopping). For example, in a case that the inter-PUSCH frequency hopping is configured by frequencyHopping-r16 and the number of repetition transmissions indicated in a prescribed field of the DCI format is 1, the terminal apparatus 1 may apply the intra-PUSCH frequency hopping (or intra-slot frequency hopping) to scheduled or configured PUSCH transmissions. For example, in a case that the inter-PUSCH frequency hopping is configured in the frequency-frequency hopping-r16, the number of PUSCH transmitted in a certain slot is 1, the terminal apparatus 1 may apply intra-PUSCH frequency hopping (or intra-slot frequency hopping) for the PUSCH transmission or the configured PUSCH transmission that is scheduled to the slot. For example, in a case that the inter-PUSCH frequency hopping is configured by frequencyHopping-r16, that the number of PUSCHs transmitted in a certain slot is 1, and that the number of symbols for the PUSCHs transmitted in the slot has a prescribed value or larger, the terminal apparatus 1 may apply the intra-PUSCH frequency hopping (or intra-slot frequency hopping) to the PUSCH transmission scheduled or configured for the slot.

With this configuration, the terminal apparatus 1 can perform uplink data transmission to the base station apparatus 3.

Configurations of apparatuses according to the present embodiment will be described below.

Figure 23:
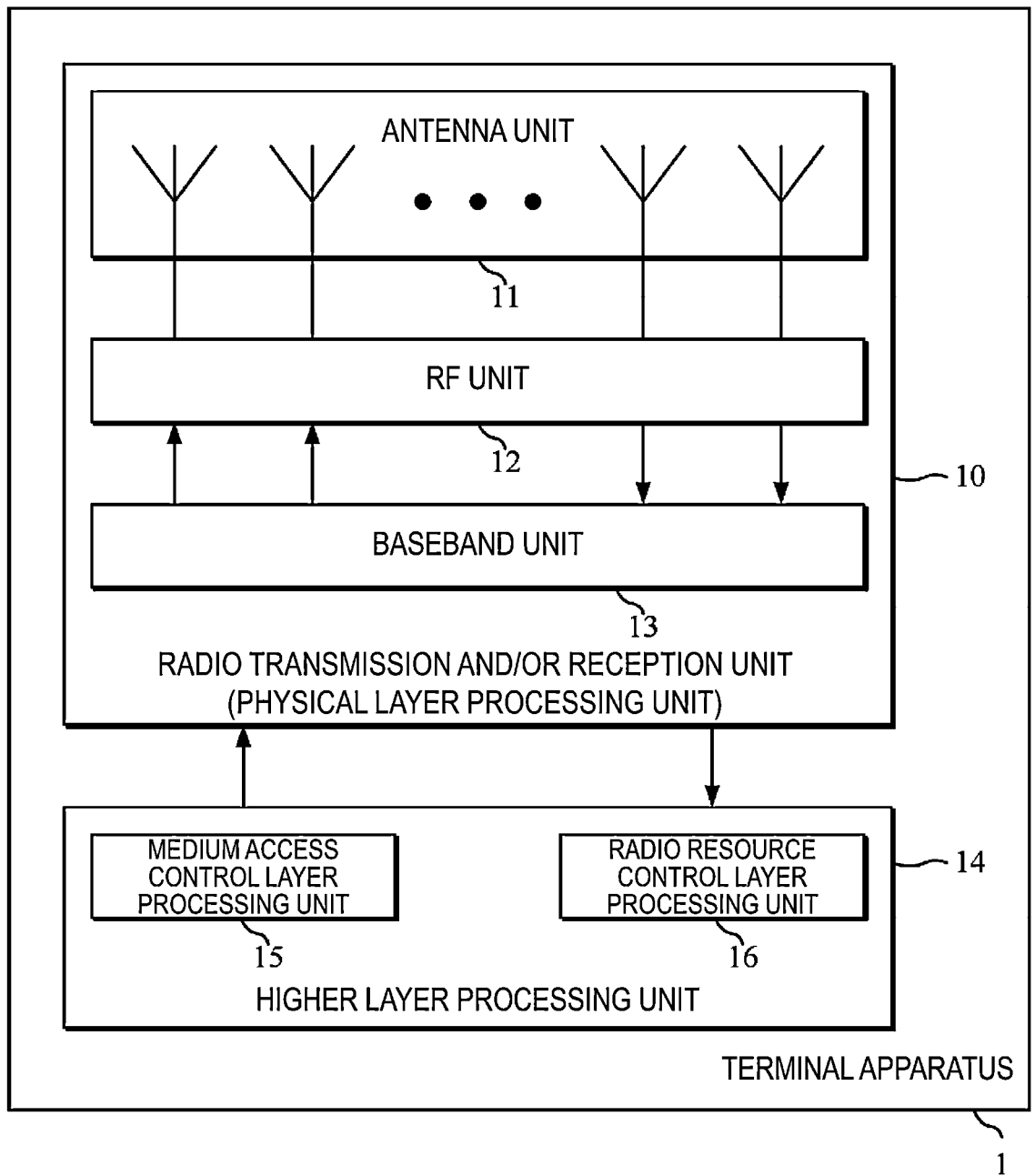
FIG. 23 is a schematic block diagram illustrating a configuration of a terminal apparatus 1 according to an embodiment of the present invention.

FIG. 23 is a schematic block diagram illustrating a configuration of the terminal apparatus 1 according to the present embodiment. As illustrated in FIG. 23, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measurement unit 14, a selection unit, 14, a determination unit 14, or a controller 14.

The higher layer processing unit 14 outputs uplink data (that may be referred to as transport block) generated by a user operation or the like, to the radio transmission and/or reception unit 10. The higher layer processing unit 14 performs a part or all of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 may include a function to determine/identify resources for transmitting one or multiple PUSCHs based on the higher layer signaling and/or DCI received from the base station apparatus 3. The higher layer processing unit 14 may include a function to determine/identify the first symbol and the number of symbols for each of multiple time resources for the PUSCH for a certain TB. The higher layer processing unit 14 may include a function to determine/identify the first symbol and the number of symbols for multiple temporary time resources based on the higher layer slot format configuration information and the time resource allocation information. The higher layer processing unit 14 may include a function to determine/identify, in each of the multiple temporary time resources, a set of continuous symbols indicated as uplink symbols by at least one of the higher layer slot format configuration information and the slot format configuration DCI, as one of multiple time resources for the PUSCH, in a case that the terminal apparatus 1 is configured with monitoring of the slot format configuration DCI on the PDCCH and detects the slot format configuration DCI. The higher layer processing unit 14 may include a function to determine/identify, in each of the multiple temporary time resources, a temporary time resource including only symbols indicated as uplink symbols by the higher layer slot format configuration information, as one of multiple time resources for the PUSCH, in a case that the terminal apparatus 1 is configured with monitoring of the slot format configuration DCI on the PDCCH and does not detect the slot format configuration DCI. The higher layer processing unit 14 may include a function to determine/identify each of the multiple temporary time resources based on multiple time resources for the PUSCH and/or allocation information for downlink signals in a case that the terminal apparatus 1 is not configured with monitoring of the slot format configuration DCI on the PDCCH. The higher layer processing unit 14 may include a function to cancel transmission of the PUSCH in some or all of the symbols in a symbol set A in a case that the uplink allocation information indicates that a certain PUSCH is transmitted in a certain symbol set (symbol set A), that the downlink allocation information indicates that the downlink signal is transmitted in a certain symbol set (symbol set B), and that at least one symbol in the symbol set A is included in the symbol set B. The higher layer processing unit 14 may include a function to determine/identify whether to transmit the PUSCH in the symbols indicated as flexible by the higher layer slot format configuration information based on the information of the first bit field received from the base station apparatus 3.

The medium access control layer processing unit 15 included in the higher layer processing unit 14 performs processing of the Medium Access Control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer (RRC layer). The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. The radio resource control layer processing unit 16 controls (identifies) the resource allocation, based on the downlink control information received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and transmits the transmit signal to the base station apparatus 3 or the like. The radio transmission and/or reception unit 10 outputs, to the higher layer processing unit 14, the higher layer signaling (RRC message), DCI, and the like received from the base station apparatus 3. Additionally, the radio transmission and/or reception unit 10 generates and transmits an uplink signal (including the PUCCH and/or the PUSCH), based on an indication from the higher layer processing unit 14. The radio transmission and/or reception unit 10 may include a function to receive the PDCCH and/or the PDSCH. The radio transmission and/or reception unit 10 may include a function to transmit one or multiple PUCCHs and/or PUSCHs. The radio transmission and/or reception unit 10 may include a function to receive the DCI on the PDCCH. The radio transmission and/or reception unit 10 may include a function to output, to the higher layer processing unit 14, the DCI received on the PDCCH. The radio transmission and/or reception unit 10 may include a function to receive an RRC message including higher layer slot format configuration information. The radio transmission and/or reception unit 10 may include a function to receive, on the PDCCH, the time resource allocation information for the PUSCH for one TB. The radio transmission and/or reception unit 10 may include a function to monitor the slot format configuration DCI on the PDCCH. The radio transmission and/or reception unit 10 may include a function to receive DCI and/or an RRC message including the first bit field.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. Additionally, the RF unit 12 may function of determining transmit power for an uplink signal and/or an uplink channel transmitted in the serving cell. The RF unit 12 is also referred to as a transmission power control unit.

Figure 24:
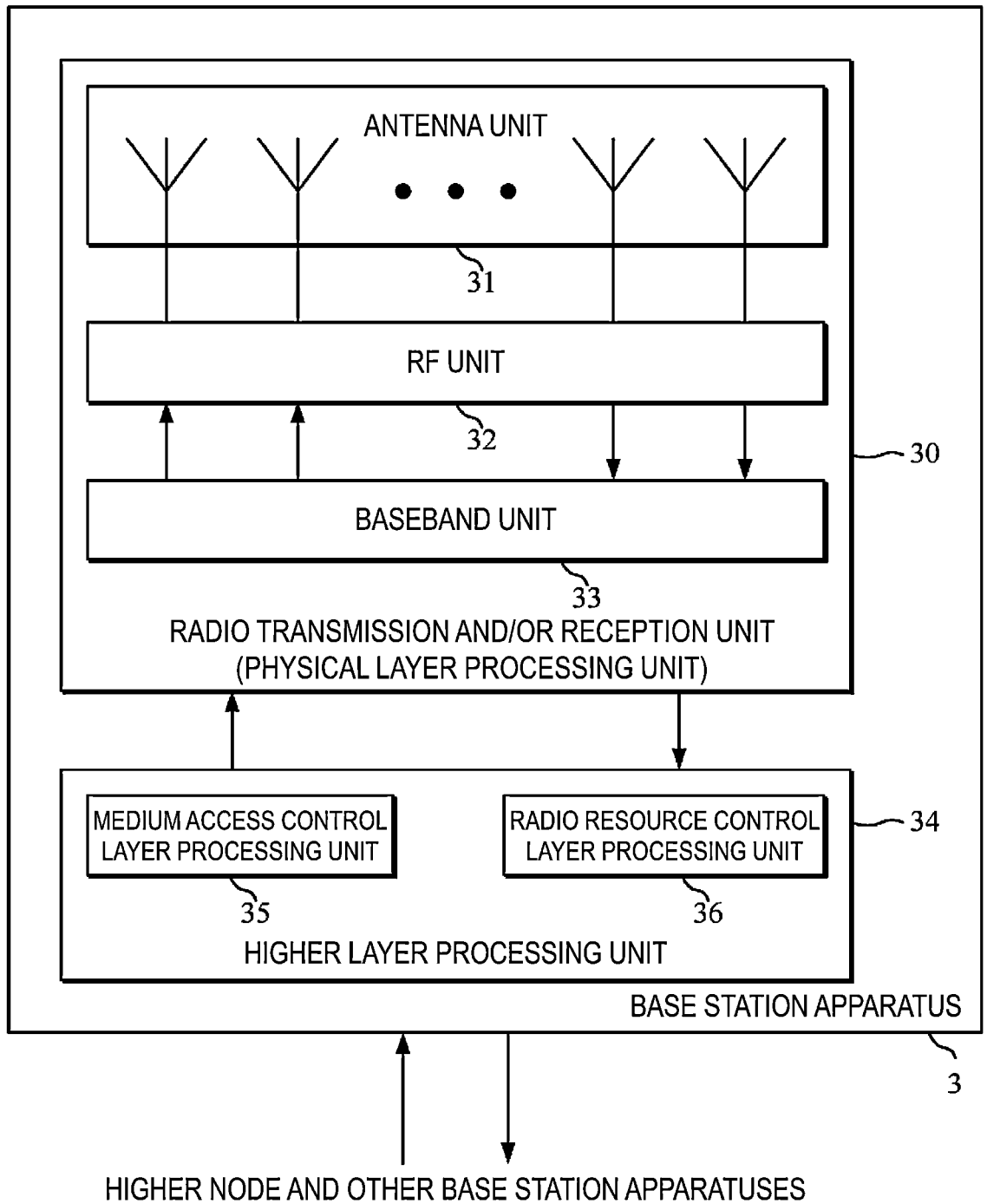
FIG. 24 is a schematic block diagram illustrating a configuration of a base station apparatus 3 according to an embodiment of the present invention.

FIG. 24 is a schematic block diagram illustrating a configuration of the base station apparatus 3 according to the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a monitor unit, or a physical layer processing unit. A controller controlling operations of the units based on various conditions may be separately provided. The higher layer processing unit 34 is also referred to as a determination unit 34 or a controller 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may include a function to generate DCI, based on the higher layer signaling transmitted to the terminal apparatus 1 and time resources for transmitting the PUSCH. The higher layer processing unit 34 may include a function to output the DCI generated and the like to the radio transmission and/or reception unit 30. The higher layer processing unit 34 may include a function to determine/identify resources used for transmission of one or multiple PUSCHs based on the RRC message and the DCI generated. The higher layer processing unit 34 may include a function to determine/identify multiple temporary time resources based on the higher layer slot format configuration information and the time resource allocation information. The higher layer processing unit 34 may include a function to determine/identify the first symbol and the number of symbols for multiple time resources for a certain PUSCH. The higher layer processing unit 34 may include a function to determine/identify the first symbol and the number of symbols for multiple temporary time resources based on the higher layer slot format configuration information and the time resource allocation information. The higher layer processing unit 34 may include a function to determine/identify, in each of the multiple temporary time resources, a set of continuous symbols indicated as uplink symbols by at least one of the higher layer slot format configuration information and the slot format configuration DCI, as one of multiple time resources for the PUSCH, in a case that the terminal apparatus 1 is configured with monitoring of the slot format configuration DCI on the PDCCH. The higher layer processing unit 34 may include a function to determine/identify the first symbol and the number of symbols for a multiple time resources for the PUSCH based on the first symbol and the number of symbols for each of the multiple temporary time resources and the slot format configuration DCI in a case that the terminal apparatus 1 is configured with monitoring of the slot format configuration DCI on the PDCCH. The higher layer processing unit 34 may include a function to determine/identify each of the multiple temporary time resources as each of multiple time resources for the PUSCH in a case that the terminal apparatus 1 is not configured with monitoring of the slot format configuration DCI on the PDCCH. The higher layer processing unit 34 may include a function to determine/identify each of the multiple temporary time resources based on multiple time resources for the PUSCH and/or allocation information for the downlink signals in a case that the terminal apparatus 1 is not configured with monitoring of the slot format configuration DCI on the PDCCH. The higher layer processing unit 34 may include a function to avoid the use of some or all of the symbols in a symbol set A for reception of the PUSCH in a case that the uplink allocation information transmitted to the terminal apparatus 1 indicates that a certain PUSCH is transmitted in a certain symbol set (symbol set A), that the downlink allocation information indicates that the downlink signal is transmitted in a certain symbol set (symbol set B), and that at least one symbol in the symbol set A is included in the symbol set B. The higher layer processing unit 34 may include a function to determine/identify whether to receive the PUSCH in the symbols indicated as flexible by the higher layer slot format configuration information based on the information of the first bit field transmitted to the terminal apparatus 1.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, for the terminal apparatus 1, DCI (uplink grant and downlink grant) including resource allocation information. The radio resource control layer processing unit 36 generates or acquires from a higher node, DCI, downlink data (transport block (TB) and random access response (RAR)) mapped to a PDSCH, system information, an RRC message, a MAC Control Element (CE), and the like, and outputs the generated or acquired data and the like to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. The radio resource control layer processing unit 36 may transmit/report information for identifying a configuration of one or multiple reference signals in a certain cell.

In a case that the base station apparatus 3 transmits the RRC message, the MAC CE, and/or the PDCCH to the terminal apparatus 1, and the terminal apparatus 1 performs processing, based on the reception, the base station apparatus 3 performs processing (control of the terminal apparatus 1 and the system) assuming that the terminal apparatus is performing the above-described processing. In other words, the base station apparatus 3 sends, to the terminal apparatus 1, the RRC message, MAC CE, and/or PDCCH intended to cause the terminal apparatus to perform the processing based on the reception.

The radio transmission and/or reception unit 30 transmits higher layer signaling (RRC message), DCI, and the like to the terminal apparatus 1. The radio transmission and/or reception unit 30 receives the uplink signal transmitted from the terminal apparatus 1 based on an indication from the higher layer processing unit 34. The radio transmission and/or reception unit 30 may include a function to transmit the PDCCH and/or the PDSCH. The radio transmission and/or reception unit 30 may include a function to receive one or multiple PUCCHs and/or PUSCHs. The radio transmission and/or reception unit 30 may include a function to transmit the DCI on the PDCCH. The radio transmission and/or reception unit 30 may include a function to transmit the DCI output by the higher layer processing unit 34, on the PDCCH. The radio transmission and/or reception unit 30 may include a function of transmitting, on the PDCCH, time resource allocation information for the PUSCH for a certain TB. The radio transmission and/or reception unit 30 may include a function to transmit an RRC message including the higher layer slot format configuration information. The radio transmission and/or reception unit 30 may include a function to transmit DCI and/or an RRC message including the first bit field. In addition, some of the functions of the radio transmission and/or reception unit 30 are similar to the corresponding functions of the radio transmission and/or reception unit 10, and thus description of these functions is omitted. Note that in a case that the base station apparatus 3 is connected to one or multiple transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 24, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit or an application layer processing unit reside in the higher layer processing unit 34.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

(1) A terminal apparatus 1 according to a first aspect of the present invention includes a receiver 10 configured to detect a first DCI format (which may be DCI format 0_2) including first allocation information (S, L, and/or Rep indicated by uplink RA information) for identifying a time resource and the number of repetition transmissions that are used to transmit a physical uplink shared channel (PUSCH) corresponding to a first transport block (TB), and to detect a second DCI format (which may be DCI format 1_0, DCI format 1_1, and/or DCI format 0_1) including second allocation information (downlink RA information) indicating reception of a downlink signal, and a determination unit 14 configured to identify the time resource (temporary PUSCH resource) for transmitting the physical uplink shared channel, based on the first allocation information, wherein the determination unit 14 cancels transmission of a first physical uplink shared channel corresponding to any one of the repetition transmissions of the physical uplink shared channel in a case that the first allocation information indicates that the first physical uplink shared channel is to be transmitted in a first symbol set and that the second allocation information indicates that the downlink signal is to be received in a second symbol set and that at least one symbol in the first symbol set is a symbol included in the second symbol set.

(2) A base station apparatus 3 according to a second aspect of the present invention is a base station apparatus 3 for communicating with a terminal apparatus 1, the base station apparatus 3 including a transmitter 30 configured to transmit, to the terminal apparatus, a signal including a first DCI format (which may be DCI format 0_2) including first allocation information (S, L, and/or Rep indicated by uplink RA information) for identifying a time resource and the number of repetition transmissions that are used to transmit a physical uplink shared channel (PUSCH) corresponding to a first transport block (TB), and to transmit, to the terminal apparatus 1, a signal including a second DCI format (which may be DCI format 1_0, DCI format 11, and/or DCI format 0_1) including second allocation information (downlink RA information) indicating reception of a downlink signal, and a determination unit configured to determine/identify the time resource for receiving the physical uplink shared channel based on the first allocation information, wherein the determination unit determines/identifies not to receive a first physical uplink shared channel corresponding to one of the multiple physical uplink shared channels in a case that the first allocation information indicates that the first physical uplink shared channel is to be received in a first symbol set and that the second allocation information indicates that the downlink signal is to be transmitted in a second symbol set and that at least one symbol in the first symbol set is a symbol included in the second symbol set.

(3) A terminal apparatus 1 according to a third aspect of the present invention includes a receiver 10 configured to receive an RRC message including first information (higher layer slot format configuration information) indicating which of downlink, uplink, and flexible each of symbols during a certain duration is, receive second information including a first bit field, and receive third information (uplink RA information) for identifying a first time resource in which a physical uplink shared channel (PUSCH) for a certain transport block (TB) is to be transmitted, and a determination unit 14 configured to identify the first time resource based on the first information and the third information, wherein the determination unit 14 does not use, for transmission of the physical uplink shared channel, resources allocated to symbols indicated as downlink and flexible by the slot format in the first time resource in a case that the first bit field has a first value and that the receiver receives, on a physical downlink control channel (PDCCH), fourth information (slot format configuration DCI) indicating a slot format for multiple slots, and to use all of the first time resources for transmission of the physical uplink shared channel in a case that the second bit field has a second value.

(4) In the third aspect of the present invention, the receiver 10 may receive the second information on a physical downlink control channel (PDCCH).

(5) In the third aspect of the present invention, the receiver 10 may receive the second information in an RRC message.

(6) A base station apparatus 3 according to a fourth aspect of the present invention is a base station apparatus 3 for communicating with a terminal apparatus 1, the base station apparatus 3 including a transmitter 30 configured to transmit an RRC message including first information (higher layer slot format configuration information) indicating which of downlink, uplink, and flexible each of symbols during a certain duration is, transmit second information including a first bit field, and transmit third information (uplink RA information) for identifying a first time resource in which the terminal apparatus 1 is to transmit a physical uplink shared channel (PUSCH) for a certain transport block (TB), and a receiver 30 configured to receive the physical uplink shared channel based on the first information, the second information, and the third information, wherein the receiver 30 does not use, for reception of the physical uplink shared channel, resources allocated to symbols indicated as downlink and flexible by the slot format in the first time resource in a case that the first bit field has a first value and that the transmitter transmits, on a physical downlink control channel (PDCCH), fourth information (slot format configuration DCI) indicating a slot format for multiple slots to the terminal apparatus, and to use all of the first time resources for reception of the physical uplink shared channel in a case that the second bit field has a second value.

(7) In the fourth aspect of the present invention, the transmitter 30 may transmit the second information on a physical downlink control channel (PDCCH).

(8) In the fourth aspect of the present invention, the transmitter 30 may transmit the second information in an RRC message.

With this configuration, the terminal apparatus 1 can efficiently communicate with the base station apparatus 3. For example, for DCI that schedules data for different services (eMBB, URLLC, and/or mMTC, etc.), an appropriate notification method can be used for each service in indicating a time resource for receiving the PDSCH and/or a time resource for transmitting the PUSCH. Further, the base station apparatus 3 can efficiently communicate with the terminal apparatus 1. For example, for DCI that schedules data for different services, an appropriate notification method can be used for each service in indicating a time resource for transmitting a PDSCH and/or a time resource for receiving a PUSCH.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. It may be implemented by causing a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general purpose processor may be a microprocessor or may be a processor, a controller, a micro-controller, or a state machine of known type, instead. The aforementioned electric circuit may include a digital circuit or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to an aspect of the present invention, an example has been described in which the present invention is applied to a communication system including a base station apparatus and a terminal apparatus, but the present invention can also be applied in a system in which terminals communicate with each other as in the case of Device to Device (D2D).

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transmission unit (TXRU)
51 Phase shifter
52 Antenna element

The invention claimed is:

1. A terminal apparatus comprising:
receiving circuitry configured to detect a first DCI format including first allocation information for identifying a time resource and the number of repetition transmissions that are used to transmit a physical uplink shared channel corresponding to a first transport block, and to detect a second DCI format including second allocation information indicating reception of a downlink signal; and
determination circuitry configured to identify the time resource for transmitting the physical uplink shared channel, based on the first allocation information, wherein
the determination circuitry is configured to cancel transmission of a first physical uplink shared channel corresponding to any one of the repetition transmissions of the physical uplink shared channel in a case that the first allocation information indicates that the first physical uplink shared channel is to be transmitted in a first symbol set and that the second allocation information indicates that the downlink signal is to be received in a second symbol set and that at least one symbol in the first symbol set is a symbol included in the second symbol set.

2. A base station apparatus for communicating with a terminal apparatus, the base station apparatus comprising:
transmitting circuitry configured to transmit, to the terminal apparatus, a signal including a first DCI format including first allocation information for identifying a time resource and the number of repetition transmissions that are used to transmit a physical uplink shared channel corresponding to a first transport block, and to transmit, to the terminal apparatus, a signal including a second DCI format including second allocation information indicating reception of a downlink signal; and
determination circuitry configured to identify the time resource for receiving the physical uplink shared channel, based on the first allocation information, wherein the determination circuitry is configured to determine not to receive a first physical uplink shared channel corresponding to any one of the repetition transmissions of the physical uplink shared channel in a case that the first allocation information indicates that the first physical uplink shared channel is to be received in a first symbol set and that the second allocation information indicates that the downlink signal is to be transmitted in a second symbol set and that at least one symbol in the first symbol set is a symbol included in the second symbol set.

3. A communication method for a base station apparatus for communicating with a terminal apparatus, the communication method comprising:
transmitting, to the terminal apparatus, a signal including a first DCI format including first allocation information for identifying a time resource and the number of repetition transmissions that are used to transmit a physical uplink shared channel corresponding to a first transport block, and transmitting, to the terminal apparatus, a signal including a second DCI format including second allocation information indicating reception of a downlink signal;
identifying the time resource for receiving the physical uplink shared channel, based on the first allocation information; and
determining not to receive a first physical uplink shared channel corresponding to any one of the repetition transmissions of the physical uplink shared channel in a case that the first allocation information indicates that the first physical uplink shared channel is to be received in a first symbol set and that the second allocation information indicates that the downlink signal is to be transmitted in a second symbol set and that at least one symbol in the first symbol set is a symbol included in the second symbol set.

* * * * *